United States Patent
Binder

(10) Patent No.: US 8,363,797 B2
(45) Date of Patent: *Jan. 29, 2013

(54) TELEPHONE OUTLET FOR IMPLEMENTING A LOCAL AREA NETWORK OVER TELEPHONE LINES AND A LOCAL AREA NETWORK USING SUCH OUTLETS

(75) Inventor: Yehuda Binder, Hod Hasharon (IL)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 273 days.

This patent is subject to a terminal disclaimer.

(21) Appl. No.: 12/727,375

(22) Filed: Mar. 19, 2010

(65) Prior Publication Data

US 2010/0246786 A1    Sep. 30, 2010

Related U.S. Application Data

(63) Continuation of application No. 11/434,927, filed on May 17, 2006, now Pat. No. 7,715,534, which is a continuation of application No. 10/827,349, filed on Apr. 20, 2004, now Pat. No. 7,123,701, which is a continuation of application No. 10/412,251, filed on Apr. 14, 2003, now Pat. No. 6,757,368, which is a continuation of application No. 09/531,692, filed on Mar. 20, 2000, now Pat. No. 6,549,616.

(51) Int. Cl.
*H04M 11/00* (2006.01)

(52) U.S. Cl. ............................. 379/90.01; 379/93.08

(58) Field of Classification Search ............. 379/90.01, 379/93.08, 93.01, 93.05, 93.06, 93.07
See application file for complete search history.

(56) References Cited

U.S. PATENT DOCUMENTS

| | | | |
|---|---|---|---|
| 2,264,395 A | 12/1941 | Mitchell |
| 2,264,396 A | 12/1941 | Moore |
| 2,298,435 A | 10/1942 | Tunick |
| 2,411,786 A | 11/1946 | Halstead |
| 2,510,273 A | 6/1950 | Barstow et al. |
| 2,516,211 A | 7/1950 | Hochgraf |
| 2,568,342 A | 9/1951 | Koehler et al. |
| 2,577,731 A | 12/1951 | Berger |
| 2,680,162 A | 6/1954 | Brehm et al. |
| 3,045,066 A | 7/1962 | Beuscher |
| 3,280,259 A | 10/1966 | Cotter |
| 3,334,340 A | 8/1967 | McConnell |

(Continued)

FOREIGN PATENT DOCUMENTS

| | | |
|---|---|---|
| DE | 33 29 336 A1 | 12/1983 |
| EP | 0241152 A | 10/1987 |

(Continued)

OTHER PUBLICATIONS

Cisco's 2600 Series Routers, "Quick Start Guide: Cisco 2610 Router, Cabling and Setup," published in 1998.

(Continued)

*Primary Examiner* — Stella Woo
(74) *Attorney, Agent, or Firm* — Browdy and Neimark, PLLC

(57) ABSTRACT

A network for transporting power and multiplexed data and digital telephone signals. The network includes at least three nodes and first and second wiring segments in a building for carrying the multiplexed data and digital telephone signals, and at least one of the segments is configured to additionally carry a power signal. A power consuming component is connected to the at least one wiring segment and is powered by the power signal carried by that segment. Each wiring segment connects a different pair of the nodes together to form, with nodes nodes, a packet based bi-directional communication link. One of the nodes contains communication link composed of a repeater, a bridge, or a router connectable to a data unit. At least one of the nodes is connected to a remote data unit external to the building for coupling the remote data unit to at least one of said communication links.

11 Claims, 11 Drawing Sheets

U.S. PATENT DOCUMENTS

| | | |
|---|---|---|
| 3,369,078 A | 2/1968 | Stradley |
| 3,370,125 A | 2/1968 | Shaw et al. |
| 3,406,344 A | 10/1968 | Hopper |
| 3,511,936 A | 5/1970 | Saltzberg |
| 3,529,088 A | 9/1970 | Hauer |
| 3,539,727 A | 11/1970 | Pasternack |
| 3,590,271 A | 6/1971 | Peters |
| 3,651,471 A | 3/1972 | Hasselwood et al. |
| 3,659,277 A | 4/1972 | Brown |
| 3,699,523 A | 10/1972 | Percher |
| 3,702,460 A | 11/1972 | Blose |
| 3,717,858 A | 2/1973 | Hadden |
| 3,723,653 A | 3/1973 | Tatsuzawa |
| 3,771,069 A | 11/1973 | Levacher et al. |
| 3,796,920 A | 3/1974 | Hedrick et al. |
| 3,806,814 A | 4/1974 | Forbes |
| 3,835,334 A | 9/1974 | Notteau |
| 3,836,888 A | 9/1974 | Boenke et al. |
| 3,846,638 A | 11/1974 | Wetherell |
| 3,870,822 A | 3/1975 | Matthews |
| 3,872,253 A | 3/1975 | Jurschak |
| 3,873,771 A | 3/1975 | Kleinerman et al. |
| 3,875,339 A | 4/1975 | Gruen et al. |
| 3,876,984 A | 4/1975 | Chertok |
| 3,909,821 A | 9/1975 | Jagoda et al. |
| 3,922,490 A | 11/1975 | Pettis |
| 3,924,077 A | 12/1975 | Blakeslee |
| 3,937,889 A | 2/1976 | Bell, III et al. |
| 3,949,172 A | 4/1976 | Brown et al. |
| 3,959,772 A | 5/1976 | Wakasa et al. |
| 3,962,547 A | 6/1976 | Pattantyus-Abraham |
| 3,968,333 A | 7/1976 | Simokat et al. |
| 3,973,240 A | 8/1976 | Fong |
| 3,975,594 A | 8/1976 | Guntersdorfer |
| 3,992,589 A | 11/1976 | Kuegler |
| 3,993,989 A | 11/1976 | Held et al. |
| 4,008,369 A | 2/1977 | Theurer et al. |
| 4,012,734 A | 3/1977 | Jagoda et al. |
| 4,024,528 A | 5/1977 | Boggs et al. |
| 4,032,911 A | 6/1977 | Melvin, Jr. |
| 4,035,838 A | 7/1977 | Bassani et al. |
| 4,054,910 A | 10/1977 | Chou et al. |
| 4,058,678 A | 11/1977 | Dunn et al. |
| 4,060,735 A | 11/1977 | Pascucci et al. |
| 4,130,874 A | 12/1978 | Pai |
| 4,135,181 A | 1/1979 | Bogacki et al. |
| 4,136,319 A | 1/1979 | Bourde |
| 4,161,720 A | 7/1979 | Bogacki |
| 4,163,218 A | 7/1979 | Wu |
| 4,171,467 A | 10/1979 | Evenchik |
| 4,173,714 A | 11/1979 | Bloch et al. |
| 4,197,431 A | 4/1980 | Vis |
| 4,200,862 A | 4/1980 | Campbell et al. |
| 4,206,320 A | 6/1980 | Keasler et al. |
| 4,216,543 A | 8/1980 | Cagle et al. |
| 4,232,200 A | 11/1980 | Hestad et al. |
| 4,241,243 A | 12/1980 | Ball |
| 4,262,171 A | 4/1981 | Schneider et al. |
| 4,270,206 A | 5/1981 | Hughes |
| 4,272,759 A | 6/1981 | Handy |
| 4,302,629 A | 11/1981 | Foulkes et al. |
| 4,302,750 A | 11/1981 | Wadhwani et al. |
| 4,303,993 A | 12/1981 | Panepinto, Jr. et al. |
| 4,328,579 A | 5/1982 | Hashimoto et al. |
| 4,329,678 A | 5/1982 | Hatfield |
| 4,330,687 A | 5/1982 | Foulkes et al. |
| 4,332,980 A | 6/1982 | Reynolds et al. |
| 4,335,464 A | 6/1982 | Armstrong et al. |
| 4,339,750 A | 7/1982 | Delacruz |
| 4,339,816 A | 7/1982 | Reed |
| 4,348,582 A | 9/1982 | Budek |
| 4,348,668 A | 9/1982 | Gurr et al. |
| 4,357,605 A | 11/1982 | Clements |
| 4,367,548 A | 1/1983 | Cotten, Jr. et al. |
| 4,367,557 A | 1/1983 | Stern et al. |
| 4,373,117 A | 2/1983 | Pierce |
| 4,378,470 A | 3/1983 | Murto et al. |
| 4,380,009 A | 4/1983 | Long et al. |
| 4,381,427 A | 4/1983 | Cheal et al. |
| 4,382,248 A | 5/1983 | Pai |
| 4,387,271 A | 6/1983 | Artom |
| 4,388,489 A | 6/1983 | Wigan et al. |
| 4,389,694 A | 6/1983 | Cornwell, Jr. |
| 4,390,986 A | 6/1983 | Moses |
| 4,393,508 A | 7/1983 | Boudault |
| 4,395,590 A | 7/1983 | Pierce |
| 4,402,059 A | 8/1983 | Kennon et al. |
| 4,413,229 A | 11/1983 | Grant |
| 4,415,774 A | 11/1983 | Driver |
| 4,417,099 A | 11/1983 | Pierce |
| 4,417,207 A | 11/1983 | Sato |
| 4,418,333 A | 11/1983 | Schwarzbach et al. |
| 4,425,642 A | 1/1984 | Moses et al. |
| 4,430,639 A | 2/1984 | Bennett et al. |
| 4,431,869 A | 2/1984 | Sweet |
| 4,433,212 A | 2/1984 | Moses et al. |
| 4,442,320 A | 4/1984 | James et al. |
| 4,442,540 A | 4/1984 | Allen |
| 4,443,662 A | 4/1984 | Nakhla |
| 4,444,999 A | 4/1984 | Sparrevohn |
| 4,449,218 A | 5/1984 | Strehl |
| 4,456,985 A | 6/1984 | Carsten et al. |
| 4,456,986 A | 6/1984 | Carsten et al. |
| 4,458,236 A | 7/1984 | Perkins |
| 4,459,434 A | 7/1984 | Benning et al. |
| 4,462,113 A | 7/1984 | Iwata |
| 4,463,341 A | 7/1984 | Iwasaki |
| 4,467,314 A | 8/1984 | Weikel et al. |
| 4,468,792 A | 8/1984 | Baker et al. |
| 4,475,193 A | 10/1984 | Brown |
| 4,477,896 A | 10/1984 | Aker |
| 4,479,033 A | 10/1984 | Brown et al. |
| 4,479,215 A | 10/1984 | Baker |
| 4,481,501 A | 11/1984 | Perkins |
| 4,484,185 A | 11/1984 | Graves |
| 4,485,400 A | 11/1984 | Lemelson et al. |
| 4,490,683 A | 12/1984 | Rhee |
| 4,493,092 A | 1/1985 | Adams |
| 4,493,948 A | 1/1985 | Sues et al. |
| 4,500,751 A | 2/1985 | Darland et al. |
| 4,506,387 A | 3/1985 | Walter |
| 4,507,721 A | 3/1985 | Yamano et al. |
| 4,507,793 A | 3/1985 | Adams |
| 4,509,211 A | 4/1985 | Robbins |
| 4,510,493 A | 4/1985 | Bux et al. |
| 4,510,611 A | 4/1985 | Dougherty |
| 4,514,594 A | 4/1985 | Brown et al. |
| 4,521,881 A | 6/1985 | Stapleford et al. |
| 4,523,307 A | 6/1985 | Brown et al. |
| 4,528,422 A | 7/1985 | Cupani |
| 4,528,667 A | 7/1985 | Fruhauf |
| 4,534,039 A | 8/1985 | Dodds et al. |
| 4,535,401 A | 8/1985 | Penn |
| 4,543,450 A | 9/1985 | Brandt |
| 4,546,212 A | 10/1985 | Crowder, Sr. |
| 4,551,721 A | 11/1985 | Kozlik |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,577,333 A | 3/1986 | Lewis et al. |
| 4,578,533 A | 3/1986 | Pierce |
| 4,578,535 A | 3/1986 | Simmons |
| 4,578,537 A | 3/1986 | Faggin et al. |
| 4,578,540 A | 3/1986 | Borg et al. |
| 4,580,276 A | 4/1986 | Andruzzi, Jr. et al. |
| 4,580,291 A | 4/1986 | Ab der Halden |
| 4,583,214 A | 4/1986 | Miyashita et al. |
| 4,584,690 A | 4/1986 | Cafiero et al. |
| 4,592,069 A | 5/1986 | Redding |
| 4,593,389 A | 6/1986 | Wurzburg et al. |
| 4,597,077 A | 6/1986 | Nelson et al. |
| 4,602,240 A | 7/1986 | Perkins et al. |
| 4,604,741 A | 8/1986 | Barsellotti |
| 4,608,686 A | 8/1986 | Barsellotti |
| 4,621,170 A | 11/1986 | Picandet |
| 4,631,367 A | 12/1986 | Coviello et al. |

| Patent No. | Date | Name |
|---|---|---|
| 4,633,217 A | 12/1986 | Akano |
| 4,639,714 A | 1/1987 | Crowe |
| 4,642,607 A | 2/1987 | Strom et al. |
| 4,644,526 A | 2/1987 | Wu |
| 4,646,289 A | 2/1987 | Tsiakas et al. |
| 4,646,296 A | 2/1987 | Bartholet et al. |
| 4,649,551 A | 3/1987 | Sander et al. |
| 4,656,655 A | 4/1987 | Hashimoto |
| 4,665,516 A | 5/1987 | Middleton et al. |
| 4,665,544 A | 5/1987 | Honda et al. |
| 4,668,934 A | 5/1987 | Shuey |
| 4,669,916 A | 6/1987 | White et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,677,646 A | 6/1987 | Dodds et al. |
| 4,679,227 A | 7/1987 | Hughes-Hartogs |
| 4,686,382 A | 8/1987 | Shuey |
| 4,686,641 A | 8/1987 | Evans |
| 4,691,344 A | 9/1987 | Brown et al. |
| 4,692,761 A | 9/1987 | Robinton |
| 4,697,166 A | 9/1987 | Warnagiris et al. |
| 4,701,945 A | 10/1987 | Pedigo |
| 4,703,306 A | 10/1987 | Barritt |
| 4,703,499 A | 10/1987 | Fossas et al. |
| 4,709,412 A | 11/1987 | Seymour et al. |
| 4,714,912 A | 12/1987 | Roberts et al. |
| 4,719,616 A | 1/1988 | Akano |
| 4,724,435 A | 2/1988 | Moses et al. |
| 4,731,821 A | 3/1988 | Jackson, III |
| 4,733,380 A | 3/1988 | Havira |
| 4,733,389 A | 3/1988 | Puvogel |
| 4,734,919 A | 3/1988 | Tae |
| 4,734,932 A | 3/1988 | Lott |
| 4,736,367 A | 4/1988 | Wroblewski et al. |
| 4,740,963 A | 4/1988 | Eckley |
| 4,742,538 A | 5/1988 | Szlam |
| 4,745,391 A | 5/1988 | Gajjar |
| 4,754,326 A | 6/1988 | Kram et al. |
| 4,755,792 A | 7/1988 | Pezzolo et al. |
| 4,757,495 A | 7/1988 | Decker et al. |
| 4,757,497 A | 7/1988 | Beierle et al. |
| 4,761,646 A | 8/1988 | Choquet et al. |
| 4,763,104 A | 8/1988 | Inoue et al. |
| 4,764,922 A | 8/1988 | Dieter et al. |
| 4,766,402 A | 8/1988 | Crane |
| 4,768,110 A | 8/1988 | Dunlap et al. |
| 4,768,206 A | 8/1988 | Van Gerwen |
| 4,769,837 A | 9/1988 | McCormick et al. |
| 4,772,870 A | 9/1988 | Reyes |
| 4,776,006 A | 10/1988 | Comerford et al. |
| 4,780,714 A | 10/1988 | Moustakas et al. |
| 4,780,757 A | 10/1988 | Bryer et al. |
| 4,780,758 A | 10/1988 | Lin et al. |
| 4,782,322 A | 11/1988 | Lechner et al. |
| 4,785,448 A | 11/1988 | Reichert et al. |
| 4,785,472 A | 11/1988 | Shapiro |
| 4,788,527 A | 11/1988 | Johansson |
| 4,789,895 A | 12/1988 | Mustafa et al. |
| 4,789,994 A | 12/1988 | Randall et al. |
| 4,799,211 A | 1/1989 | Felker et al. |
| 4,799,213 A | 1/1989 | Fitzgerald |
| 4,803,485 A | 2/1989 | Rypinski |
| 4,803,719 A | 2/1989 | Ulrich |
| 4,806,905 A | 2/1989 | McGowan, III et al. |
| 4,807,225 A | 2/1989 | Fitch |
| 4,809,296 A | 2/1989 | Braun et al. |
| 4,809,339 A | 2/1989 | Shih et al. |
| 4,814,941 A | 3/1989 | Speet et al. |
| 4,815,106 A | 3/1989 | Propp et al. |
| 4,821,319 A | 4/1989 | Middleton et al. |
| 4,825,349 A | 4/1989 | Marcel |
| 4,825,435 A | 4/1989 | Amundsen et al. |
| 4,829,570 A | 5/1989 | Schotz |
| 4,837,799 A | 6/1989 | Prohs et al. |
| 4,839,743 A | 6/1989 | Best et al. |
| 4,841,281 A | 6/1989 | Melvin, Jr. |
| 4,843,606 A | 6/1989 | Bux et al. |
| 4,847,903 A | 7/1989 | Schotz |
| 4,849,811 A | 7/1989 | Kleinerman |
| 4,852,151 A | 7/1989 | Dittakavi et al. |
| 4,866,602 A | 9/1989 | Hall |
| 4,866,704 A | 9/1989 | Bergman |
| 4,866,757 A | 9/1989 | Nilssen |
| 4,882,747 A | 11/1989 | Williams |
| 4,885,747 A | 12/1989 | Foglia |
| 4,885,766 A | 12/1989 | Yasuoka et al. |
| 4,888,795 A | 12/1989 | Ando et al. |
| 4,890,102 A | 12/1989 | Oliver |
| 4,890,316 A | 12/1989 | Walsh et al. |
| 4,893,326 A | 1/1990 | Duran et al. |
| 4,896,349 A | 1/1990 | Kubo et al. |
| 4,899,131 A | 2/1990 | Wilk et al. |
| 4,901,218 A | 2/1990 | Cornwell |
| 4,901,342 A | 2/1990 | Jones |
| 4,903,292 A | 2/1990 | Dillon |
| 4,914,418 A | 4/1990 | Mak et al. |
| 4,914,688 A | 4/1990 | Kobayashi et al. |
| 4,918,688 A | 4/1990 | Krause et al. |
| 4,918,690 A | 4/1990 | Markkula, Jr. et al. |
| 4,924,492 A | 5/1990 | Gitlin et al. |
| 4,926,158 A | 5/1990 | Zeigler |
| 4,932,022 A | 6/1990 | Keeney et al. |
| 4,932,047 A | 6/1990 | Emmons et al. |
| 4,937,811 A | 6/1990 | Harris |
| 4,939,728 A | 7/1990 | Markkula, Jr. et al. |
| 4,945,404 A | 7/1990 | Miller |
| 4,947,483 A | 8/1990 | Dirr |
| 4,949,187 A | 8/1990 | Cohen |
| 4,953,055 A | 8/1990 | Douhet et al. |
| 4,953,160 A | 8/1990 | Gupta |
| 4,954,886 A | 9/1990 | Elberbaum |
| 4,955,018 A | 9/1990 | Twitty et al. |
| 4,955,048 A | 9/1990 | Iwamura et al. |
| 4,969,136 A | 11/1990 | Chamberlain et al. |
| 4,969,147 A | 11/1990 | Markkula, Jr. et al. |
| 4,973,954 A | 11/1990 | Schwarz |
| 4,975,896 A | 12/1990 | D'Agosto, III et al. |
| 4,975,906 A | 12/1990 | Takiyasu et al. |
| 4,979,028 A | 12/1990 | Minematsu et al. |
| 4,979,183 A | 12/1990 | Cowart |
| 4,985,892 A | 1/1991 | Camarata |
| 4,989,081 A | 1/1991 | Miyagawa et al. |
| 4,991,221 A | 2/1991 | Rush |
| 4,992,774 A | 2/1991 | McCullough |
| 4,996,709 A | 2/1991 | Heep et al. |
| 5,001,774 A | 3/1991 | Lee |
| 5,003,457 A | 3/1991 | Ikei et al. |
| 5,010,399 A | 4/1991 | Goodman et al. |
| 5,014,308 A | 5/1991 | Fox |
| 5,018,138 A | 5/1991 | Twitty et al. |
| 5,021,779 A | 6/1991 | Bisak |
| 5,022,069 A | 6/1991 | Chen |
| 5,023,868 A | 6/1991 | Davidson et al. |
| 5,025,443 A | 6/1991 | Gupta |
| 5,027,426 A | 6/1991 | Chiocca, Jr. |
| 5,032,819 A | 7/1991 | Sakuragi et al. |
| 5,033,062 A | 7/1991 | Morrow et al. |
| 5,033,112 A | 7/1991 | Bowling et al. |
| 5,034,531 A | 7/1991 | Friary et al. |
| 5,034,882 A | 7/1991 | Eisenhard et al. |
| 5,034,883 A | 7/1991 | Donaldson et al. |
| 5,036,513 A | 7/1991 | Greenblatt |
| 5,051,822 A | 9/1991 | Rhoades |
| 5,063,563 A | 11/1991 | Ikeda et al. |
| 5,065,133 A | 11/1991 | Howard |
| 5,068,890 A | 11/1991 | Nilssen |
| 5,070,442 A | 12/1991 | Syron-Townson et al. |
| 5,070,522 A | 12/1991 | Nilssen |
| 5,089,886 A | 2/1992 | Grandmougin |
| 5,089,927 A | 2/1992 | Bulan et al. |
| 5,089,974 A | 2/1992 | Demeyer et al. |
| 5,090,052 A | 2/1992 | Nakajima et al. |
| 5,093,828 A | 3/1992 | Braun et al. |
| 5,095,497 A | 3/1992 | Aman et al. |
| 5,099,444 A | 3/1992 | Wilson et al. |
| 5,109,222 A | 4/1992 | Welty |

| | | | | | |
|---|---|---|---|---|---|
| 5,111,497 A | 5/1992 | Bliven et al. | 5,440,335 A | 8/1995 | Beveridge |
| 5,113,498 A | 5/1992 | Evan et al. | 5,448,635 A | 9/1995 | Biehl et al. |
| 5,121,482 A | 6/1992 | Patton | 5,450,393 A | 9/1995 | Watanabe et al. |
| 5,125,077 A | 6/1992 | Hall | 5,451,923 A | 9/1995 | Seberger et al. |
| 5,144,544 A | 9/1992 | Jenneve et al. | 5,452,289 A | 9/1995 | Sharma et al. |
| 5,146,471 A | 9/1992 | Cowart | 5,454,008 A | 9/1995 | Baumann et al. |
| 5,148,144 A | 9/1992 | Sutterlin et al. | 5,457,629 A | 10/1995 | Miller et al. |
| 5,150,365 A | 9/1992 | Hirata et al. | 5,459,459 A | 10/1995 | Lee, Jr. |
| 5,155,466 A | 10/1992 | Go | 5,461,671 A | 10/1995 | Sakuragi et al. |
| 5,157,711 A | 10/1992 | Shimanuki | 5,463,616 A | 10/1995 | Kruse et al. |
| 5,161,021 A | 11/1992 | Tsai | 5,469,150 A | 11/1995 | Sitte |
| 5,175,764 A | 12/1992 | Patel et al. | 5,471,190 A | 11/1995 | Zimmermann |
| 5,181,240 A | 1/1993 | Sakuragi et al. | 5,475,363 A | 12/1995 | Suzuki et al. |
| 5,192,231 A | 3/1993 | Dolin, Jr. | 5,475,687 A | 12/1995 | Markkula, Jr. et al. |
| 5,198,796 A | 3/1993 | Hessling, Jr. | 5,477,091 A | 12/1995 | Fiorina et al. |
| 5,210,518 A | 5/1993 | Graham et al. | 5,479,447 A | 12/1995 | Chow et al. |
| 5,210,519 A | 5/1993 | Moore | 5,483,230 A | 1/1996 | Mueller |
| 5,210,788 A | 5/1993 | Nilssen | 5,483,574 A | 1/1996 | Yuyama |
| 5,216,704 A | 6/1993 | Williams et al. | 5,483,656 A | 1/1996 | Oprescu et al. |
| 5,220,561 A | 6/1993 | Nuhn et al. | 5,491,402 A | 2/1996 | Small |
| 5,220,597 A | 6/1993 | Horiuchi | 5,491,463 A | 2/1996 | Sargeant et al. |
| 5,224,154 A | 6/1993 | Aldridge et al. | 5,504,454 A | 4/1996 | Daggett et al. |
| 5,241,283 A | 8/1993 | Sutterlin | 5,513,251 A | 4/1996 | Rochkind et al. |
| 5,247,347 A | 9/1993 | Litteral et al. | 5,517,172 A | 5/1996 | Chiu |
| 5,255,267 A | 10/1993 | Hansen et al. | 5,519,731 A | 5/1996 | Cioffi |
| 5,257,006 A | 10/1993 | Graham et al. | 5,521,491 A | 5/1996 | Najam |
| 5,264,823 A | 11/1993 | Stevens | 5,525,962 A | 6/1996 | Tice |
| 5,265,154 A | 11/1993 | Schotz | 5,528,089 A | 6/1996 | Guiset et al. |
| 5,268,676 A | 12/1993 | Asprey et al. | 5,530,737 A | 6/1996 | Bartholomew et al. |
| 5,274,631 A | 12/1993 | Bhardwaj | 5,530,748 A | 6/1996 | Ohmori |
| 5,283,637 A | 2/1994 | Goolcharan | 5,533,101 A | 7/1996 | Miyagawa |
| 5,283,825 A | 2/1994 | Druckman et al. | 5,534,912 A | 7/1996 | Kostreski |
| 5,285,477 A | 2/1994 | Leonowich | 5,535,336 A | 7/1996 | Smith et al. |
| 5,289,359 A | 2/1994 | Ziermann | 5,539,805 A | 7/1996 | Bushue et al. |
| 5,289,476 A | 2/1994 | Johnson et al. | 5,544,243 A | 8/1996 | Papadopoulos |
| 5,311,114 A | 5/1994 | Sambamurthy et al. | 5,546,385 A | 8/1996 | Caspi et al. |
| 5,311,518 A | 5/1994 | Takato et al. | 5,548,592 A | 8/1996 | Komarek et al. |
| 5,311,593 A | 5/1994 | Carmi | 5,548,614 A | 8/1996 | Stoll et al. |
| 5,319,571 A | 6/1994 | Langer et al. | 5,550,836 A | 8/1996 | Albrecht et al. |
| 5,319,634 A | 6/1994 | Bartholomew et al. | 5,550,900 A | 8/1996 | Ensor et al. |
| 5,323,461 A | 6/1994 | Rosenbaum et al. | 5,553,063 A | 9/1996 | Dickson |
| 5,334,975 A | 8/1994 | Wachob et al. | 5,553,138 A | 9/1996 | Heald et al. |
| 5,341,370 A | 8/1994 | Nuhn et al. | 5,557,612 A | 9/1996 | Bingham |
| 5,341,415 A | 8/1994 | Baran | 5,559,377 A | 9/1996 | Abraham |
| 5,343,240 A | 8/1994 | Yu | 5,563,515 A | 10/1996 | Kako |
| 5,343,514 A | 8/1994 | Snyder | 5,566,233 A | 10/1996 | Liu |
| 5,345,437 A | 9/1994 | Ogawa | 5,568,547 A | 10/1996 | Nishimura |
| 5,347,549 A | 9/1994 | Baumann | 5,570,085 A | 10/1996 | Bertsch |
| 5,351,272 A | 9/1994 | Abraham | 5,572,182 A | 11/1996 | De Pinho Filho et al. |
| 5,352,957 A | 10/1994 | Werner | 5,574,748 A | 11/1996 | Vander Mey et al. |
| 5,353,334 A | 10/1994 | O'Sullivan | 5,579,221 A | 11/1996 | Mun |
| 5,353,409 A | 10/1994 | Asprey et al. | 5,579,335 A | 11/1996 | Sutterlin et al. |
| 5,355,114 A | 10/1994 | Sutterlin et al. | 5,579,486 A | 11/1996 | Oprescu et al. |
| 5,356,311 A | 10/1994 | Liu | 5,581,555 A | 12/1996 | Dubberly et al. |
| 5,363,432 A | 11/1994 | Martin et al. | 5,581,801 A | 12/1996 | Spriester et al. |
| 5,368,041 A | 11/1994 | Shambroom | 5,583,934 A | 12/1996 | Zhou |
| 5,369,356 A | 11/1994 | Kinney et al. | 5,587,692 A | 12/1996 | Graham et al. |
| 5,375,051 A | 12/1994 | Decker et al. | 5,592,482 A | 1/1997 | Abraham |
| 5,379,005 A | 1/1995 | Aden et al. | 5,592,540 A | 1/1997 | Beveridge |
| 5,381,462 A | 1/1995 | Larson et al. | 5,594,789 A | 1/1997 | Seazholtz et al. |
| 5,381,804 A | 1/1995 | Shambroom | 5,596,631 A | 1/1997 | Chen |
| 5,391,932 A | 2/1995 | Small et al. | 5,599,206 A | 2/1997 | Slack et al. |
| 5,396,636 A | 3/1995 | Gallagher et al. | 5,604,737 A | 2/1997 | Iwami et al. |
| 5,400,246 A | 3/1995 | Wilson et al. | 5,604,791 A | 2/1997 | Lee |
| 5,404,127 A | 4/1995 | Lee et al. | 5,608,447 A | 3/1997 | Farry et al. |
| 5,406,260 A | 4/1995 | Cummings et al. | 5,608,725 A | 3/1997 | Grube et al. |
| 5,408,260 A | 4/1995 | Arnon | 5,608,792 A | 3/1997 | Laidler |
| 5,410,343 A | 4/1995 | Coddington et al. | 5,610,552 A | 3/1997 | Schlesinger et al. |
| 5,410,535 A | 4/1995 | Yang et al. | 5,610,916 A | 3/1997 | Kostreski et al. |
| 5,414,708 A | 5/1995 | Webber | 5,610,922 A | 3/1997 | Balatoni |
| 5,420,578 A | 5/1995 | O'Brien et al. | 5,613,130 A | 3/1997 | Teng et al. |
| 5,420,886 A | 5/1995 | Ohmori | 5,613,190 A | 3/1997 | Hylton |
| 5,421,030 A | 5/1995 | Baran | 5,613,191 A | 3/1997 | Hylton et al. |
| 5,422,519 A | 6/1995 | Russell | 5,614,811 A | 3/1997 | Sagalovich et al. |
| 5,424,710 A | 6/1995 | Baumann | 5,619,252 A | 4/1997 | Nakano |
| 5,425,089 A | 6/1995 | Chan et al. | 5,619,505 A | 4/1997 | Grube et al. |
| 5,428,608 A | 6/1995 | Freeman et al. | 5,621,455 A | 4/1997 | Rogers et al. |
| 5,428,682 A | 6/1995 | Apfel | 5,623,537 A | 4/1997 | Ensor et al. |
| 5,438,678 A | 8/1995 | Smith | 5,625,651 A | 4/1997 | Cioffi |

| | | | | | |
|---|---|---|---|---|---|
| 5,625,677 A | 4/1997 | Feiertag et al. | 5,822,678 A | 10/1998 | Evanyk |
| 5,625,863 A | 4/1997 | Abraham | 5,826,196 A | 10/1998 | Cuthrell |
| 5,627,501 A | 5/1997 | Biran et al. | 5,828,293 A | 10/1998 | Rickard |
| 5,627,827 A | 5/1997 | Dale et al. | 5,828,558 A | 10/1998 | Korcharz et al. |
| 5,635,896 A | 6/1997 | Tinsley et al. | 5,828,821 A | 10/1998 | Hoshina et al. |
| 5,644,286 A | 7/1997 | Brosh et al. | 5,832,057 A | 11/1998 | Furman |
| 5,646,983 A | 7/1997 | Suffern et al. | 5,832,364 A | 11/1998 | Gustafson |
| 5,651,696 A | 7/1997 | Jennison | 5,835,005 A | 11/1998 | Furukawa et al. |
| 5,652,893 A | 7/1997 | Ben-Meir et al. | 5,838,777 A | 11/1998 | Chang et al. |
| 5,659,608 A | 8/1997 | Stiefel | 5,838,989 A | 11/1998 | Hutchison et al. |
| 5,668,814 A | 9/1997 | Balatoni | 5,841,360 A | 11/1998 | Binder |
| 5,668,857 A | 9/1997 | McHale | 5,841,840 A | 11/1998 | Smith et al. |
| 5,671,220 A | 9/1997 | Tonomura | 5,841,841 A | 11/1998 | Dodds et al. |
| 5,673,290 A | 9/1997 | Cioffi | 5,842,032 A | 11/1998 | Bertsch |
| 5,675,375 A | 10/1997 | Riffee | 5,842,111 A | 11/1998 | Byers |
| 5,675,813 A | 10/1997 | Holmdahl | 5,844,789 A | 12/1998 | Wynn |
| 5,680,397 A | 10/1997 | Christensen et al. | 5,844,888 A | 12/1998 | Markkula et al. |
| 5,682,423 A | 10/1997 | Walker | 5,844,949 A | 12/1998 | Hershey et al. |
| 5,684,826 A | 11/1997 | Ratner | 5,845,190 A | 12/1998 | Bushue et al. |
| 5,689,230 A | 11/1997 | Merwin et al. | 5,848,054 A | 12/1998 | Mosebrook et al. |
| 5,689,242 A | 11/1997 | Sims et al. | 5,848,150 A | 12/1998 | Bingel |
| 5,691,691 A | 11/1997 | Merwin et al. | 5,848,376 A | 12/1998 | Steiner et al. |
| 5,694,108 A | 12/1997 | Shuey | D404,721 S | 1/1999 | Tennefoss et al. |
| 5,696,790 A | 12/1997 | Graham et al. | 5,859,584 A | 1/1999 | Counsell et al. |
| 5,696,861 A | 12/1997 | Schimmeyer et al. | 5,859,596 A | 1/1999 | McRae |
| 5,699,276 A | 12/1997 | Roos | 5,864,284 A | 1/1999 | Sanderson |
| 5,699,413 A | 12/1997 | Sridhar | D405,422 S | 2/1999 | Tennefoss et al. |
| 5,705,974 A | 1/1998 | Patel et al. | 5,878,047 A | 3/1999 | Ganek et al. |
| 5,706,007 A | 1/1998 | Fragnito et al. | 5,878,133 A | 3/1999 | Zhou et al. |
| 5,706,157 A | 1/1998 | Galecki et al. | 5,884,086 A | 3/1999 | Amoni et al. |
| 5,708,701 A | 1/1998 | Houvig et al. | 5,886,732 A | 3/1999 | Humpleman |
| 5,712,614 A | 1/1998 | Patel et al. | 5,889,856 A | 3/1999 | O'Toole et al. |
| 5,712,977 A | 1/1998 | Glad et al. | 5,892,430 A | 4/1999 | Wiesman et al. |
| 5,727,025 A | 3/1998 | Maryanka | 5,892,764 A | 4/1999 | Riemann et al. |
| 5,729,824 A | 3/1998 | O'Neill et al. | 5,892,792 A | 4/1999 | Walley |
| 5,731,664 A | 3/1998 | Posa | 5,892,795 A | 4/1999 | Paret |
| 5,734,658 A | 3/1998 | Rall et al. | 5,896,443 A | 4/1999 | Dichter |
| 5,736,965 A | 4/1998 | Mosebrook et al. | 5,896,556 A | 4/1999 | Moreland et al. |
| 5,742,527 A | 4/1998 | Rybicki et al. | 5,898,761 A | 4/1999 | McHale et al. |
| 5,742,596 A | 4/1998 | Baratz et al. | 5,903,213 A | 5/1999 | Hodge et al. |
| 5,748,634 A | 5/1998 | Sokol et al. | 5,903,643 A | 5/1999 | Bruhnke |
| 5,748,671 A | 5/1998 | Sutterlin et al. | 5,905,442 A | 5/1999 | Mosebrook et al. |
| 5,751,701 A | 5/1998 | Langberg et al. | 5,905,781 A | 5/1999 | McHale et al. |
| 5,754,539 A | 5/1998 | Metz et al. | 5,905,786 A | 5/1999 | Hoopes |
| 5,756,280 A | 5/1998 | Soora et al. | 5,910,970 A | 6/1999 | Lu |
| 5,757,803 A | 5/1998 | Russell et al. | 5,911,119 A | 6/1999 | Bartholomew et al. |
| 5,757,936 A | 5/1998 | Lee | 5,912,895 A | 6/1999 | Terry et al. |
| 5,764,743 A | 6/1998 | Goedken et al. | 5,917,624 A | 6/1999 | Wagner |
| 5,768,279 A | 6/1998 | Barn et al. | 5,917,814 A | 6/1999 | Balatoni |
| 5,771,236 A | 6/1998 | Sansom et al. | 5,929,749 A | 7/1999 | Slonim et al. |
| 5,774,526 A | 6/1998 | Propp et al. | 5,929,896 A | 7/1999 | Goodman |
| 5,774,789 A | 6/1998 | van der Kaay et al. | 5,930,340 A | 7/1999 | Bell |
| 5,777,769 A | 7/1998 | Coutinho | 5,933,073 A | 8/1999 | Shuey |
| 5,778,303 A | 7/1998 | Shinozaki et al. | 5,936,963 A | 8/1999 | Saussy |
| 5,781,617 A | 7/1998 | McHale et al. | 5,937,055 A | 8/1999 | Kaplan |
| 5,781,844 A | 7/1998 | Spriester et al. | 5,937,342 A | 8/1999 | Kline |
| 5,787,115 A | 7/1998 | Turnbull et al. | 5,938,757 A | 8/1999 | Bertsch |
| 5,790,548 A | 8/1998 | Sistanizadeh et al. | 5,939,801 A | 8/1999 | Bouffard et al. |
| 5,793,413 A | 8/1998 | Hylton et al. | 5,940,400 A | 8/1999 | Eastmond et al. |
| 5,796,739 A | 8/1998 | Kim | 5,940,479 A | 8/1999 | Guy et al. |
| 5,796,965 A | 8/1998 | Choi et al. | 5,940,738 A | 8/1999 | Rao |
| 5,799,069 A | 8/1998 | Weston et al. | 5,943,404 A | 8/1999 | Sansom et al. |
| 5,799,196 A | 8/1998 | Flannery | 5,944,831 A | 8/1999 | Pate et al. |
| 5,801,635 A | 9/1998 | Price | 5,949,473 A | 9/1999 | Goodman |
| 5,802,173 A | 9/1998 | Hamilton-Piercy et al. | 5,949,476 A | 9/1999 | Pocock et al. |
| 5,802,283 A | 9/1998 | Grady et al. | 5,956,323 A | 9/1999 | Bowie |
| 5,805,053 A | 9/1998 | Patel et al. | 5,960,066 A | 9/1999 | Hartmann et al. |
| 5,805,591 A | 9/1998 | Naboulsi et al. | 5,960,208 A | 9/1999 | Obata et al. |
| 5,805,597 A | 9/1998 | Edem | 5,963,539 A | 10/1999 | Webber, Jr. et al. |
| 5,805,806 A | 9/1998 | McArthur | 5,963,595 A | 10/1999 | Graham et al. |
| 5,809,033 A | 9/1998 | Turner et al. | 5,963,844 A | 10/1999 | Dail |
| 5,812,786 A | 9/1998 | Seazholtz et al. | 5,970,127 A | 10/1999 | Smith et al. |
| 5,815,086 A | 9/1998 | Ivie et al. | 5,973,942 A | 10/1999 | Nelson et al. |
| 5,815,681 A | 9/1998 | Kikinis | 5,974,553 A | 10/1999 | Gandar |
| 5,818,127 A | 10/1998 | Abraham | 5,977,650 A | 11/1999 | Rickard et al. |
| 5,818,710 A | 10/1998 | LeVan Suu | 5,977,913 A | 11/1999 | Christ |
| 5,818,821 A | 10/1998 | Schurig | 5,982,052 A | 11/1999 | Sosnowski |
| 5,822,374 A | 10/1998 | Levin | 5,982,784 A | 11/1999 | Bell |
| 5,822,677 A | 10/1998 | Peyrovian | 5,982,854 A | 11/1999 | Ehreth |

| | | | | | | |
|---|---|---|---|---|---|---|
| 5,987,061 A | 11/1999 | Chen | | 6,130,893 A | 10/2000 | Whittaker et al. |
| 5,990,577 A | 11/1999 | Kamioka et al. | | 6,130,896 A | 10/2000 | Lueker et al. |
| 5,991,311 A | 11/1999 | Long et al. | | 6,134,235 A | 10/2000 | Goldman et al. |
| 5,991,885 A | 11/1999 | Chang et al. | | 6,134,308 A | 10/2000 | Fallon et al. |
| 5,994,998 A | 11/1999 | Fisher et al. | | 6,137,865 A | 10/2000 | Ripy |
| 5,995,598 A | 11/1999 | Berstis | | 6,137,866 A | 10/2000 | Staber et al. |
| 5,999,518 A | 12/1999 | Nattkemper et al. | | 6,141,330 A | 10/2000 | Akers |
| 6,002,682 A | 12/1999 | Bellenger et al. | | 6,141,339 A | 10/2000 | Kaplan et al. |
| 6,002,722 A | 12/1999 | Wu | | 6,141,356 A | 10/2000 | Gorman |
| 6,005,476 A | 12/1999 | Valiulis | | 6,141,763 A | 10/2000 | Smith et al. |
| 6,005,873 A | 12/1999 | Amit | | 6,144,292 A | 11/2000 | Brown |
| 6,009,465 A | 12/1999 | Decker et al. | | 6,144,399 A | 11/2000 | Manchester et al. |
| 6,009,479 A | 12/1999 | Jeffries | | 6,148,006 A | 11/2000 | Dyke et al. |
| 6,011,781 A | 1/2000 | Bell | | 6,151,480 A | 11/2000 | Fischer et al. |
| 6,011,794 A | 1/2000 | Mordowitz et al. | | 6,154,465 A | 11/2000 | Pickett |
| 6,011,910 A | 1/2000 | Chau et al. | | 6,157,645 A | 12/2000 | Shobatake |
| 6,014,386 A | 1/2000 | Abraham | | 6,157,716 A | 12/2000 | Ortel |
| 6,014,431 A | 1/2000 | McHale et al. | | 6,160,880 A | 12/2000 | Allen |
| 6,016,519 A | 1/2000 | Chida et al. | | 6,166,496 A | 12/2000 | Lys et al. |
| 6,021,158 A | 2/2000 | Schurr et al. | | 6,167,043 A | 12/2000 | Frantz |
| 6,025,945 A | 2/2000 | Nyu et al. | | 6,167,120 A | 12/2000 | Kikinis |
| 6,026,078 A | 2/2000 | Smith | | 6,169,795 B1 | 1/2001 | Dunn et al. |
| 6,026,150 A | 2/2000 | Frank | | 6,175,556 B1 | 1/2001 | Allen, Jr. et al. |
| 6,026,160 A | 2/2000 | Staber et al. | | 6,175,860 B1 | 1/2001 | Gaucher |
| 6,028,867 A | 2/2000 | Rawson et al. | | 6,177,884 B1 | 1/2001 | Hunt et al. |
| 6,029,047 A | 2/2000 | Ishida et al. | | 6,178,161 B1 | 1/2001 | Terry |
| 6,033,101 A | 3/2000 | Reddick et al. | | 6,178,514 B1 | 1/2001 | Wood |
| 6,034,988 A | 3/2000 | VanderMey et al. | | 6,181,775 B1 | 1/2001 | Bella |
| 6,037,678 A | 3/2000 | Rickard | | 6,181,783 B1 | 1/2001 | Goodman |
| 6,038,300 A | 3/2000 | Hartmann et al. | | 6,185,284 B1 | 2/2001 | Goodman |
| 6,038,425 A | 3/2000 | Jeffrey | | 6,186,826 B1 | 2/2001 | Weikle |
| 6,038,457 A | 3/2000 | Barkat | | 6,188,314 B1 | 2/2001 | Wallace et al. |
| 6,047,055 A | 4/2000 | Carkner et al. | | 6,188,557 B1 | 2/2001 | Chaundrhy |
| 6,049,471 A | 4/2000 | Korcharz et al. | | 6,192,399 B1 | 2/2001 | Goodman |
| 6,049,531 A | 4/2000 | Roy | | 6,195,706 B1 | 2/2001 | Scott |
| 6,049,881 A | 4/2000 | Massman et al. | | 6,202,211 B1 | 3/2001 | Williams, Jr. |
| 6,052,380 A | 4/2000 | Bell | | 6,205,202 B1 | 3/2001 | Yoshida et al. |
| 6,055,268 A | 4/2000 | Timm et al. | | 6,208,637 B1 | 3/2001 | Eames |
| 6,055,435 A | 4/2000 | Smith et al. | | 6,212,204 B1 | 4/2001 | Depue |
| 6,055,633 A | 4/2000 | Schrier et al. | | 6,212,227 B1 | 4/2001 | Ko et al. |
| 6,061,357 A | 5/2000 | Olshansky et al. | | 6,212,274 B1 | 4/2001 | Ninh |
| 6,061,392 A | 5/2000 | Bremer et al. | | 6,212,658 B1 | 4/2001 | Le Van Suu |
| 6,064,422 A | 5/2000 | Goolcharan et al. | | 6,215,789 B1 | 4/2001 | Keenan et al. |
| 6,069,588 A | 5/2000 | O'Neill | | 6,215,855 B1 | 4/2001 | Schneider |
| 6,069,879 A | 5/2000 | Chatter | | 6,216,160 B1 | 4/2001 | Dichter |
| 6,069,899 A | 5/2000 | Foley | | 6,218,930 B1 | 4/2001 | Katzenberg et al. |
| 6,072,779 A | 6/2000 | Tzannes et al. | | 6,219,409 B1 | 4/2001 | Smith et al. |
| 6,072,810 A | 6/2000 | Van der Putten et al. | | 6,227,499 B1 | 5/2001 | Jennison et al. |
| 6,075,784 A | 6/2000 | Frankel et al. | | 6,229,433 B1 | 5/2001 | Rye et al. |
| 6,081,519 A | 6/2000 | Petler | | 6,229,818 B1 | 5/2001 | Bell |
| 6,081,533 A | 6/2000 | Laubach et al. | | 6,236,653 B1 | 5/2001 | Dalton et al. |
| 6,087,835 A | 7/2000 | Haneda | | 6,236,664 B1 | 5/2001 | Erreygers |
| 6,087,860 A | 7/2000 | Liu et al. | | 6,236,718 B1 | 5/2001 | Goodman |
| 6,088,368 A | 7/2000 | Rubinstain et al. | | 6,239,672 B1 | 5/2001 | Lutz, Jr. et al. |
| 6,094,441 A | 7/2000 | Jung et al. | | 6,240,091 B1 | 5/2001 | Ginzboorg et al. |
| 6,095,867 A | 8/2000 | Brandt et al. | | 6,240,166 B1 | 5/2001 | Collin et al. |
| 6,097,761 A | 8/2000 | Buhring et al. | | 6,243,394 B1 | 6/2001 | Deng |
| 6,097,801 A | 8/2000 | Williams et al. | | 6,243,413 B1 | 6/2001 | Beukema |
| 6,101,341 A | 8/2000 | Manabe | | 6,243,446 B1 | 6/2001 | Goodman |
| 6,104,707 A | 8/2000 | Abraham | | 6,243,571 B1 | 6/2001 | Bullock et al. |
| 6,107,656 A | 8/2000 | Igarashi | | 6,243,818 B1 | 6/2001 | Schwan et al. |
| 6,107,912 A | 8/2000 | Bullock et al. | | 6,246,695 B1 | 6/2001 | Seazholtz et al. |
| 6,108,330 A | 8/2000 | Bhatia et al. | | 6,246,716 B1 | 6/2001 | Schneider |
| 6,109,959 A | 8/2000 | Burlinson et al. | | 6,246,748 B1 | 6/2001 | Yano |
| 6,111,595 A | 8/2000 | Hertrich | | 6,249,213 B1 | 6/2001 | Horne |
| 6,111,764 A | 8/2000 | Atou et al. | | 6,252,754 B1 | 6/2001 | Chaundhry |
| 6,111,936 A | 8/2000 | Bremer | | 6,252,755 B1 | 6/2001 | Willer |
| 6,114,632 A | 9/2000 | Planas, Sr. et al. | | 6,252,957 B1 | 6/2001 | Jauregui et al. |
| 6,114,970 A | 9/2000 | Kirson et al. | | 6,256,518 B1 | 7/2001 | Buhrmann |
| 6,115,468 A | 9/2000 | De Nicolo | | 6,259,676 B1 | 7/2001 | Kellock et al. |
| 6,115,755 A | 9/2000 | Krishan | | 6,259,775 B1 | 7/2001 | Alpert et al. |
| 6,115,822 A | 9/2000 | Kim et al. | | 6,266,348 B1 | 7/2001 | Gross et al. |
| 6,123,577 A | 9/2000 | Contois et al. | | 6,272,219 B1 | 8/2001 | De Bruycker et al. |
| 6,125,448 A | 9/2000 | Schwan et al. | | 6,278,769 B1 | 8/2001 | Bella |
| 6,126,463 A | 10/2000 | Okazaki et al. | | 6,281,784 B1 | 8/2001 | Redgate et al. |
| 6,127,925 A | 10/2000 | Bonsignore et al. | | 6,282,075 B1 | 8/2001 | Chaundhry |
| 6,128,471 A | 10/2000 | Quelch et al. | | 6,282,238 B1 | 8/2001 | Landry |
| 6,128,743 A | 10/2000 | Rothenbaum | | 6,282,277 B1 | 8/2001 | DeBalko |
| 6,130,879 A | 10/2000 | Liu | | 6,283,789 B1 | 9/2001 | Tsai |

| | | |
|---|---|---|
| 6,285,754 B1 | 9/2001 | Sun et al. |
| 6,286,049 B1 | 9/2001 | Rajakarunanayake et al. |
| 6,288,334 B1 | 9/2001 | Hennum |
| 6,288,631 B1 | 9/2001 | Shinozaki et al. |
| 6,290,141 B1 | 9/2001 | Park et al. |
| 6,292,467 B1 | 9/2001 | Keller |
| 6,292,517 B1 | 9/2001 | Jeffress et al. |
| 6,295,356 B1 | 9/2001 | De Nicolo |
| 6,298,037 B1 | 10/2001 | Sharifi |
| 6,301,337 B1 | 10/2001 | Scholtz et al. |
| 6,301,527 B1 | 10/2001 | Butland et al. |
| 6,308,215 B1 | 10/2001 | Kolbet et al. |
| 6,308,240 B1 | 10/2001 | De Nicolo |
| 6,310,286 B1 | 10/2001 | Troxel et al. |
| 6,310,781 B1 | 10/2001 | Karam |
| 6,310,894 B1 | 10/2001 | Counterman |
| 6,310,909 B1 | 10/2001 | Jones |
| 6,314,102 B1 | 11/2001 | Czerwiec et al. |
| 6,317,839 B1 | 11/2001 | Wells |
| 6,317,884 B1 | 11/2001 | Eames et al. |
| 6,320,494 B1 | 11/2001 | Bartels et al. |
| 6,320,866 B2 | 11/2001 | Wolf et al. |
| 6,320,900 B1 | 11/2001 | Liu |
| 6,324,268 B1 | 11/2001 | Balachandran et al. |
| 6,329,937 B1 | 12/2001 | Harman |
| 6,346,964 B1 | 2/2002 | Rogers et al. |
| 6,348,874 B1 | 2/2002 | Cole et al. |
| 6,349,133 B1 | 2/2002 | Matthews et al. |
| 6,353,629 B1 | 3/2002 | Pal |
| 6,356,562 B1 | 3/2002 | Bamba |
| 6,357,011 B2 | 3/2002 | Gilbert |
| 6,359,906 B1 | 3/2002 | Dyke et al. |
| 6,362,610 B1 | 3/2002 | Yang |
| 6,363,066 B1 | 3/2002 | Frimodig |
| 6,364,535 B1 | 4/2002 | Coffey |
| 6,366,143 B1 | 4/2002 | Liu et al. |
| 6,370,149 B1 | 4/2002 | Gorman et al. |
| 6,377,163 B1 | 4/2002 | Deller et al. |
| 6,377,874 B1 | 4/2002 | Ykema |
| 6,383,076 B1 | 5/2002 | Tiedeken |
| 6,385,024 B1 | 5/2002 | Olson |
| 6,385,203 B2 | 5/2002 | McHale et al. |
| 6,388,990 B1 | 5/2002 | Wetzel |
| 6,389,110 B1 | 5/2002 | Fischer et al. |
| 6,389,125 B1 | 5/2002 | Ubowski |
| 6,389,139 B1 | 5/2002 | Curtis et al. |
| 6,393,050 B1 | 5/2002 | Liu |
| 6,393,607 B1 | 5/2002 | Hughes et al. |
| 6,396,391 B1 | 5/2002 | Binder |
| 6,396,393 B2 | 5/2002 | Yuasa |
| 6,396,837 B1 | 5/2002 | Wang et al. |
| 6,404,773 B1 | 6/2002 | Williams et al. |
| 6,404,861 B1 | 6/2002 | Cohen et al. |
| 6,414,952 B2 | 7/2002 | Foley |
| 6,417,762 B1 | 7/2002 | Comer |
| 6,424,661 B1 | 7/2002 | Bentley |
| 6,427,237 B1 | 7/2002 | Aranguren et al. |
| 6,430,199 B1 | 8/2002 | Kerpez |
| 6,433,672 B1 | 8/2002 | Shirmard |
| 6,434,123 B1 | 8/2002 | Park |
| 6,438,109 B1 | 8/2002 | Karaoguz et al. |
| 6,441,723 B1 | 8/2002 | Mansfield, Jr. et al. |
| 6,442,129 B1 | 8/2002 | Yonge, III et al. |
| 6,442,195 B1 | 8/2002 | Liu et al. |
| 6,445,087 B1 | 9/2002 | Wang et al. |
| 6,448,899 B1 | 9/2002 | Thompson |
| 6,449,318 B1 | 9/2002 | Rumbaugh |
| 6,449,348 B1 | 9/2002 | Lamb et al. |
| 6,452,923 B1 | 9/2002 | Gerszberg et al. |
| 6,456,714 B2 | 9/2002 | Shima et al. |
| 6,459,175 B1 | 10/2002 | Potega |
| 6,459,275 B1 | 10/2002 | Ewalt et al. |
| 6,459,692 B1 | 10/2002 | Ben-Michael et al. |
| 6,470,053 B1 | 10/2002 | Liu |
| 6,470,401 B1 | 10/2002 | Peterson |
| 6,473,495 B1 | 10/2002 | Willer |
| 6,473,608 B1 | 10/2002 | Lehr et al. |
| 6,477,457 B1 | 11/2002 | Fendt et al. |
| 6,477,595 B1 | 11/2002 | Cohen et al. |
| 6,480,122 B1 | 11/2002 | Oddy et al. |
| 6,480,510 B1 | 11/2002 | Binder |
| 6,481,013 B1 | 11/2002 | Dinwiddie et al. |
| 6,483,902 B1 | 11/2002 | Stewart et al. |
| 6,483,903 B1 | 11/2002 | Itay et al. |
| 6,490,273 B1 | 12/2002 | DeNap et al. |
| 6,493,325 B1 | 12/2002 | Hjalmtysson et al. |
| 6,493,875 B1 | 12/2002 | Eames et al. |
| 6,496,103 B1 | 12/2002 | Weiss et al. |
| 6,496,104 B2 | 12/2002 | Kline |
| 6,501,389 B1 | 12/2002 | Aguirre |
| 6,507,647 B1 | 1/2003 | Mandalia |
| 6,510,204 B2 | 1/2003 | De Clercq et al. |
| 6,518,724 B2 | 2/2003 | Janik |
| 6,519,291 B1 | 2/2003 | Dagdeviren et al. |
| 6,522,352 B1 | 2/2003 | Strandwitz et al. |
| 6,522,515 B1 | 2/2003 | Whitney |
| 6,522,662 B1 | 2/2003 | Liu |
| 6,522,728 B1 | 2/2003 | Willer |
| 6,522,730 B1 | 2/2003 | Timm et al. |
| 6,522,731 B2 | 2/2003 | Matsumoto |
| 6,526,516 B1 | 2/2003 | Ishikawa et al. |
| 6,526,581 B1 | 2/2003 | Edson |
| 6,529,443 B2 | 3/2003 | Downey, Jr. et al. |
| 6,532,279 B1 | 3/2003 | Goodman |
| 6,532,280 B1 | 3/2003 | McDonald |
| 6,535,110 B1 | 3/2003 | Arora et al. |
| 6,535,580 B1 | 3/2003 | Strauss et al. |
| 6,535,587 B1 | 3/2003 | Kobayashi |
| 6,535,983 B1 | 3/2003 | McCormack et al. |
| 6,539,011 B1 | 3/2003 | Keenan et al. |
| 6,539,484 B1 | 3/2003 | Cruz |
| 6,541,878 B1 | 4/2003 | Diab |
| 6,542,465 B1 | 4/2003 | Wang |
| 6,542,585 B2 | 4/2003 | Goodman |
| 6,546,024 B1 | 4/2003 | Sharper et al. |
| 6,546,098 B1 | 4/2003 | Henderson |
| 6,546,494 B1 | 4/2003 | Jackson et al. |
| 6,549,616 B1 | 4/2003 | Binder |
| 6,553,076 B1 | 4/2003 | Huang |
| 6,556,097 B2 | 4/2003 | Coffey |
| 6,556,564 B2 | 4/2003 | Rogers |
| 6,556,581 B1 | 4/2003 | He et al. |
| 6,559,757 B1 | 5/2003 | Deller et al. |
| 6,560,319 B1 | 5/2003 | Binder |
| 6,560,333 B1 | 5/2003 | Consiglio et al. |
| 6,563,418 B1 | 5/2003 | Moon |
| 6,563,816 B1 | 5/2003 | Nodoushani et al. |
| 6,567,981 B1 | 5/2003 | Jeffrey |
| 6,570,869 B1 | 5/2003 | Shankar et al. |
| 6,570,890 B1 | 5/2003 | Keenan et al. |
| 6,571,181 B1 | 5/2003 | Rakshani et al. |
| 6,571,305 B1 | 5/2003 | Engler |
| 6,572,384 B1 | 6/2003 | Marchevsky |
| 6,574,237 B1 | 6/2003 | Bullman et al. |
| 6,574,242 B1 | 6/2003 | Keenan et al. |
| 6,574,313 B1 | 6/2003 | Chea, Jr. et al. |
| 6,574,741 B1 | 6/2003 | Fujimori et al. |
| 6,577,230 B1 | 6/2003 | Wendt et al. |
| 6,577,231 B2 | 6/2003 | Litwin, Jr. et al. |
| 6,577,631 B1 | 6/2003 | Keenan et al. |
| 6,577,882 B1 | 6/2003 | Roos |
| 6,580,254 B2 | 6/2003 | Schofield |
| 6,580,710 B1 | 6/2003 | Bowen et al. |
| 6,580,727 B1 | 6/2003 | Yim et al. |
| 6,580,785 B2 | 6/2003 | Bremer et al. |
| 6,583,719 B2 | 6/2003 | Okada et al. |
| 6,584,122 B1 | 6/2003 | Matthews et al. |
| 6,584,148 B1 | 6/2003 | Zitting et al. |
| 6,584,197 B1 | 6/2003 | Boudreaux, Jr. et al. |
| 6,584,519 B1 | 6/2003 | Russell |
| 6,587,454 B1 | 7/2003 | Lamb |
| 6,587,473 B2 | 7/2003 | Terry et al. |
| 6,587,479 B1 | 7/2003 | Bianchi et al. |
| 6,587,560 B1 | 7/2003 | Scott et al. |
| 6,597,732 B1 | 7/2003 | Dowling |
| 6,601,097 B1 | 7/2003 | Cheston et al. |
| 6,603,220 B2 | 8/2003 | Vergnaud |
| 6,603,808 B1 | 8/2003 | Anne et al. |

| Patent | Date | Inventor |
|---|---|---|
| 6,608,264 B1 | 8/2003 | Fouladpour |
| 6,611,537 B1 | 8/2003 | Edens et al. |
| 6,616,005 B1 | 9/2003 | Pereira et al. |
| 6,636,505 B1 | 10/2003 | Wang et al. |
| 6,639,913 B1 | 10/2003 | Frankel et al. |
| 6,640,308 B1 | 10/2003 | Keyghobad et al. |
| 6,643,566 B1 | 11/2003 | Lehr et al. |
| 6,648,308 B2 | 11/2003 | Gunnar Rothoff |
| 6,650,622 B1 | 11/2003 | Austerman, III et al. |
| 6,650,662 B1 | 11/2003 | Arnaud et al. |
| 6,653,932 B1 | 11/2003 | Beamish et al. |
| 6,657,994 B1 | 12/2003 | Rajakarunanayake |
| 6,658,098 B2 | 12/2003 | Lamb et al. |
| 6,658,108 B1 | 12/2003 | Bissell et al. |
| 6,658,109 B1 | 12/2003 | Steinke et al. |
| 6,659,947 B1 | 12/2003 | Carter et al. |
| 6,661,892 B1 | 12/2003 | Fischer |
| 6,665,404 B2 | 12/2003 | Cohen |
| 6,671,360 B2 | 12/2003 | Sumiya et al. |
| 6,674,843 B1 | 1/2004 | Ham |
| 6,674,845 B2 | 1/2004 | Ayoub et al. |
| 6,678,321 B1 | 1/2004 | Graham et al. |
| 6,678,721 B1 | 1/2004 | Bell |
| 6,680,940 B1 | 1/2004 | Lewin et al. |
| 6,681,013 B1 | 1/2004 | Miyamoto |
| 6,686,832 B2 | 2/2004 | Abraham |
| 6,690,677 B1 | 2/2004 | Binder |
| 6,690,792 B1 | 2/2004 | Robinson et al. |
| 6,693,916 B1 | 2/2004 | Chaplik et al. |
| 6,697,358 B2 | 2/2004 | Bernstein |
| 6,700,970 B1 | 3/2004 | Aronson et al. |
| 6,701,406 B1 | 3/2004 | Chang et al. |
| 6,701,443 B1 | 3/2004 | Bell |
| 6,704,414 B2 | 3/2004 | Murakoshi |
| 6,704,824 B1 | 3/2004 | Goodman |
| 6,710,704 B2 | 3/2004 | Fisher et al. |
| 6,711,138 B1 | 3/2004 | Pai et al. |
| 6,711,260 B1 | 3/2004 | Russell et al. |
| 6,714,534 B1 | 3/2004 | Gerszberg et al. |
| 6,715,087 B1 | 3/2004 | Vergnaud et al. |
| 6,721,365 B1 | 4/2004 | Yin et al. |
| 6,721,419 B1 | 4/2004 | Stell et al. |
| 6,721,790 B1 | 4/2004 | Chen |
| 6,724,750 B1 | 4/2004 | Sun |
| 6,725,059 B1 | 4/2004 | Bell |
| 6,731,627 B1 | 5/2004 | Gupta et al. |
| 6,732,315 B2 | 5/2004 | Yagil et al. |
| 6,732,368 B1 | 5/2004 | Michael et al. |
| 6,735,217 B1 | 5/2004 | Webber, Jr. et al. |
| 6,738,382 B1 | 5/2004 | West et al. |
| 6,738,470 B1 | 5/2004 | Aronovitz |
| 6,738,597 B1 | 5/2004 | Jeung et al. |
| 6,738,641 B1 | 5/2004 | Elsasser |
| 6,744,883 B1 | 6/2004 | Bingel et al. |
| 6,747,859 B2 | 6/2004 | Walbeck et al. |
| 6,747,995 B1 | 6/2004 | Brown et al. |
| 6,747,996 B2 | 6/2004 | Holloway et al. |
| 6,748,078 B1 | 6/2004 | Posthuma |
| 6,754,186 B1 | 6/2004 | Bullman |
| 6,754,235 B2 | 6/2004 | Van Der Putten et al. |
| 6,755,575 B2 | 6/2004 | Kronlund et al. |
| 6,757,382 B1 | 6/2004 | Wilkes, Jr. et al. |
| 6,759,946 B2 | 7/2004 | Sahinoglu et al. |
| 6,760,384 B1 | 7/2004 | Garreau et al. |
| 6,762,675 B1 | 7/2004 | Cafiero et al. |
| 6,763,097 B1 | 7/2004 | Vitenberg |
| 6,763,109 B1 | 7/2004 | Hoskins |
| 6,764,343 B2 | 7/2004 | Ferentz |
| 6,771,750 B1 | 8/2004 | Nayler et al. |
| 6,771,773 B1 | 8/2004 | Hanrieder et al. |
| 6,771,774 B1 | 8/2004 | Phan et al. |
| 6,773,632 B1 | 8/2004 | Marshall et al. |
| 6,775,299 B1 | 8/2004 | Olson et al. |
| 6,778,549 B1 | 8/2004 | Keller |
| 6,778,646 B1 | 8/2004 | Sun |
| 6,778,817 B1 | 8/2004 | Bullock et al. |
| 6,785,296 B1 | 8/2004 | Bell |
| 6,788,782 B1 | 9/2004 | Fotsch et al. |
| 6,792,323 B2 | 9/2004 | Krzyzanowski et al. |
| 6,795,539 B2 | 9/2004 | Culli et al. |
| 6,798,767 B1 | 9/2004 | Alexander et al. |
| 6,800,957 B2 | 10/2004 | Nerone et al. |
| 6,804,351 B1 | 10/2004 | Karam |
| 6,804,828 B1 | 10/2004 | Shibata |
| 6,813,343 B1 | 11/2004 | Vitenberg |
| 6,815,844 B1 | 11/2004 | Kovarik |
| 6,816,512 B2 | 11/2004 | Lazarus et al. |
| 6,819,760 B1 | 11/2004 | Nayler |
| 6,823,047 B1 | 11/2004 | Cruickshank |
| 6,825,672 B1 | 11/2004 | Lo et al. |
| 6,826,174 B1 | 11/2004 | Erekson et al. |
| 6,831,921 B2 | 12/2004 | Higgins |
| 6,831,975 B1 | 12/2004 | Easwaran et al. |
| 6,831,976 B1 | 12/2004 | Comerford et al. |
| 6,834,057 B1 | 12/2004 | Rabenko et al. |
| 6,836,546 B1 | 12/2004 | Willer |
| 6,839,345 B2 | 1/2005 | Lu et al. |
| 6,841,979 B2 | 1/2005 | Berson et al. |
| 6,842,426 B2 | 1/2005 | Bogardus et al. |
| 6,842,459 B1 | 1/2005 | Binder |
| 6,844,810 B2 | 1/2005 | Cern |
| 6,847,718 B1 | 1/2005 | Hiraoka |
| 6,853,724 B2 | 2/2005 | Wang |
| 6,854,059 B2 | 2/2005 | Gardner |
| 6,854,895 B2 | 2/2005 | Coffey et al. |
| 6,856,799 B1 | 2/2005 | Ritter |
| 6,862,353 B2 | 3/2005 | Rabenko et al. |
| 6,864,798 B2 | 3/2005 | Janik |
| 6,865,193 B2 | 3/2005 | Terk |
| 6,868,072 B1 | 3/2005 | Lin et al. |
| 6,868,081 B1 | 3/2005 | Akram et al. |
| 6,868,117 B1 | 3/2005 | Mardinian |
| 6,868,265 B2 | 3/2005 | Zodnik |
| 6,870,282 B1 | 3/2005 | Bischoff et al. |
| 6,876,648 B1 | 4/2005 | Lee |
| 6,880,020 B1 | 4/2005 | Rubinstein et al. |
| 6,882,714 B2 | 4/2005 | Mansfield |
| 6,885,674 B2 | 4/2005 | Hunt et al. |
| 6,886,181 B1 | 4/2005 | Dodds et al. |
| 6,889,095 B1 | 5/2005 | Eidson et al. |
| 6,891,881 B2 | 5/2005 | Trachewsky et al. |
| 6,895,089 B2 | 5/2005 | Wang |
| 6,896,551 B2 | 5/2005 | Hauck et al. |
| 6,898,413 B2 | 5/2005 | Yip et al. |
| 6,901,439 B1 | 5/2005 | Bonasia et al. |
| 6,904,134 B2 | 6/2005 | Jeon et al. |
| 6,904,149 B2 | 6/2005 | Keenum et al. |
| 6,906,618 B2 | 6/2005 | Hair, III et al. |
| 6,909,725 B1 | 6/2005 | Chow |
| 6,912,145 B2 | 6/2005 | Hung et al. |
| 6,912,209 B1 | 6/2005 | Thi et al. |
| 6,912,282 B2 | 6/2005 | Karam |
| 6,917,681 B2 | 7/2005 | Robinson et al. |
| 6,922,407 B2 | 7/2005 | Wu |
| 6,925,089 B2 | 8/2005 | Chow et al. |
| 6,934,170 B2 | 8/2005 | Ooishi |
| 6,934,754 B2 | 8/2005 | West et al. |
| 6,937,056 B2 | 8/2005 | Binder |
| 6,940,918 B1 | 9/2005 | Nayler et al. |
| 6,941,364 B2 | 9/2005 | Kim et al. |
| 6,943,683 B2 | 9/2005 | Perret |
| 6,947,287 B1 | 9/2005 | Zansky et al. |
| 6,947,736 B2 | 9/2005 | Shaver et al. |
| 6,952,785 B1 | 10/2005 | Diab et al. |
| 6,954,863 B2 | 10/2005 | Mouton |
| 6,956,462 B2 | 10/2005 | Jetzt |
| 6,956,463 B2 | 10/2005 | Crenella et al. |
| 6,956,826 B1 | 10/2005 | Binder |
| 6,961,303 B1 | 11/2005 | Binder |
| 6,963,559 B2 | 11/2005 | Elo |
| 6,963,936 B2 | 11/2005 | Billington et al. |
| 6,970,538 B2 | 11/2005 | Binder |
| 6,972,688 B2 | 12/2005 | Rapaich |
| 6,973,394 B2 | 12/2005 | Jaeger et al. |
| 6,975,209 B2 | 12/2005 | Gromov |
| 6,975,211 B2 | 12/2005 | Atsuta et al. |
| 6,975,713 B1 | 12/2005 | Smith et al. |
| 6,977,507 B1 | 12/2005 | Pannell et al. |

| | | | | | | |
|---|---|---|---|---|---|---|
| 6,980,638 B1 | 12/2005 | Smith et al. | | 7,152,168 B2 | 12/2006 | Boynton et al. |
| 6,985,072 B2 | 1/2006 | Omidi et al. | | 7,154,381 B2 | 12/2006 | Lang et al. |
| 6,985,713 B2 | 1/2006 | Lehr et al. | | 7,154,996 B2 | 12/2006 | Strauss |
| 6,985,714 B2 | 1/2006 | Akiyama et al. | | 7,155,214 B2 | 12/2006 | Struthers et al. |
| 6,986,071 B2 | 1/2006 | Darshan et al. | | 7,155,622 B2 | 12/2006 | Mancey et al. |
| 6,987,430 B2 | 1/2006 | Wasaki et al. | | 7,162,013 B2 | 1/2007 | Gavette et al. |
| 6,989,733 B2 | 1/2006 | Simonsen et al. | | 7,162,234 B1 | 1/2007 | Smith |
| 6,989,734 B2 | 1/2006 | Thomas | | 7,162,377 B2 | 1/2007 | Amrod et al. |
| 6,995,657 B2 | 2/2006 | Zalitzky et al. | | 7,162,650 B2 | 1/2007 | Ke et al. |
| 6,995,658 B2 | 2/2006 | Tustison et al. | | 7,167,078 B2 | 1/2007 | Pourchot |
| 6,996,134 B1 | 2/2006 | Renucci et al. | | 7,167,923 B2 | 1/2007 | Lo |
| 6,996,213 B1 | 2/2006 | De Jong | | 7,170,194 B2 | 1/2007 | Korcharz et al. |
| 6,996,458 B2 | 2/2006 | Pincu et al. | | 7,170,405 B2 | 1/2007 | Daum et al. |
| 6,996,729 B2 | 2/2006 | Volkening et al. | | 7,171,506 B2 | 1/2007 | Iwamura |
| 6,998,964 B2 | 2/2006 | Lomax, Jr. et al. | | 7,176,786 B2 | 2/2007 | Kline et al. |
| 6,999,433 B2 | 2/2006 | Baum | | 7,180,412 B2 | 2/2007 | Bonicatto et al. |
| 6,999,505 B2 | 2/2006 | Yokoo et al. | | 7,181,023 B1 | 2/2007 | Andrews et al. |
| 7,002,898 B1 | 2/2006 | Lou | | 7,183,902 B2 | 2/2007 | Hamburgen et al. |
| 7,003,102 B2 | 2/2006 | Kiko | | 7,190,716 B2 | 3/2007 | Norrell et al. |
| 7,006,445 B1 | 2/2006 | Cole et al. | | 7,193,149 B2 | 3/2007 | Polanek et al. |
| 7,006,523 B2 * | 2/2006 | Binder ............................ 370/463 | | 7,194,528 B1 | 3/2007 | Davidow |
| 7,007,305 B2 | 2/2006 | Carson et al. | | 7,194,639 B2 | 3/2007 | Atkinson et al. |
| 7,009,527 B2 | 3/2006 | Seo | | 7,198,521 B2 | 4/2007 | Hauck et al. |
| 7,009,946 B1 | 3/2006 | Kardach | | 7,199,699 B1 | 4/2007 | Gidge |
| 7,010,050 B2 | 3/2006 | Maryanka | | 7,199,706 B2 | 4/2007 | Dawson et al. |
| 7,012,922 B1 | 3/2006 | Unitt et al. | | 7,203,849 B2 | 4/2007 | Dove |
| 7,016,377 B1 | 3/2006 | Chun et al. | | 7,203,851 B1 | 4/2007 | Lo et al. |
| 7,023,809 B1 | 4/2006 | Rubinstein et al. | | 7,206,322 B1 | 4/2007 | Garg et al. |
| 7,026,730 B1 | 4/2006 | Marshall et al. | | 7,206,417 B2 | 4/2007 | Nathan |
| 7,026,917 B2 | 4/2006 | Berkman | | 7,207,846 B2 | 4/2007 | Caveney et al. |
| 7,027,566 B2 | 4/2006 | Bossemeyer, Jr. et al. | | 7,209,719 B2 | 4/2007 | Liebenow |
| 7,030,733 B2 | 4/2006 | Abbarin | | 7,209,945 B2 | 4/2007 | Hicks, III et al. |
| 7,031,394 B2 | 4/2006 | Vitenberg | | 7,215,763 B1 | 5/2007 | Keller et al. |
| 7,035,270 B2 | 4/2006 | Moore, Jr. et al. | | 7,221,261 B2 | 5/2007 | Klingensmith et al. |
| 7,046,983 B2 | 5/2006 | Elkayam et al. | | 7,224,272 B2 | 5/2007 | White, II et al. |
| 7,049,514 B2 | 5/2006 | Brandt et al. | | 7,225,345 B2 | 5/2007 | Korcharz et al. |
| 7,050,546 B1 | 5/2006 | Richardson et al. | | 7,231,535 B2 | 6/2007 | Le Creff et al. |
| 7,053,501 B1 | 5/2006 | Barrass | | 7,239,627 B2 | 7/2007 | Nattkemper et al. |
| 7,054,303 B2 | 5/2006 | Miyazaki et al. | | 7,239,628 B1 | 7/2007 | Pendleton et al. |
| 7,054,442 B2 | 5/2006 | Weikle | | 7,240,224 B1 | 7/2007 | Biederman |
| 7,058,174 B2 | 6/2006 | Posthuma | | 7,242,729 B1 | 7/2007 | Heistermann et al. |
| 7,061,142 B1 | 6/2006 | Marshall | | 7,245,625 B2 | 7/2007 | Manis et al. |
| 7,068,649 B2 | 6/2006 | Fisher et al. | | 7,247,793 B2 | 7/2007 | Hinkson et al. |
| 7,068,668 B2 | 6/2006 | Feuer | | 7,254,734 B2 | 8/2007 | Lehr et al. |
| 7,068,682 B2 | 6/2006 | Campbell et al. | | 7,256,684 B1 | 8/2007 | Cafiero et al. |
| 7,068,781 B2 | 6/2006 | Le Creff et al. | | 7,256,704 B2 | 8/2007 | Yoon et al. |
| 7,072,995 B1 | 7/2006 | Burroughs | | 7,257,106 B2 | 8/2007 | Chen et al. |
| 7,079,012 B2 | 7/2006 | Wetmore | | 7,257,108 B2 | 8/2007 | Cheston et al. |
| 7,079,647 B2 | 7/2006 | Tomobe | | 7,263,362 B1 | 8/2007 | Young et al. |
| 7,081,827 B2 | 7/2006 | Addy | | 7,265,664 B2 | 9/2007 | Berkman |
| 7,082,141 B2 | 7/2006 | Sharma et al. | | 7,266,344 B2 | 9/2007 | Rodriguez |
| 7,085,238 B2 | 8/2006 | McBeath | | 7,272,669 B2 | 9/2007 | Mattur et al. |
| 7,088,238 B2 | 8/2006 | Karaoguz et al. | | 7,274,669 B2 | 9/2007 | Czerwiec et al. |
| 7,089,126 B2 | 8/2006 | Muir | | 7,276,915 B1 | 10/2007 | Euler et al. |
| 7,091,849 B1 | 8/2006 | Henry | | 7,280,032 B2 | 10/2007 | Aekins et al. |
| 7,095,848 B1 | 8/2006 | Fischer et al. | | 7,281,141 B2 | 10/2007 | Elkayam et al. |
| 7,095,849 B2 | 8/2006 | Smith et al. | | 7,283,554 B2 | 10/2007 | Ophir et al. |
| 7,098,773 B2 | 8/2006 | Berkman | | 7,292,859 B2 | 11/2007 | Park |
| 7,099,368 B2 | 8/2006 | Santhoff et al. | | 7,293,103 B1 | 11/2007 | Lin et al. |
| 7,099,707 B2 | 8/2006 | Amin et al. | | 7,299,287 B1 | 11/2007 | Rubinstein et al. |
| 7,106,261 B2 | 9/2006 | Nagel et al. | | 7,299,368 B2 | 11/2007 | Peker et al. |
| 7,106,721 B1 | 9/2006 | Binder | | 7,301,940 B1 | 11/2007 | Bernstein |
| 7,113,574 B1 | 9/2006 | Haas et al. | | 7,305,006 B1 | 12/2007 | Bella |
| 7,116,685 B2 | 10/2006 | Brown et al. | | 7,307,510 B2 | 12/2007 | Berkman |
| 7,117,272 B2 | 10/2006 | Rimboim et al. | | 7,308,086 B2 | 12/2007 | Yoshitani |
| 7,123,701 B2 * | 10/2006 | Binder ........................ 379/90.01 | | 7,310,355 B1 | 12/2007 | Krein et al. |
| 7,133,423 B1 | 11/2006 | Chow et al. | | 7,316,586 B2 | 1/2008 | Anderson et al. |
| 7,135,982 B2 | 11/2006 | Lee | | 7,319,717 B2 | 1/2008 | Zitting |
| 7,136,270 B2 | 11/2006 | Liebenow | | 7,323,968 B2 | 1/2008 | Iwamura |
| 7,136,936 B2 | 11/2006 | Chan et al. | | 7,324,824 B2 | 1/2008 | Smith et al. |
| 7,142,560 B2 | 11/2006 | Mansfield | | 7,327,765 B1 | 2/2008 | Ojard |
| 7,142,563 B1 | 11/2006 | Lin | | 7,330,695 B2 | 2/2008 | Karschnia et al. |
| 7,142,934 B2 | 11/2006 | Janik | | 7,331,819 B2 | 2/2008 | Nelson et al. |
| 7,143,299 B1 | 11/2006 | Rubinstein et al. | | 7,339,458 B2 | 3/2008 | Cern |
| 7,145,439 B2 | 12/2006 | Darshan et al. | | 7,340,051 B2 | 3/2008 | Phillips et al. |
| 7,145,996 B2 | 12/2006 | Creamer et al. | | 7,340,509 B2 | 3/2008 | Daum et al. |
| 7,148,799 B2 | 12/2006 | Cern et al. | | 7,343,506 B1 | 3/2008 | Fenwick |
| 7,149,182 B1 | 12/2006 | Renucci et al. | | 7,345,998 B2 | 3/2008 | Cregg et al. |
| 7,149,474 B1 | 12/2006 | Mikhak | | 7,346,071 B2 | 3/2008 | Bareis |

| | | | | | | |
|---|---|---|---|---|---|---|
| 7,349,325 B2 | 3/2008 | Trzeciak et al. | | 2003/0061522 A1 | 3/2003 | Ke et al. |
| 7,353,407 B2 | 4/2008 | Diab et al. | | 2003/0062990 A1 | 4/2003 | Schaeffer et al. |
| 7,356,588 B2 | 4/2008 | Stineman, Jr. et al. | | 2003/0066082 A1 | 4/2003 | Kliger et al. |
| 7,363,525 B2 | 4/2008 | Biederman et al. | | 2003/0067910 A1 | 4/2003 | Razazian et al. |
| 7,368,798 B2 | 5/2008 | Camagna et al. | | 2003/0088706 A1 | 5/2003 | Chan et al. |
| 7,373,528 B2 | 5/2008 | Schindler | | 2003/0090368 A1 | 5/2003 | Ide et al. |
| 7,375,445 B1 | 5/2008 | Smith | | 2003/0099076 A1 | 5/2003 | Elkayam et al. |
| 7,376,734 B2 | 5/2008 | Caveney | | 2003/0099228 A1 | 5/2003 | Alcock |
| 7,380,044 B1 | 5/2008 | Liburdi | | 2003/0103521 A1 | 6/2003 | Raphaeli et al. |
| 7,382,786 B2 | 6/2008 | Chen et al. | | 2003/0107269 A1 | 6/2003 | Jetzt |
| 7,401,239 B2 | 7/2008 | Chan et al. | | 2003/0112965 A1 | 6/2003 | McNamara et al. |
| 7,404,091 B1 | 7/2008 | Gere | | 2003/0133473 A1 | 7/2003 | Manis et al. |
| 7,404,094 B2 | 7/2008 | Lee et al. | | 2003/0133476 A1 | 7/2003 | Stone et al. |
| 7,406,094 B2 | 7/2008 | Propp et al. | | 2003/0146765 A1 | 8/2003 | Darshan et al. |
| 7,406,536 B2 | 7/2008 | Efrati et al. | | 2003/0151695 A1 | 8/2003 | Sahlin et al. |
| 7,406,614 B2 | 7/2008 | Peleg et al. | | 2003/0154273 A1 | 8/2003 | Caveney |
| 7,408,949 B2 | 8/2008 | Baum | | 2003/0154276 A1 | 8/2003 | Caveney |
| 7,413,471 B2 | 8/2008 | Chan | | 2003/0179869 A1 | 9/2003 | Yoshitani |
| 7,436,842 B2 * | 10/2008 | Binder ............... 370/401 | | 2003/0194912 A1 | 10/2003 | Ferentz |
| 7,453,895 B2 * | 11/2008 | Binder ............... 370/401 | | 2003/0198253 A1 | 10/2003 | Lifshitz et al. |
| 7,483,524 B2 * | 1/2009 | Binder ............... 379/93.08 | | 2003/0198341 A1 | 10/2003 | Smith et al. |
| 7,492,875 B2 * | 2/2009 | Binder ............... 379/90.01 | | 2003/0204393 A1 | 10/2003 | Czerwiec et al. |
| 7,522,713 B2 * | 4/2009 | Binder ............... 379/90.01 | | 2003/0206623 A1 | 11/2003 | Deichstetter et al. |
| 7,686,653 B2 * | 3/2010 | Binder ............... 439/638 | | 2003/0207697 A1 | 11/2003 | Shpak |
| 7,769,030 B2 * | 8/2010 | Binder ............... 370/401 | | 2004/0006484 A1 | 1/2004 | Manis et al. |
| 7,873,058 B2 * | 1/2011 | Binder ............... 370/401 | | 2004/0013098 A1 | 1/2004 | Tseng et al. |
| 7,953,071 B2 * | 5/2011 | Binder ............... 370/352 | | 2004/0037317 A1 | 2/2004 | Zalitzky et al. |
| 7,990,908 B2 * | 8/2011 | Binder ............... 370/318 | | 2004/0073597 A1 | 4/2004 | Caveney |
| 8,092,258 B2 * | 1/2012 | Binder ............... 439/638 | | 2004/0083262 A1 | 4/2004 | Trantow |
| 2001/0030950 A1 | 10/2001 | Chen et al. | | 2004/0087214 A1 | 5/2004 | Cho |
| 2001/0038635 A1 | 11/2001 | Rogers | | 2004/0090984 A1 | 5/2004 | Saint-Hilaire et al. |
| 2001/0039660 A1 | 11/2001 | Vasilevsky et al. | | 2004/0105539 A1 | 6/2004 | Auzizeau et al. |
| 2001/0047418 A1 | 11/2001 | White | | 2004/0107299 A1 | 6/2004 | Lee et al. |
| 2002/0006137 A1 | 1/2002 | Rabenko et al. | | 2004/0107445 A1 | 6/2004 | Amit |
| 2002/0011923 A1 | 1/2002 | Cunningham et al. | | 2004/0121648 A1 | 6/2004 | Voros |
| 2002/0015489 A1 | 2/2002 | Ben-David | | 2004/0130413 A1 | 7/2004 | Mentz et al. |
| 2002/0021465 A1 | 2/2002 | Moore et al. | | 2004/0136373 A1 | 7/2004 | Bareis |
| 2002/0024424 A1 | 2/2002 | Burns et al. | | 2004/0136384 A1 | 7/2004 | Cho |
| 2002/0031114 A1 | 3/2002 | Terry et al. | | 2004/0136388 A1 | 7/2004 | Schaff |
| 2002/0035624 A1 | 3/2002 | Kim | | 2004/0146061 A1 | 7/2004 | Bisceglia et al. |
| 2002/0037004 A1 | 3/2002 | Bossemeyer et al. | | 2004/0147232 A1 | 7/2004 | Zodnik |
| 2002/0039388 A1 | 4/2002 | Smart et al. | | 2004/0156513 A1 | 8/2004 | Kaylor et al. |
| 2002/0056116 A1 | 5/2002 | Smith | | 2004/0164619 A1 | 8/2004 | Parker et al. |
| 2002/0057581 A1 | 5/2002 | Nadav | | 2004/0170262 A1 | 9/2004 | Ohno |
| 2002/0059634 A1 | 5/2002 | Terry et al. | | 2004/0172658 A1 | 9/2004 | Rakib et al. |
| 2002/0061012 A1 | 5/2002 | Thi et al. | | 2004/0177167 A1 | 9/2004 | Iwamura et al. |
| 2002/0063584 A1 | 5/2002 | Molenda et al. | | 2004/0178888 A1 | 9/2004 | Hales et al. |
| 2002/0064039 A1 | 5/2002 | Clodfelter | | 2004/0180573 A1 | 9/2004 | Chen |
| 2002/0069417 A1 | 6/2002 | Kliger et al. | | 2004/0198236 A1 | 10/2004 | Paine et al. |
| 2002/0076038 A1 | 6/2002 | Barrese et al. | | 2004/0204040 A1 | 10/2004 | Heijnen |
| 2002/0080010 A1 | 6/2002 | Zhang | | 2004/0208167 A1 | 10/2004 | Kishida |
| 2002/0097821 A1 | 7/2002 | Hebron et al. | | 2004/0230846 A1 | 11/2004 | Mancey et al. |
| 2002/0104009 A1 | 8/2002 | Zodnik | | 2004/0232768 A1 | 11/2004 | Hung et al. |
| 2002/0110236 A1 | 8/2002 | Karnad | | 2004/0236967 A1 | 11/2004 | Korcharz et al. |
| 2002/0114325 A1 | 8/2002 | Dale et al. | | 2004/0250273 A1 | 12/2004 | Swix et al. |
| 2002/0116720 A1 | 8/2002 | Terry et al. | | 2004/0268160 A1 | 12/2004 | Atkinson et al. |
| 2002/0118823 A1 | 8/2002 | Tomobe | | 2005/0015805 A1 | 1/2005 | Iwamura |
| 2002/0128009 A1 | 9/2002 | Boch et al. | | 2005/0018766 A1 | 1/2005 | Iwamura |
| 2002/0144159 A1 | 10/2002 | Wu et al. | | 2005/0038875 A1 | 2/2005 | Park |
| 2002/0145509 A1 | 10/2002 | Karny et al. | | 2005/0047379 A1 | 3/2005 | Boyden et al. |
| 2002/0150100 A1 | 10/2002 | White et al. | | 2005/0053087 A1 | 3/2005 | Pulyk |
| 2002/0150155 A1 | 10/2002 | Florentin et al. | | 2005/0063108 A1 | 3/2005 | Voll et al. |
| 2002/0154629 A1 | 10/2002 | Lohman et al. | | 2005/0063403 A1 | 3/2005 | Binder |
| 2002/0159402 A1 | 10/2002 | Binder | | 2005/0073968 A1 | 4/2005 | Perlman |
| 2002/0166124 A1 | 11/2002 | Gurantz et al. | | 2005/0076148 A1 | 4/2005 | Chan |
| 2002/0166125 A1 | 11/2002 | Fulmer | | 2005/0076149 A1 | 4/2005 | McKown et al. |
| 2002/0174423 A1 | 11/2002 | Fifield et al. | | 2005/0078700 A1 | 4/2005 | Thompson et al. |
| 2002/0176567 A1 | 11/2002 | Chen et al. | | 2005/0083959 A1 | 4/2005 | Binder |
| 2002/0180592 A1 | 12/2002 | Gromov | | 2005/0086389 A1 | 4/2005 | Chang |
| 2002/0188762 A1 | 12/2002 | Tomassetti et al. | | 2005/0086694 A1 | 4/2005 | Hicks et al. |
| 2002/0194383 A1 | 12/2002 | Cohen et al. | | 2005/0097369 A1 | 5/2005 | Bowser et al. |
| 2002/0194605 A1 | 12/2002 | Cohen et al. | | 2005/0114325 A1 | 5/2005 | Liu et al. |
| 2002/0198952 A1 | 12/2002 | Bell | | 2005/0125083 A1 | 6/2005 | Kiko |
| 2003/0006881 A1 | 1/2003 | Reyes | | 2005/0125507 A1 | 6/2005 | Atias et al. |
| 2003/0016794 A1 | 1/2003 | Brothers | | 2005/0136972 A1 | 6/2005 | Smith et al. |
| 2003/0035556 A1 | 2/2003 | Curtis et al. | | 2005/0136989 A1 | 6/2005 | Dove |
| 2003/0046377 A1 | 3/2003 | Daum et al. | | 2005/0150100 A1 | 7/2005 | Merdan et al. |
| 2003/0048895 A1 | 3/2003 | Kiko et al. | | 2005/0152306 A1 | 7/2005 | Bonnassieux et al. |
| 2003/0058085 A1 | 3/2003 | Fisher et al. | | 2005/0152323 A1 | 7/2005 | Bonnassieux et al. |

| | | |
|---|---|---|
| 2005/0152337 A1 | 7/2005 | Wurtzel et al. |
| 2005/0177640 A1 | 8/2005 | Rubinstein |
| 2005/0201306 A1 | 9/2005 | Engel |
| 2005/0220021 A1 | 10/2005 | Sonowski et al. |
| 2005/0226200 A1 | 10/2005 | Askildsen et al. |
| 2005/0239400 A1 | 10/2005 | Narikawa |
| 2005/0245127 A1 | 11/2005 | Nordin et al. |
| 2005/0268120 A1 | 12/2005 | Schindler et al. |
| 2005/0268322 A1 | 12/2005 | Watson |
| 2005/0280598 A1 | 12/2005 | Webb et al. |
| 2005/0281326 A1 | 12/2005 | Yu |
| 2006/0007945 A1 | 1/2006 | Schoettle et al. |
| 2006/0017324 A1 | 1/2006 | Pace et al. |
| 2006/0029210 A1 | 2/2006 | Feugere |
| 2006/0034449 A1 | 2/2006 | Joerger |
| 2006/0053324 A1 | 3/2006 | Giat et al. |
| 2006/0056444 A1 | 3/2006 | Binder |
| 2006/0067521 A1 | 3/2006 | Muise et al. |
| 2006/0089230 A1 | 4/2006 | Biederman et al. |
| 2006/0140178 A1 | 6/2006 | Cheng et al. |
| 2006/0140260 A1 | 6/2006 | Wasaki et al. |
| 2006/0153169 A1 | 7/2006 | Koifman et al. |
| 2006/0165097 A1 | 7/2006 | Caveney |
| 2006/0168459 A1 | 7/2006 | Dwelley et al. |
| 2006/0181398 A1 | 8/2006 | Martich et al. |
| 2006/0193310 A1 | 8/2006 | Landry et al. |
| 2006/0193313 A1 | 8/2006 | Landry et al. |
| 2006/0197387 A1 | 9/2006 | Hung et al. |
| 2006/0203981 A1 | 9/2006 | Binder |
| 2006/0215680 A1 | 9/2006 | Camagna |
| 2006/0222086 A1 | 10/2006 | Frye, Jr. |
| 2006/0238250 A1 | 10/2006 | Camagna et al. |
| 2006/0251094 A1 | 11/2006 | Van Vleck et al. |
| 2006/0251159 A1 | 11/2006 | Huotari et al. |
| 2006/0251179 A1 | 11/2006 | Ghoshal |
| 2006/0262727 A1 | 11/2006 | Caveney |
| 2006/0269001 A1 | 11/2006 | Dawson et al. |
| 2006/0280197 A1 | 12/2006 | Stone |
| 2006/0291493 A1 | 12/2006 | Schley-May et al. |
| 2007/0025368 A1 | 2/2007 | Ha et al. |
| 2007/0036171 A1 | 2/2007 | Magin |
| 2007/0041577 A1 | 2/2007 | Ghoshal et al. |
| 2007/0058666 A1 | 3/2007 | Pratt |
| 2007/0082649 A1 | 4/2007 | Chan |
| 2007/0083668 A1 | 4/2007 | Kelsey et al. |
| 2007/0112939 A1 | 5/2007 | Wilson et al. |
| 2007/0167144 A1 | 7/2007 | Koga et al. |
| 2007/0198748 A1 | 8/2007 | Ametsitsi et al. |
| 2007/0206629 A1 | 9/2007 | Choi |
| 2007/0206749 A1 | 9/2007 | Pincu et al. |
| 2007/0208961 A1 | 9/2007 | Ghoshal et al. |
| 2007/0213879 A1 | 9/2007 | Iwamura |
| 2007/0220618 A1 | 9/2007 | Holmes et al. |
| 2007/0236853 A1 | 10/2007 | Crawley |
| 2007/0254714 A1 | 11/2007 | Martich et al. |
| 2007/0260904 A1 | 11/2007 | Camagna et al. |
| 2008/0013261 A1 | 1/2008 | Miller et al. |
| 2008/0013637 A1 | 1/2008 | Kodama et al. |
| 2008/0058018 A1 | 3/2008 | Scheinert |
| 2008/0125187 A1 | 5/2008 | Chang et al. |
| 2008/0136915 A1 | 6/2008 | Iwamura |
| 2008/0140565 A1 | 6/2008 | DeBenedetti et al. |
| 2008/0153415 A1 | 6/2008 | Block et al. |
| 2008/0165463 A1 | 7/2008 | Chan |
| 2008/0186150 A1 | 8/2008 | Kao |

FOREIGN PATENT DOCUMENTS

| | | |
|---|---|---|
| EP | 0355532 | 2/1990 |
| EP | 1 009 156 A2 | 6/2000 |
| EP | 1343253 A1 | 9/2003 |
| GB | 2368979 A | 5/2002 |
| JP | 56-087192 A | 7/1981 |
| JP | 57204655 A | 12/1982 |
| JP | 58206257 A | 12/1983 |
| JP | 06006359 | 1/1994 |
| JP | 07-336379 A | 12/1995 |
| JP | 09-084146 A | 3/1997 |
| JP | 11-308352 | 5/1999 |
| JP | 11308352 | 11/1999 |
| JP | 11317968 | 11/1999 |
| JP | 11355435 | 12/1999 |
| WO | WO 90/02985 | 1/1996 |
| WO | 9623377 A1 | 8/1996 |
| WO | WO 96/23377 | 8/1996 |
| WO | WO 96/23377 A1 | 8/1996 |
| WO | WO 97/50193 A | 12/1997 |
| WO | WO 98/02985 A | 1/1998 |
| WO | 98/11699 A1 | 3/1998 |
| WO | 9811699 | 3/1998 |
| WO | 9854901 | 12/1998 |
| WO | WO 99/03255 | 1/1999 |
| WO | WO 99/12330 | 3/1999 |
| WO | 99/30242 A1 | 6/1999 |
| WO | 9930242 | 6/1999 |
| WO | WO 99/53627 | 10/1999 |
| WO | WO 0128215 | 4/2001 |
| WO | WO 01/43238 A1 | 6/2001 |
| WO | WO 02/091652 A2 | 11/2002 |
| WO | WO 02/102019 A2 | 12/2002 |

OTHER PUBLICATIONS

NBX Corporation's NBX 100, "Network Based Exchange: The Complete Communications Solution," published in 1997.

NetSpeed, "SpeedRunner 202 Customer Premise ATM ADSL Router" published 1997.

Kevin Fogarty, "ZAP! NetWare users get really wired—over electric power lines," Network World, Jul. 3, 1995.

Compaq Deskpro 4000S Series of Personal Computers, published in Jul. 1997.

Universal Serial Bus Specification—Rev. 1.0, Jan. 15, 1996; Sec. 4.2.1 pp. 29-30.

Universal Serial Bus Specification—Rev. 1.0, Jan. 15, 1996; Sec. 7.2.1-7.2.1.5 pp. 131-135.

Universal Serial Bus Specification—Rev. 1.0, Jan. 15, 1996; Sec. 9.2.1-9.2.5.1 pp. 170-171.

Universal Serial Bus Specification—Rev. 1.0, Jan. 15, 1996; Sec. 9.6.2 pp. 184-185.

Bearfield, J.M., "Control the Power Interface of USB's Voltage Bus", Electronic Design, U.S., Penton Publishing, Clev. Ohio, vol. 45, No. 15, Jul. 1997, p. 80-86.

RAD Data Comm. Ltd., "Token Ring Design Guide", 1994, #TR-20-01/94, Chapters 1 through 4-21.

PowerDsine Product Catalogue 1999, pp. 56-79 and 95-105, Israel.

'The Complete Modem Reference', Third Edition, by Gilbert Held, 1997, ISBN: 0-471-15457-1 (488 pages).

'High-Speed Networking with LAN Switches', by Gilbert Held, 1997, ISBN: 0-471-18444-6 (281 pages).

'Interconnections Bridges and Routers', by Radia Perlman, 1992, ISBN: 0-201-56332-0 (393 pages).

'Macworld Networking Bible', Second Edition pp. 1-331, by Dave Kosiur and Joel M. Snyder, 1994, ISBN: 1-56884-194-9 (354 pages).

'High-Speed Cable Modems', pp. 1-246 by Albert A. Azzam, 1997, ISBN: 0-07-006417-2 (276 pages).

'High-Speed Cable Modems', pp. 247-570 by Albert A. Azzam, 1997, ISBN: 0-07-006417-2 (321 pages).

Lon Works LPI-10 Link Power interface Module User's Guide; Echelon Corporation, 1995 (37 pages).

Lon Works LPT-10 Link Power Transceiver User's Guide Version 2.1; Echelon Corporation, 1995 (60 pages).

Lon Works Router User's Guide Revision 3; Echelon Corporation, 1995 (68 pages).

Using the Lon Works PLT-22 Power Line Transceiver in European Utility Application, Version 1; Echelon Corporation, 1996-1999 (118 pages).

PL3120/PL3150 Power Line Smart Transceiver Data Book, Version 2; Echelon Corporation, 1996-2005 (255 pages).

PL DSK 2.1 Power Line Smart Transeiver Development Support Kit User's Guide; Echelon Corporation, 2005-2006 (18 pages).

Introduction to Pyxos FT Platform; Echelon Corporation, 2007 (34 pages).

LTM-10A User's Guide, Revision 4; Echelon Corporation, 1995-2001 (46 pages).

Lon Works Twisted Pair Control Module, User's Guide Version 2; Echelon Corporation, 1992-1996 (50 pages).
AN1000EVK Evaluation Unit Manual, Draft 1.0; Adaptive Networks Inc., Document No. 04-3170-01-B Aug. 1996 (31 pages).
AN1000 Powerline Network Communications Chip Set, Adaptive Networks Inc., 1995 (56 pages).
From the Ether—Bob Metcalfe, Cheap, reliable 'net connections may be as close as an electrical socket'; by Bob Metcalfe Info World Feb. 10, 1997 vol. 19 Issue 6 (4 pages).
Lon Works Custom Node Development, Lon Works Engineering Bulletin; Echelon Corporation, Jan. 1995 (16 pages).
Building a Lon Talk-to-PLC Gateway, Lon Works Engineering Bulletin; Echelon Corporation, May 1994 (62 pages).
Lon Works 78kbps Self-Healing Ring Architecture, Lon Works Marketing Bulletin; Echelon Corporation, Aug. 1993 (6 pages).
Centralized Commercial Building Applications with the Lon Works PLT-21 Power Line Transeiver, Lon Works Engineering Bulletin; Echelon Corporation, Apr. 1997 (22 pages).
Lon Works for Audio Computer Control Network Applications; Echelon Corporation, Jan. 1995 (30 pages).
Demand Side Management with Lon Works Power Line Transeivers, Lon Works Engineering Bulletin; Echelon Corporation, Dec. 1996 (36 pages).
'Switching Hubs—Switching to the Fast Track', by Gary Gunnerson, PC Magazine, Oct. 11, 1994 (24 pages).
VISPLAN-10 Infrared Wireless LAN System, JVC May 1996 (10 pages).
'JVC introduces Ethernet Compatible Wireless LAN System'; Business Wire Sep. 26, 1995 (1 page).
Ethernet Wireless LAN Systems; BYTE Feb. 1996 (3 pages).
'JVC introduces First Ethernet Compatible Wireless LAN System'; Business Wire Nov. 8, 1995 (1 page)
Intelogis to Present on Stage at Internet Showcase 1998; PR Newswire Jan. 28, 1998 (1 page).
High Speed Networking with LAN Switches, by Gilbert Held; Copyright 1997 by John Wiley & Sons, Inc. (290 pages).
Mitel, ISO-CMOS ST-BUS Family, MT8971B/72B; Digital Subscriber Interface Circuit/Digital Network Interface Circuit; Issue 7, pp. 1-21, May 1995.
Superseded, Data-Over-Cable Interface Specifications/Radio Frequency Interface Specification, SP-RFII-970326, pp. 1-189, copyright 1997.
SX-200 Digital PABX/Circuit Card Descriptions 9109-094-125-NA, Issue 4, Revision 1, pp. 1-48, Nov. 1990.
SX-200 Digital PABX/Features Description 9109-094-105-NA, Issue 4, Revision 1, pp. 1-350, Nov. 1990.
SX-200 Digital PABX/General Description 9109-094-100-NA, Issue 4, Revision 1, pp. 1-46, Nov. 1990.
SX-200 Digital and SX-200 Light PABX, General Information Guide Lightware 15, 9109-952-006-NA, Issue 1, Revision 0, pp. 1-222, Mar. 1992.
Cisco Catalyst 5000; Industry's First Modular, Multilayer-Capable switching System for the Wiring Closet; Posted May 16, 1996 (22 pages).
Canned Heat; Data Communications Feb. 1996 (10 pages).
Fast Ethernet 100-Mbps Solutions; Posted Mar. 112, 1996 (10 pages).
Forget the Forklift; Data Communications Sep. 1996 (11 pages).
LAN Emulation; Posted Nov, 15, 1995 (16 pages).
IBM LAN Bridge and Switch Summary, IBM, published Jan. 1996 (70 pages).
Continuation of IBM LAN Bridge and Switch Summary, IBM, published Jan. 1996 (70 pages).
3ComImpact IQ External ISDN Modem User product brochure, Published Jun. 1996 (4 pages).
3ComImpact IQ External ISDN Modem User Guide; Published Jul. 1997 (157 pages).
Cisco Catalyst 5000 Series Configuration Worksheet, 1996 (11 pages).
Cisco Catalyst 5000 Product Announcement, Published 1996 (22 pages).
Cisco Catalyst 5000 ATM Dual PHY LAN Emulation Module; Posted Sep. 24 1996 (4 pages).
Cisco Catalyst 5000 Group Switching Ethernet Modules; Posted May 6, 1996 (5 pages).
The Mac Reborn; Macworld Sep. 1996, p. 104-115 (16 pages).
The Mac reborn; Macworld vol. 13, Issue 9, Sep. 1996 (9 pages).
"The DSL Sourcebook", Paradyne Corporation, Copyright 2000, DSL-BOOK-3.0/0900, 98 pages.
Olshansky, "A Full Service Network for the Copper Plant", Telephony, 1985, pp. 52-60.
Instant Network Rules on Phone Lines, Electronic Design, 1987.
O. Agazzi, et al., "Large Scale Integration of Hybrid-Method Digital Subscriber Loops," IEEE Transactions on Communications, vol. COM-30, No. 9, Sep. 1982, pp. 2095-2108.
S.V. Ahamed, et al., "A tutorial on Two-Wire Digital Transmission in the Loop Plant", IEEE Transactions on Communications, vol. COM-29, No. 11, Nov. 1991, pp. 1554-1564.
J. Alves, "Data Over Voice—A Low Cost LAN Alternative", Communications Show and Conference, MECOM 87, January, pp. 13-15.
S.B. Andrews, "The Generic Digital Channel Concept", IEEE International Conference on Communications, 1985, Jun. 23-26, 1985, Chicago, IL, pp. 7.1.1-7.1.3.
G.W. Beene, "Design Considerations for a CO-Powered Distributed-Drop PCM Station Carrier", IEEE Transactions on Communications, vol. COM-30, No. 9, Sep. 1982, pp. 2022-2028.
A. Bienz, "1+1=1—Order Das Telefonnetz Als Datennetz", Sysdata, vol. 16, Aug. 28, 1985, pp. 41-42.
A. Brosio, et al., "A Comparison of Digital Subscriber Line Transmission Systems Employing Different Line Codes", IEEE Transactions on Communications, vol. COM-29, No. 11, Nov. 1981, pp. 1581-1588.
T.P. Byrne, et al., "Positioning the Subscriber Loop Network for Digital Services", IEEE Transactions on Communications, vol. COM-30, No. 9, Sep. 1982, pp. 2006-2011.
R.G. Cornell, et al., "Progress Towards Digital Subscriber Line Services and Signaling", IEEE Transactions on Communications, vol. COM-29, No. 11, Nov. 1981, pp. 1589-1594.
S. Davis, "Integrating Voice and Data: A Marriage of Convenience", Today's Office, vol. 24, No. 9, Feb. 1990, pp. 28-30.
M. Devault, et al., "Resaux Domestiques at Terminaux Audiovisuels Numeriques", L'Echo Des Recherches, No. 126, 1986, pp. 37-46.
H. Fuchs, et al., "Providing Full Duplex Transmission Over Two-Wire Subscriber Loops", Telephony, vol. 208, No. 11, Mar. 18, 1985, pp. 76, 77, 78 and 84.
H. Fukagawa, et al., "Bus Wiring System for Residences", Matsushita Electric Works Technical Report, No. 36, Feb. 1988, pp. 31-35.
D. Glick, et al., "Providing Telco Customers Continuous Data Services", Telephony, vol. 205, No. 22, Nov. 1983, pp. 46, 50, 51, 54.
J.B. Hughes, et al., "A Receiver IC for a 1+1 Digital Subscriber Loop", IEEE Journal of Solid State Circuitry, vol. S.C. 20, No. 3, Jun. 1985 pp. 671-678.
R. Jelski, "Subscriber Subcarrier System—A New Life," Communications International, vol. 4, No. 5, May 1977, pp. 29-30.
A.J. Karia, et al., "A Digital Subscriber Carrier System for the Evolving Subscriber Loop Network", IEEE Transactions on Communications, vol. COM-30, No. 9, Sep. 1982, pp. 2012, 2014, 2015.
T. Masuda, et al., "2-Wire Video Intercom System with Telephone", National Technical Report, vol. 37, No. 6, Dec. 1991, pp. 74-80.
T. Matthews, "Telecomm System is Nerve Center", Infosystems, vol. 31, No. 5, May 1984, pp. 68-69.
J. K. Merrow, "A New Approach to Integrating Local Area Data and Voice Transmission," Telephony, vol. 250, No. 17, Oct. 1983, 2 pages.
H. Morgan, "Two-Wire Full-Duplex Modem Simplifies Voice and Data Networking", Mini-Micro Systems, vol. 17, No. 3, Mar. 1984, 4 pages.
R. Murakoshi, "Home Automation", Journal of the Society of Instrument and Control Engineers, vol. 23, No. 11, Nov. 1984, pp. 955-958.
R.D. Nash, et al., "Simultaneous Transmission of Speech and Data Over an Analog Telephone Channel", GLOBECOM '85. IEEE Global Telecommunications Conference. Conference Record. Communication Technology to Provide New Services, Dec. 25, 1985, New Orleans, Louisiana, pp. 4.2.1-4.2.4.

H. Ogiwara, et al., Design Philosophy and Hardware Implementation for Digital Subscriber Loops, IEEE Transactions on Communications, vol. COM-30, No. 9, Sep. 1982, pp. 2057-2065.

J.L. Pernin, "Related Evolution of Subscriber Loop Plant and Residential Data Transmission Needs", Intelcon 79 Exposition Proceedings, Feb. 26-Mar. 2, 1979, Dallas, Texas, pp. 596-599.

R.A. Tatum, "Project Victoria—the 7-in-1 Solution", Telephone Engineer and Management, vol. 90, No. 1, Jan. 1, 1986, pp. 47 and 50.

A. Teshima, et al., "Still Video Telecommunication Over the Analog Telephone Network", Journal of the Institute of Television Engineers of Japan, vol. 42, No. 11, Nov. 1988, pp. 1162-1167.

S.R. Treves, et al., "Text, Image and Data Integration in a Distributed Control Digital Voice Switching System", International Switching Symposium-ISS '81 CIC, Sep. 21-25, 1981, Montreal, Quebec, Canada, pp. 1-7.

T. Tsuda, et al., "Experimental In-House Multiservice Communication System", Fujitsu Scientific and Technical Journal, vol. 16, No. 3, Sep. 1980, pp. 29-45.

K. Urui, "Integrated Voice/Data Digital EPBX", Toshiba Review, No. 150, Winter 1984, pp. 30-33.

A.F. Van Den Berg, et al., "Principles van de Modem: Technieken en Specificaties", Elektronica, vol. 32, No. 5, Mar. 9, 1984, pp. 11, 13, 15, 17, 19 and 21.

M.G. Vry, et al., "Digital 1+1 Systems for Local Network Enhancement", Conference on Communications Equipment and Systems, Apr. 20-22, 1982, Birmingham, United Kingdom, pp. 61-64.

M.G. Vry, et al., "The Design of a 1+1 System for Digital Signal Transmission to the Subscriber", NTG-Bachberichte, vol. 73, 1980, pp. 36-40.

J.A. Webb, "A New Concept in Data-Above-Voice (DAV)", FTC '86: Evolutions of the Digital Pacific. Telecommunications—Asia, Americas, Pacific: PTC '86 Proceedings, Jan. 12-15, 1986, Honolulu, Hawaii, pp. 260-265.

K. Yamamoto, "A Home Terminal System Using the Home Area Information Network", IEEE Transactions on Consumer Electronics, vol. CE-30, No. 4, Nov. 1984, pp. 608-616.

"Centrex LAN Can Provide Advanced Network Capabilities Over the Existing Telephone Wires", Communications News, vol. 25, No. 6, Jun. 1988, p. 27.

"Data Over Voice is Solution for Corporate Network", Telephone Engineer and Management, vol. 91, No. 9, May 1, 1987, pp. 67-69.

"Data Carrier System Allows Simultaneous Voice/Data Transmission for PABX Telephone Systems", Computer Design, vol. 21, No. 5, May 1982, pp. 68 and 70.

"Computerized Telephone System Integrates Voice and Data Switching", Computer Design, vol. 20, No. 4, Apr. 1981, 6 pages.

"AT&T's Systemax Premises Distribution System Solves Networking Problems", Fiber Optics Magazine, vol. 12, No. 4, Jul.-Aug. 1990, pp. 14-16.

M.M. Anderson, "Video Services on Copper", Conference: ICC 91, International Conference on Communications Conference Record, Jun. 2-26, 1991, Denver, CO, pp. 302-306.

M. Bastian, "Voice-Data integration: An Architecture Perspective," IEEE Communications Magazine, vol. 24, No. 7, Jul. 1986, pp. 8-12.

M. Boubekker, "Bandwidth Reduction for the Transmission of Sign Language Over Telephone Lines", Proceedings of the SPIE—The International Society for Optical Engineering, vol. 1001, Part. 1, 1988, pp. 223-230.

S. Bramblett, "Connect Terminals to Your CPU Over PBX Telephone Lines", EDN, vol. 31, No. 5, Mar. 6, 1986, pp. 239-243, 245, 246 and 248.

IEEE Standard for a High Performance serial Bus; IEEE Std 1394-1995 Published 1996 (392 pages).

DSLPipe Reference Guide; by Ascend Communications, Jun. 2, 1997 (162 pages).

DSLPipe User's Guide; by Ascend Communications, Jun. 3, 1997 (245 pages).

Ascend DSLPipe-S Features and specifications; Posted May 12, 1997 (4 pages).

CiscoPro EtherSwitch CPW2115; Dec. 95 (4 pages).

HART Field Communication Protocol—An introduction for users and manufacturers' published by the HART Communication Foundation, Austin, Texas, Oct. 1995 (12 pages).

SuperStack II Desktop Switch; 3Com Sep. 1996 (2 pages).

Edward Cooper, Broadband Network Technology—An overview for the data and communications industries, Sytek Systems, Mountain View, CA, 1984 (4 pages).

Grayson Evans, The CEBUS Standard User'S Guide May 1996 (317 pages).

Technical Report TR-001 ADSL Forum System Reference Model May 1996 (6 pages).

Cisco Catalyst 5000 Group Switching Ethernet Modules Data Sheets; 1996 (2 pages).

Cisco Catalyst 5000 Switching System Data Sheets; 1996 (2 pages).

Cisco Catalyst 5000 ATM LAN Emulation Module Data Sheets; 1995 (2 pages).

Cisco Catalyst 5000 Family Fast EtherChannel Switching Modules Data Sheets; 1999 (3 pages).

Motorola CableComm CyberSURFR Cable Modem Specifications; Apr. 1995 (4 pages).

G.D. Carse, "New and Future Technologies in the Local Telephone Network: The Victoria System", Conference: IEEE International Conference on Communications '86, ICC '86: Integrating the World Through Communications Conference Record, Jun. 22-25, 1986, Toronto, Ontario, Canada, pp. 410-412.

C. Dougligeris, et al., "Communications and Control for a Home Automation System", Conference: IEEE Proceedings of the Southeastcon '91, vol. 1, pp. 171-175.

D.G.J. Fanshawe, "Architures for Home Systems", Conference: IEEE Colloquium on Home Systems—Information, Entertainment and Control, Oct. 1, 1990, London, United Kingdom, pp. 3/1-3/3.

N.C. Hightower, "Integrated Voice, Data and Video in the Local Loop", IEEE 1986, pp. 915-919.

M. Inoue, et al., "A Home Automation System", IEEE Transactions on Consumer Electronics, vol. CE-31, No. 3, Aug. 1985, pp. 516-527.

J.W. Lechleider, "Study of the Feasibility and Advisability of Digital Subscriber Lines Operating at Rates Substantially in Excess of the Basic Access Rate", T1E1.4 Technical Subcommittee (T1E1.4/89-070), 1 page.

S. Motoyama, et al., "A Subscriber Loop Multiplexing System for Integrated Service Digital Networks", Conference: NTC '81, IEEE 1981 National Telecommunications Conference, Innovative Telecommunications-Key to the Future, Nov. 29-Dec. 3, 1981, New Orleans, Louisiana, pp. D5.1.1-D5.1.5.

G. Neumann, Flexible and Cost-Minimising System Concept (Ericsson Digital PABX MD 110), NET Nechrichten Elektronik-Telematik, Special Issue, Mar. 1988, pp. 11, 12, 14 and 15.

H. Nishi, et al., "Control of a Star/Bus Key Telephone System", NTT R & D, vol. 39, No. 8, 1990, pp. 122, 1222, 1224-1228.

A. Pietrasik, et al., "Subscriber Carrier Telephony System 1+1", Wiadomosci Telekomunikacyjne, vol. 17, No. 7-8, Jul.-Aug. 1977, pp. 183-198.

V. Punj, "Broadband Applications and Services of Public Switched Networks", IEEE Transactions on Consumer Electronics, vol. 35, No. 2, May 1989, pp. 106-112.

T. Sodeyama, et al., "Intelligent House", Journal of the Institute of Electronics, Information and Communication Engineers, vol. 72, No. 9, Sep. 1989, pp. 1024-1026.

H. Tanaka, et al., "Telecontrol System VJ-501", National Technical Report, vol. 32, No. 6, Dec. 1986, pp. 809-817.

D. L. Waring, "The Asymmetrical Digital Subscriber Line (ADSL): A New Transport Technology for Delivering Wideband Capabilities to the Residence", Globecom '91, IEEE, pp. 1979-1986.

K. Yamamoto, et al., "New Home Telephone System Using Japanese Home Bus System Standard," IEEE Transactions on Consumer Electronics, vol. 35, No. 3, Aug. 1989, pp. 687-697.

T. Yamazakli, et al., "Home Appliance Technologies," NEC Research and Development, No. 96, Mar. 1990, pp. 292-299.

Funkschau, "CEBus: US Households are Being Networked", No. 9, Apr. 1989, pp. 45-47.

"Shared Services (Data/Voice Network)", Communications News, vol. 25, No. 11, Nov. 1988, pp. 46-47.

Freeman, "Telecommunication Transmission Handbook", 2.sup.nd Ed., Cover, 1981, pp. xi-xxvii, Chapter 3 (pp. 79-127), Chapter 5 (pp. 172-252), Chapter 6 (pp. 253-288).

A. Artom, et al., "The Possible Use of Customer Loop for New Services During the Transition From Analogue to Digital", Revue F.I.T.C.E., Mar.-Apr. 1981, vol. 20, No. 2, pp. 50-56.

A. Artom, et al., "Medium-Term Prospects for New Servies to the Telephone Customers," Conference Record, Jun. 14-18, 1981, Int'l Conf. on Communications, Denver, CO., pp. 14.4.1-14.4-6.

Hoe-Young Noh, "Home Automation", Korea Information Science Society Review, Apr. 1989, vol. 7 No. 2, pp. 40-44, Republic of Korea. (Translation Provided).

M. Coronaro, et al., "Integrated Office Communication System," Electrical Communication, 1986, pp. 17-22, vol. 60, No. 1, Face Research Center, Pomezia, Italy.

Chow, et al., "A Multi-drop In-House ADSL Distribution Network"; IEEE 1994, pp. 456-460.

English Language Abstract for Japanese Patent 1-27358 (64-27358) Jan. 30, 1989.

BELLCORE: Request for Information: Asymmetrical Digital Subscriber Line (ADSL) Systems That Support Simplex High-Bit-Rate Access and POTS in The Copper Loop Plant; Jun. 1991.

Twisted Pair Physical Layer and Medium Specification; Revision: IS-60 8-18-95 (49 pages).

Introduction to the CEBus Standard; Revision Feb. 5, 1995 Draft Copy (19 pages).

Compaq to Ride the CEBus; by Mark Hachman, EBN Jan. 22, 1996 (1 page).

CEBus Router Testing; IEEE Transactions on Consumer Electronics Nov. 1991, vol. 37 No. 4 (8 pages).

Broadband Network Technology—An Overview for the Data and Telecommunications Industries; by Edward Cooper, Copyright 1984, p. 51-52 (4 pages).

Technical Report TR-001 ADSL Forum System Reference Model; May 1996 (6 pages).

Ascend DSLPipe-S Features; Posted May 12, 1997 (2 pages).

Broadband Digital Subscriber Line—A Full Service Network for the Copper Plant; Telephony / Jun. 12, 1995, vol. 228 No. 24 (8 pages).

Commtek Intros Video over UTP; Communications Week, Feb. 10, 1992 (3 pages).

Aurelio Amodei, et al., "Increasing the Throughput of the HomePNA MAC Protocol, IEEE, Proceedings of the 29th Annual IEEE International Conference on Local Computer Networks (LCN '04), 8 Pages.", Nov. 1, 2004, 8 pages(s), None.

"Home Phoneline Networking Alliance", Interface Specification for HomePNA 2.0 10M8 Technology Link Layer Protocol, (Dec. 1, 1999), pp. 1-39.

"Home Phoneline Networking Alliance", Interface Specification for HomePNA 2.0 10M8 Technology, (Dec. 1, 1999), pp. 1-77.

Paola Bisaglia, et al., Receiver Architectures for HomePNA 2.0 , Hewlett Packard Laboratories, Bristol, U.K., Oct. 17, 2001.

Loh, L.; Ozturk, Y.; Quality of Support and Priority Management in HomePNA 2.0 Link Layer.quadrature..quadrature. *Computers and Communication*; Jun. 30-Jul. 3, 2003. (*ISCC 2003*). *Proceedings. Eighth IEEE International Symposium*; pp. 861-866 vol. 2.

Phoneline / HPNA / HomePNA Networks, http://www.homenethelp.com/web/howto/HomeNet-HPNA.asp (visited Jul. 29, 2003) (3 pages).

Anonymous, HomePNA Specification 1.0 Field Tests Status, Mar. 1999, Home Phoneline Networking Alliance, Inc, pp. 1-6.

21145 Phoneline/Ethernet LAN Controller, Intel Corporation .COPYRGT. 1999, http://developer.intel.com/design/network/21145.htm.

Simple, High-Speed Ethernet Technology for the Home, White Paper, Home Phoneline Networking Alliance, Jun. 1998, pp. 1-11.

Information on Home PhoneLine Networking Alliance (Home PNA), dated Jun. 1998 and before.

Donnan, et al; "Token Ring Access Method and Physical Layer Specifications"; ANSI/IEEE Standard for Local Area Networks; ANSI/IEEE 802.5; 44-pages, 1985.

Gershon, E., "FDDI on Copper with AMD PHY Components"; Advanced Micro Devices, Inc.; 8-pages, 1991.

Gibson et al; Fibre Data Distributed Interface (FDDI)—Token Ring Physical Layer Medium Dependent (PMD); American National Standard for Information Systems; ANSI X3.166-1990; 56 pages, 1990.

Gibson et al; Fiber Distributed Data Interface (FDDI)—Token Ring Physical Layer Protocol (PHY); American National Standard for Information Systems; ANSI X3.148-1988; 34 pages, 1988.

Lavoisard, J. L. et al; "ISDN Customer Equipments"; Communication and Transmission, No. 3, 17-pages, 1987.

Lohse, et al; Fiber Distributed Data Interface (FDDI)—Token Ring Media Access Control (MAC); American National Standard for Information Systems; ANSI X3.139-1987; 62 pages; 1987.

Keller et al; "Performance Bottlenecks in Digital Movie Systems"; Proceedings of the 4th International Workshop on Network and Operating System Support for Digital Audio and Video, 1993, 9-pages.

Stallings, W., Local Networks, An Introduction, pp. ii, xii-xvi, pp. 373-381, 8-pages, 1984.

Stallings, W., Local Networks, An Introduction, 51-pages, 1984.

Stallings, W., Local Networks, 2nd edition, 12-pages, 1987.

Stallings, W., Local Networks, 3nd edition, 14-pages, 1990.

Strole, N.: "The IBM Token-Ring Network—A functional Overview"; IEEE Network Magazine, vol. 1, No. 1, 8-pages, 1987.

Willett, M., Token-ring Local Area Networks—An Introduction; IEEE Network Magazine, vol. 1, No. 1, 6-pages, 1987.

An Interoperable Solution for FDDI Signaling Over Shielded Twisted Pair; Advanced Micro Devices, Inc., 18-pages, 1991.

"Integrated Services Digital Network (ISDN)", International Telecommunications Union, vol. III, Fascicle III.8, 9-pages, 1988.

*Serconet, Ltd.*, v. *Netgear, Inc.* Case No. CV-06-04646 PJH, Defendant's Invalidity Contentions, Jan. 29, 2007.

*Serconet, Ltd.*, v. *Netgear, Inc.* Case No. CV-06-04646 PJH, Order Construing Claims, Jul. 30, 2007.

*Serconet, Ltd.*, v. *Netgear, Inc.* Case No. CV-06-04646 PJH, Claim Comparison Chart for USP 6,480,510, Jan. 29, 2007.

*Serconet, Ltd.*, v. *Netgear, Inc.* Case No. CV-06-04646 PJH, Claim Comparison Chart for USP 7,016,368, Jan. 29, 2007.

*Serconet, Ltd.*, v. *Netgear, Inc.* Case No. CV-06-04646 PJH, Claim Comparison Chart for USP 7,035,280, Jan. 29, 2007.

Claim Chart presented in request for reexamination of U.S. Patent No. 6,480,510 request filed Jun. 10, 2009.

Claim Chart presented in request for reexamination of U.S. Patent No. 5,841,360 request filed May 26, 2009.

Strassberg, Dan; "Home Automation Buses: Protocols Really Hit Home"; EDN Design Feature, Apr. 13, 1995 (9 pages).

Weiss, Martin B.H. et al., Internet Telephony or Circuit Switched Telephony: Which is Cheaper?, p. 1-25, Dec. 11, 1998.

Eldering, Charles A., Customer Premises Equipment for Residential Broadband Networks; IEEE Communications Magazine, p. 114-121, Jun. 1, 1997.

48-Volt DC Power Supply Connection Guide; 3Com Published Mar. 2000 (12 pages).

SuperStack II PS Hub User Guide; 3Com Published Jul. 1997 (188 pages).

SuperStack II Entry Hub User Guide; 3Com Published Nov. 1996 (8 pages).

SuperStack II Baseline Switch User Guide; 3Com Published Mar. 1998 (8 pages).

SuperStack II Baseline 10/100 switch; 3Com Published Apr. 1998 (8 pages).

SuperStack II Desktop Switch User Guide; 3Com Published Jun. 1997 (148 pages).

SuperStack II Switch 610 User Guide; 3Com Published May 1999 (54 pages).

Line carrier modems—1: Build a Pair of Line-Carrier Modems (Part 1); Radio Electronics, Jul. 1988, pp. 87-91 by Keith Nichols (7 pages).

Line carrier modems—2; Build a Pair of Line-Carrier Modems (Part 2); Radio Electronics, Aug. 1988, pp. 88-96 by Keith Nichols (5 pages).

Universal Serial Bus Specification Revision 1.0; Jan. 15, 1996 (268 pages).

'Macworld Networking Bible', Second Edition pp. 332-688, by Dave Kosiur and Joel M. Snyder, 1994, ISBN: 1-56884-194-9 (363 pages).

Hofmann, J.; "Cable, Television, and the Consumer Electronic Bus", Symposium Record, 15th International TV Symposium, Montreux, Switzerland, Jun. 11, 1987 (9 pages).

IS-60.04; Node Communications Protocol Part 6: Application Layer Specification; Revision Apr. 18, 1996 (129 pages).

Markwalter E. Brian, et. al,; CEBus Router Testing; IEEE Transactions on Consumer Electronics Nov. 1991, vol. 37 No. 4 (8 pages).

Heite C et al: "Powernet—Das Neue Eib-Medium", Elektrotechnik und Informationstechnik, Springer Verlag, Wein, AT, vol. 114, No. 5, 1997, pp. 254-257.

Ascend DSLPipe-S Specifications; copyright 1997, (2 pages).

Catalyst 5000 switching System; Cisco, 1996 (4 pages).

Catalyst 5000 Series; 1996, (12 pages).

"TeleConcepts . . . Introduces the Just Plug It in Intercom System,"TeleConcepts Brochure, Newington, CT, 2 pages, published before Jul. 3, 1995.

Continuation of IBM LAN Bridge and Switch Summary, Jan. 1996, 68 pages.

C. Valenti, "Study of the Feasibility and Advisability of Digital Subscriber Lines Operating at Rates Substantially in Excess of the Basic Access Rate", T1E1.R Technical Subcommittee (T1E1.4/91-115), pp. 2 and 4; Aug. 26, 1991.

TeleVideo Brochure, 2 pages, published before Jul. 3, 1995.

"Video Transmission System—Send Video Over Ordinary Wire—No Coax Required", Javelin Brochure, 2 pages, published before Jul. 3, 1995.

IBM LAN Bridge and Switch Summary, Jan. 1996, 108 pages.

ITU-T 1.430 Integrated Services Digital Network-Basic User-Network Interface-Layer 1 Specification. Jan. 1, 1996.

J.W. Lechleider, "Study of the Feasibility and Advisability of Digital Subscriber Lines Operating at Rates Substantially in Excess of the Basic Access Rate", T1E1.4 Technical Subcommittee (T1E1.4/89-070), 2 pages, Mar. 13, 1989.

Motorola announces key new features to cyberSURFR Cable Modem System, Mar. 17, 1997, 3 pages.

Passport PC Plug in Quick Setup Guide; Intelogis P/N 30030202, (8 pages). 1998.

3Com Product Details 3COM NBX 2101PE Basic Phone discontinued . Jan. 18, 2007, 3 pages.

\* cited by examiner

TELEPHONE OUTLET FOR IMPLEMENTING A LOCAL AREA NETWORK OVER TELEPHONE LINES AND A LOCAL AREA NETWORK USING SUCH OUTLETS

FIELD OF THE INVENTION

The present invention relates to the field of wired communication systems, and, more specifically, to the networking of devices using telephone lines.

BACKGROUND OF THE INVENTION

FIG. 1 shows the wiring configuration for a prior-art telephone system 10 for a residence or other building, wired with a telephone line 5. Residence telephone line 5 consists of single wire pair which connects to a junction-box 16, which in turn connects to a Public Switched Telephone Network (PSTN) 18 via a cable 17, terminating in a public switch 19, apparatus which establishes and enables telephony from one telephone to another. The term "analog telephony" herein denotes traditional analog low-frequency audio voice signals typically under 3 KHz, sometimes referred to as "POTS" ("plain old telephone service"), whereas the term "telephony" in general denotes any kind of telephone service, including digital service such as Integrated Services Digital Network (ISDN). The term "high-frequency" herein denotes any frequency substantially above such analog telephony audio frequencies, such as that used for data. ISDN typically uses frequencies not exceeding 100 Khz (typically the energy is concentrated around 40 Khz). The term "telephone line" herein denotes electrically-conducting lines which are intended primarily for the carrying and distribution of analog telephony, and includes, but is not limited to, such lines which may be pre-existing within a building and which may currently provide analog telephony service. The term "telephone device" herein denotes, without limitation, any apparatus for telephony (including both analog telephony and ISDN), as well as any device using telephony signals, such as fax, voice-modem, and so forth.

Junction box 16 is used to separate the in-home circuitry from the PSTN and is used as a test facility for troubleshooting as well as for wiring new telephone outlets in the home. A plurality of telephones 13a, 13b, and 13c connects to telephone line 5 via a plurality of telephone outlets 11a, 11b, 11e, and 11d. Each telephone outlet has a connector (often referred to as a "jack"), denoted in FIGS. 1 as 12a, 12b, 12c, and 12d, respectively. Each telephone outlet may be connected to a telephone via a connector (often referred to as a "plug"), denoted in FIG. 1 (for the three telephone illustrated) as 14a, 14b, and 14c, respectively. It is also important to note that lines 5a, 5b, 5c, 5d, and 5e are electrically the same paired conductors. There is a requirement, for using the existing telephone infrastructure for both telephone and data networking. In this way, the task of establishing a new local area network in a home or other building is simplified, because there would be no additional wires to install. U.S. Pat. No. 4,766,402 to Crane (hereinafter referred to as "Crane") teaches a way to final LAN over two-wire telephone lines, but without the telephone service.

The concept of frequency domain/division multiplexing (FDM) is well-known in the art, and provides means of splitting the bandwidth carried by a wire into a low-frequency band capable of carrying an analog telephony signal and a high-frequency band capable of carrying data communication or other signals. Such a mechanism is described for example in U.S. Pat. No. 4,785,448 to Reichert et al. (hereinafter referred to as "Reichert"). Also is widely used are xDSL systems, primarily Asymmetric Digital Subscriber Loop (ADSL) systems.

Relevant prior art in this field is also disclosed in U.S. Pat. No. 5,896,443 to Dichter (hereinafter referred to as "Dichter"). Dichter is the first to suggest a method and apparatus for applying such a technique for residence telephone wiring, enabling simultaneously carrying telephone and data communication signals. The Dichter network is illustrated in FIG. 2, which shows a network 20 serving both telephones and a local area network. Data Terminal Equipment (DTE) units 24a, 24b, and 24c are connected to the local area network via Data Communication Equipment (DCE) units 23a, 23b, and 23c, respectively. Examples of Data Communication Equipment include modems, line drivers, line receivers, and transceivers. DCE units 23a, 23b, and 23c are respectively connected to high pass filters (HPF) 22a, 22b, and 22c. The HPF's allow the DCE units access to the high-frequency band carried by telephone line 5. In a first embodiment (not shown in FIG. 2), telephones 13a, 13b, and 13c are directly connected to telephone line 5 via connectors 14a, 14h, and 14c, respectively. However, in order to avoid interference to the data network caused by the telephones, a second embodiment is suggested (shown in FIG. 2), wherein low pass filters (LPF's) 21a, 21b, and 21c are added to isolate telephones 13a, 13b, and 13c from telephone line 5. Furthermore, a low pass filter must also be connected to Junction-Box 16, in order to filter noises induced from or to the PSTN wiring 17. As is the case in FIG. 1, it is important to note that lines 5a, 5b, 5c, 5d, and 5e are electrically the same paired conductors.

However, the Dichter network suffers from degraded data communication performance, because of the following drawbacks:

1. Induced noise in the band used by the data communication network is distributed throughout the network. The telephone line within a building serves as a long antenna, receiving electromagnetic noise produced from outside the building or by local equipment such as air-conditioning systems, appliances, and so forth. Electrical noise in the frequency band used by the data communication network can be induced in the extremities of telephone line 5 (line 5e or 5a in FIG. 2) and propagated via telephone line 5 throughout the whole system. This is liable to cause errors in the data transportation.
2. The wiring media consists of a single long wire (telephone line 5). In order to ensure a proper impedance match to this transmission-line, it is necessary to install terminators at each end of telephone line 5. One of the advantages of using the telephone infrastructure for a data network, however, is to avoid replacing the internal wiring. Thus, either such terminators must be installed at additional cost, or suffer the performance problems associated with an impedance mismatch.
3. In the case where LPF 21 is not fitted to the telephones 13, each connected telephone appears as a non-terminated stub, and this is liable to cause undesirable signal reflections.
4. In one embodiment, LPF 21 is to be attached to each telephone 13. In such a configuration, an additional modification to the telephone itself is required. This further makes the implementation of such system complex and costly, and defeats the purpose of using an existing telephone line and telephone sets 'as is' for a data network.

5. The data communication network used in the Dichter network supports only the 'bus' type of data communication network, wherein all devices share the same physical media. Such topology suffers from a number of drawbacks, as described in U.S. Pat. No. 5,841,360 to the present inventor, which is incorporated by reference for all purposes as if fully set forth herein. Dichter also discloses drawbacks of the bus topology, including the need for bus mastering and logic to contend with the data packet collision problem. Topologies that are preferable to the bus topology include the Token-Ring (IEEE 803), the PSIC network according to U.S. Pat. No. 5,841,360, and other point-to-point networks known in the art (such as a serial point-to-point 'daisy chain' network). Such networks are in most cases superior to 'bus' topology systems.

The above drawbacks affect the data communication performance of the Dichter network, and therefore limit the total distance and the maximum data rate such a network can support. In addition, the Dichter network typically requires a complex and therefore costly transceiver to support the data communication system. While the Reichert network relies on a star topology and does not suffer from these drawbacks of the bus topology, the star topology also has disadvantages. First, the star topology requires a complex and costly hub module, whose capacity limits the capacity of the network. Furthermore, the star configuration requires that there exist wiring from every device on the network to a central location, where the hub module is situated. This may be impractical and/or expensive to achieve, especially in the case where the wiring of an existing telephone system is to be utilized. The Reichert network is intended for use only in offices where a central telephone connection point already exists. Moreover, the Reichert network requires a separate telephone line for each separate telephone device, and this, too, may be impractical and/or expensive to achieve.

Although the above-mentioned prior-art networks utilize existing in-home telephone lines and feature easy installation and use without any additions or modifications to the telephone line infrastructure (wires, outlets, etc.), they require dedicated, non-standard, and complex DCE's, modems, and filters, and cannot employ standard interfaces. For example, Ethernet (such as IEEE802.3) and other standards are commonly used for personal computers communication in Local Area network (LAN) environments. With prior-art techniques, in order to support communication between computers, each computer must be equipped with an additional modem for communicating over the telephone line. Whether these additional modems are integrated into the computer (e.g. as plug-in or built-in hardware) or are furnished as external units between the computer and the telephone line, additional equipment is required. The prior-art networks therefore incur additional cost, space, installation labor, electricity, and complexity. It would therefore be desirable to provide a network which contains integral therewith the necessary standard interfaces, thereby obviating the need to provide such interfaces in the DTE's.

There is thus a widely-recognized need for, and it would be highly advantageous to have, a means for implementing a data communication network using existing telephone lines of arbitrary topology, which continues to support analog telephony, while also allowing for improved communication characteristics by supporting a point-to-point topology network.

Furthermore, there is also a need for, and it would be highly advantageous to have, a means and method for implementing such an in-house data communication network using existing telephone lines, wherein the DTE's (e.g. computers, appliances) can be interconnected solely by using standard interfaces, without the need for modifications or adding external units to the DTE's.

SUMMARY OF THE INVENTION

It is therefore an object of the present invention to provide a method and apparatus for upgrading an existing telephone line wiring system within a residence or other building, to provide both analog telephony service and a local area data network featuring a serial "daisy chained" or other arbitrary topology.

To this end, the regular telephone outlets are first replaced with network outlets to allow splitting of the telephone line having two or more conductors into segments such that each segment connecting two network outlets is fully separated from all other segments. Each segment has two ends, to which various devices, other segments, and so forth, may be connected via the network outlets, and are such that the segments can concurrently transport telephony and data communications signals. A network outlet contains a low pass filter, which is connected in series to each end of the segment, thereby foaming a low-frequency between the external ports of the low pass filters, utilizing the low-frequency band. Similarly, a network outlet contains a high pass filter, which is connected in series to each end of the segment, thereby forming a high-frequency path between the external ports of the high pass filters, utilizing the high-frequency band The bandwidth carried by the segments is thereby split into non-overlapping frequency bands, and the distinct paths can be interconnected via the high pass filters and low pass filters as coupling and isolating devices to form different paths. Depending on how the devices and paths are selectively connected, these paths may be simultaneously different for different frequencies. A low-frequency band is allocated to regular telephone service (analog telephony), while a high-frequency band is allocated to the data communication network. In the low-frequency (analog telephony) band, the wiring composed of the coupled low-frequency paths appears as a normal telephone line, in such a way that the low-frequency (analog telephony) band is coupled among all the segments and is accessible to telephone devices at any network outlet, whereas the segments may remain individually isolated in the high-frequency (data) band, so that in this data band the communication media, if desired, can appear to be point-to-point (such as a serialized "daisy chain") from one network outlet to the next. The term "low pass filter" herein denotes any device that passes signals in the low-frequency (analog telephony) band but blocks signals in the high-frequency (data) band. Conversely, the term "high pass filter" herein denotes any device that passes signals in the high-frequency (data) band but blocks signals in the low-frequency (analog telephony) band. The term "data device" herein denotes any apparatus that handles digital data, including without limitation modems, transceivers, Data Communication Equipment, and Data Terminal Equipment.

Each network outlet has a standard data interface connector which is coupled to data interface circuitry for establishing a data connection between one or more segments and a data device, such as Data Terminal Equipment, connected to the data interface connector.

A network according to the present invention allows the telephone devices to be connected as in a normal telephone installation (i.e., in parallel over the telephone lines), but can be configured to virtually any desired topology for data transport and distribution, as determined by the available existing telephone line wiring and without being constrained to any predetermined data network topology. Moreover, such a network offers the potential for the improved data transport and distribution performance of a point-to-point network topology, while still allowing a bus-type data network topology in all or part of the network if desired. This is in contrast to the prior art, which constrains the network topology to a predetermined type.

Data Terminal Equipment as well as telephone devices can be readily connected to the network outlets using standard interfaces and connectors, thereby allowing a data communications network as well as a telephone system to be easily configured, such that both the data communications network and the telephone system can operate simultaneously without interference between one another.

A network according to the present invention may be used advantageously when connected to external systems and networks, such as xDSL, ADSL, as well as the Internet.

In a first embodiment, the high pass filters are connected in such a way to create a virtual 'bus' topology for the high-frequency band, allowing for a local area network based on DCE units or transceivers connected to the segments via the high pass filters. In a second embodiment, each segment end is connected to a dedicated modem, hence offering a serial point-to-point daisy chain network. In all embodiments of the present invention, DTE units or other devices connected to the DCE units can communicate over the telephone line without interfering with, or being affected by, simultaneous analog telephony service. Unlike prior-art networks, the topology of a network according to the present invention is not constrained to a particular network topology determined in advance, but can be adapted to the configuration of an existing telephone line installation. Moreover, embodiments of the present invention that feature point-to-point data network topologies exhibit the superior performance characteristics that such topologies offer over the bus network topologies of the prior art, such as the Dichter network and the Crane network.

Therefore, according to a first aspect of the present invention there is provided a local area network within a building, for transporting data among a plurality of data devices, the local area network including:
 (a) at least two network outlets, each of said network outlets having:
   i) at least one data interface connector and data interface circuitry coupled to said data interface connector and operative to establishing a data connection between a data device and said data interface connector;
   ii) at least one standard telephone connector operative to supporting standard telephony service by connecting a standard telephone device;
   iii) a splitter operative to separating telephony and data communications signals; and
   iv) a coupler operative to combining telephony and data communications signals;
 (b) at least one telephone line segment within the walls of the building, each said telephone line segment connecting at least two of said network outlets and having at least two conductors, said telephone line segment operative to concurrently transporting telephony and data communication signals; and
 (c) at least one modem housed within each of said network outlets for establishing a data connection over said at least one telephone line segment, said at least one modem operative to transmitting and receiving signals over said telephone line segment, and coupled thereto.

According to a second aspect of the invention there is provided a network outlet for configuring a local area network for the transport of data across telephone lines and for enabling telephony across the telephone lines simultaneous with the transport of data, the network outlet comprising:
 (a) at least one data interface connector and data interface circuitry coupled to said at least one data interface connector and being jointly operative to establishing a data connection between a data device and said at least one data interface connector;
 (b) at least one telephone connector operative to supporting standard telephony service by connecting a standard telephone device thereto;
 (c) a splitter adapted to be coupled to the telephone lines and being operative to separating telephony and data communications signals transported over the telephone lines; and
 (d) a coupler having an output adapted to be coupled to the telephone lines and being operative to combining telephony and data communications signals to be transported over the telephone lines.

According to a third aspect, the invention provides a method for upgrading an misting telephone system to operate both for telephony and as a local area network for transporting data among a plurality of data devices, the telephone system having a plurality of telephone outlets connected to at least one telephone line within the walls of a building, the method comprising the steps of:
 (a) mechanically removing at least two of the telephone outlets from the walls of the building;
 (b) electrically disconnecting said at least two telephone outlets from the at least one telephone line;
 (c) providing at least two network outlets, each of said network outlets having a data interface connector and data interface circuitry coupled to said data interface connector and operative to establishing a data connection between a data device and said data interface connector;
 (d) electrically connecting said network outlets to the at least one telephone line; and
 (e) mechanically securing said network outlets to the wall.

BRIEF DESCRIPTION OF THE DRAWINGS

The invention is herein described, by way of non-limiting example only, with reference to the accompanying drawings, wherein.

DETAILED DESCRIPTION OF PREFERRED EMBODIMENTS

Figure 1:
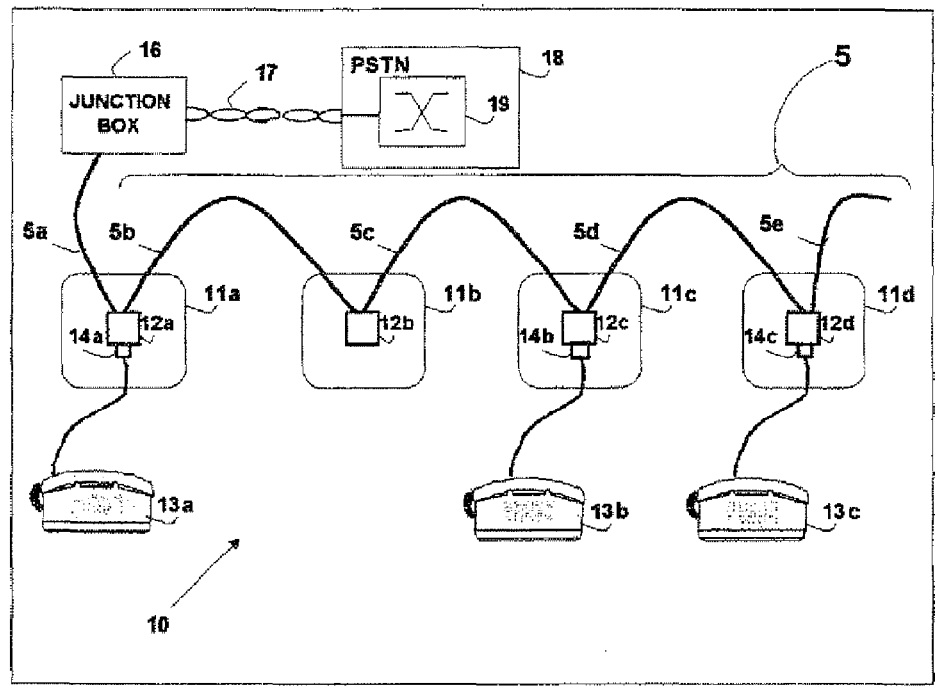
FIG. 1 shows a common prior art telephone line wiring configuration for a residence or other building.

The principles and operation of a network according to the present invention may be understood with reference to the drawings and the accompanying description.

The drawings and descriptions are conceptual only. In actual practice, a single component can implement one or more functions; alternatively, each function can be implemented by a plurality of components and circuits. In the drawings and descriptions, identical reference numerals indicate those components which are common to different embodiments or configurations.

Figure 3:
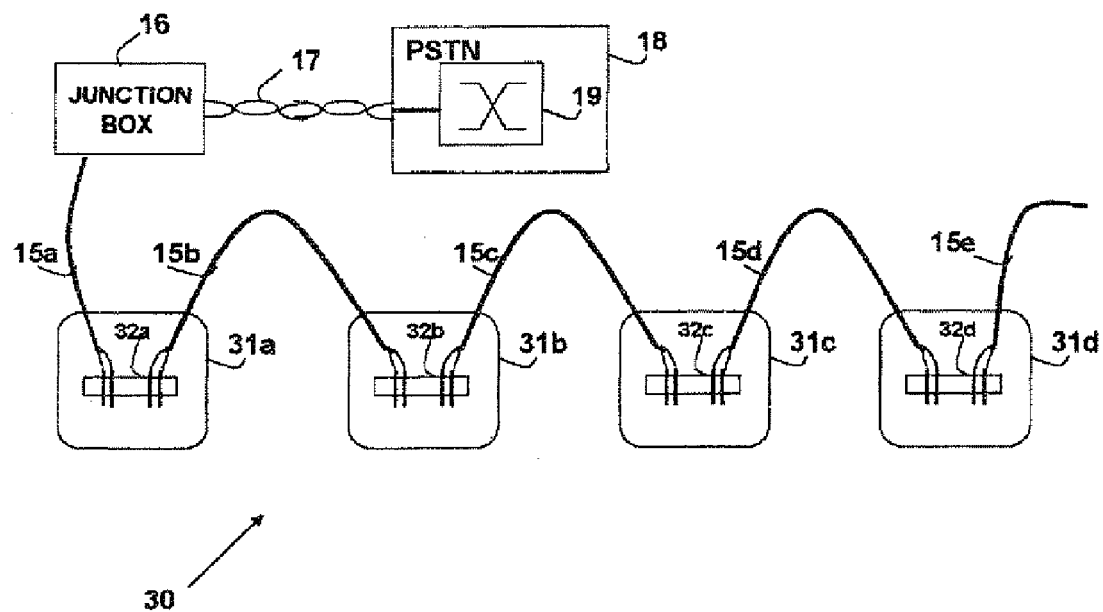
FIG. 3 shows modifications to telephone line wiring according to the present invention for a local area network.

The basic concept of the invention is shown in FIG. 3. A network 30 is based on network outlets 31a, 31b, 31c, and 31d. The installation of a network supporting both telephony and data communications relates to the installation of such network outlets. Similarly, the upgrade of an existing telephone system relates to replacing the existing telephone outlets with network outlets. In the descriptions which follow, an upgrade of an existing telephone system is assumed, but the procedures can also be applied in a like manner for an initial installation that supports both telephony and data communications.

A network outlet is physically similar in size, shape, and overall appearance to a standard telephone outlet, so that a network outlet can be substituted for a standard telephone outlet in the building wall. No changes are required in the overall telephone line layout or configuration. The wiring is changed by separating the wires at each network outlet into distinct segments of electrically-conducting media. Thus, each segment connecting two network outlets can be individually accessed fern either end. In the prior art Dichter network, the telephone wiring is not changed, and is continuously conductive from junction box 16 throughout the system. According to the present invention, the telephone line is broken into electrically distinct isolated segments 15a, 15b, 15c, 15d, and 15e, each of which connects two network outlets. In order to fully access the media, each of connectors 32a, 32b, 32c, and 32d must support four connections, two in each segment. This modification to the telephone line can be carried out by replacing each of the telephone outlets 31a, 31b, 31c, and 31d. As will be explained later, the substitutions need be performed only at those places where it is desirable to be able to connect to data network devices. A minimum of two telephone outlets must be replaced with network outlets, enabling data communication between those network outlets only.

Figure 4:
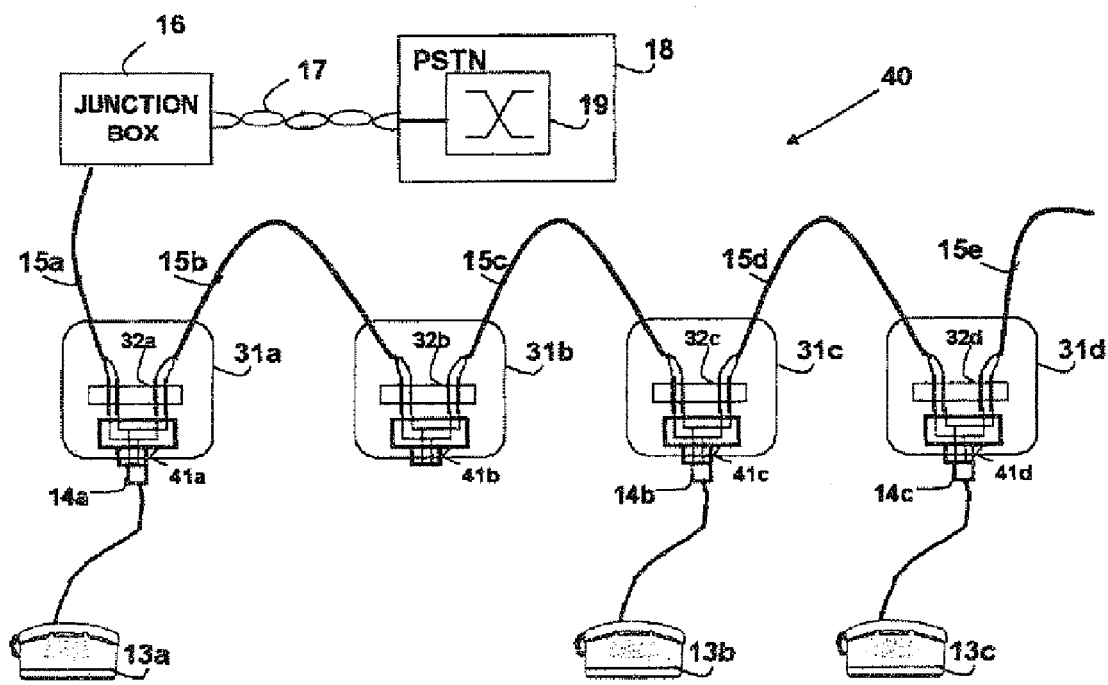
FIG. 4 shows modifications to telephone line wiring according to the present invention, to support regular telephone service operation.

FIG. 4 shows how a network 40 of the present invention continues to support regular telephone service, by the installation of jumpers 41a, 41b, 41c, and 41d in network outlets 31a, 31b, 31c and 31d respectively. At each network outlet where they are installed, the jumpers connect both segment ends and allow telephone connection to the combined segment. Installation of a jumper effects a re-connection of the split telephone line at the point of installation. Installation of jumpers at all network outlets would reconstruct the prior art telephone line configuration as shown in FIG. 1. Such jumpers can be add-ons to the network outlets, integrated within the network outlets, or integrated into a separate module. Alternately, a jumper can be integrated within a telephone set, as part of connector 14. The term "jumper" herein denotes any device for selectively coupling or isolating the distinct segments in a way that is not specific to the frequency band of the coupled or isolated signals. Jumper 41 can be implemented with a simple electrical connection between the connection points of connector 32 and the external connection of the telephone.

As described above, jumpers 41 are to be installed in all network outlets which are not required for connection to the data communication network. Those network outlets which are required to support data communication connections, however, will not use jumper 41 but rather a splitter 50, shown in FIG. 5. Such a splitter connects to both segments in each network outlet 31 via connector 32, using a port 54 for a first connection and a port 55 for a second connection. Splitter 50 has two LPF's for maintaining the continuity of the audio/telephone low-frequency band. After low pass filtering by LPF 51a for the port 54 and LPF 51b for port 55, the analog telephony signals are connected together and connected to a telephone connector 53, which may be a standard telephone connector. Hence, from the telephone signal point of view, the splitter 50 provides the same continuity and telephone access provided by the jumper 41. On the other hand, the data communication network employs the high-frequency band, access to which is made via HPF's 52a and 52b. HPF 52a is connected to port 54 and HPF 52b is connected to port 55. The high pass filtered signals are not passed from port 54 to port 55, but are kept separate, and are routed to a data interface connector 56 and a data interface connector 57, respectively, which may be standard data connectors. The term "splitter" herein denotes any device for selectively coupling or isolating the distinct segments that is specific to the frequency band of the coupled or isolated signals. The term "coupler" is used herein in reference to any device used for combining separate signals into a combined signal encompassing the originally-separate signals, including a device such as a splitter used for signal coupling.

Therefore, when installed in a network outlet, splitter 50 serves two functions. With respect to the low-frequency analog telephony band, splitter 50 establishes a coupling to effect the prior-art configuration shown in FIG. 1, wherein all telephone devices in the premises are connected virtually in parallel via the telephone line, as if the telephone line were not broken into segments. On the other hand, with respect to the high-frequency data communication network, splitter 50 establishes electrical isolation to effect the configuration shown in FIG. 3, wherein the segments are separated, and access to each segment end is provided by the network outlets. With the use of splitters, the telephone system and the data communication network are actually decoupled, with each supporting a different topology.

Figure 6:
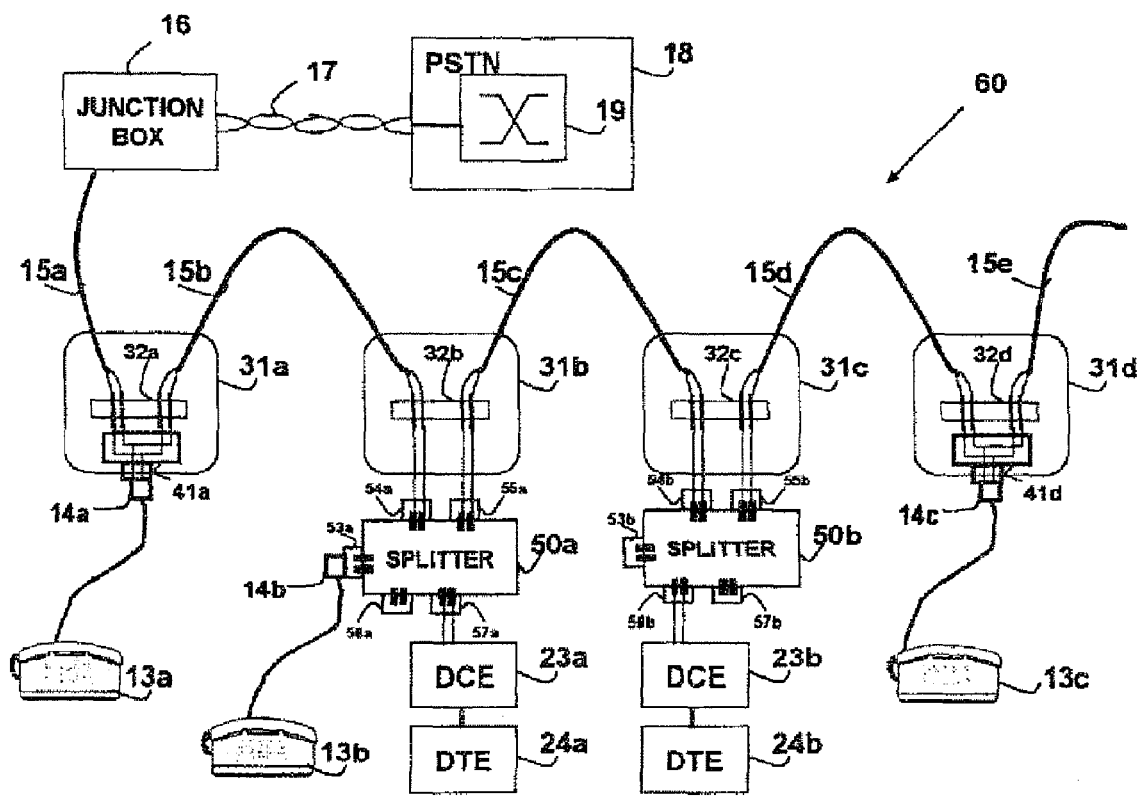
FIG. 6 shows a local area network based on telephone lines according to the present invention, wherein the network supports two devices at adjacent network outlets.

FIG. 6 shows a first embodiment of a data communication network 60 between two DTE units 24a and 24b, connected to adjacent network outlets 31b and 31c, which are connected together via a single segment 15c. Splitters 50a and 50b are connected to network outlets 31b and 31c via connectors 32b and 32c, respectively. As explained above, the splitters allow transparent audio/telephone signal connection. Thus, for analog telephony, the telephone line remains virtually unchanged, allowing access to telephone external connection 17 via junction box 16 for telephones 13a and 13c. Likewise, telephone 13b connected via connector 14b to a connector 53a on splitter 50a, is also connected to the telephone line. In a similar way, an additional telephone can be added to network outlet 31c by connecting the telephone to connector 53b on splitter 50b. It should be clear that connecting a telephone to a network outlet, either via jumper 41 or via splitter 50 does not affect the data communication network.

Figure 5:
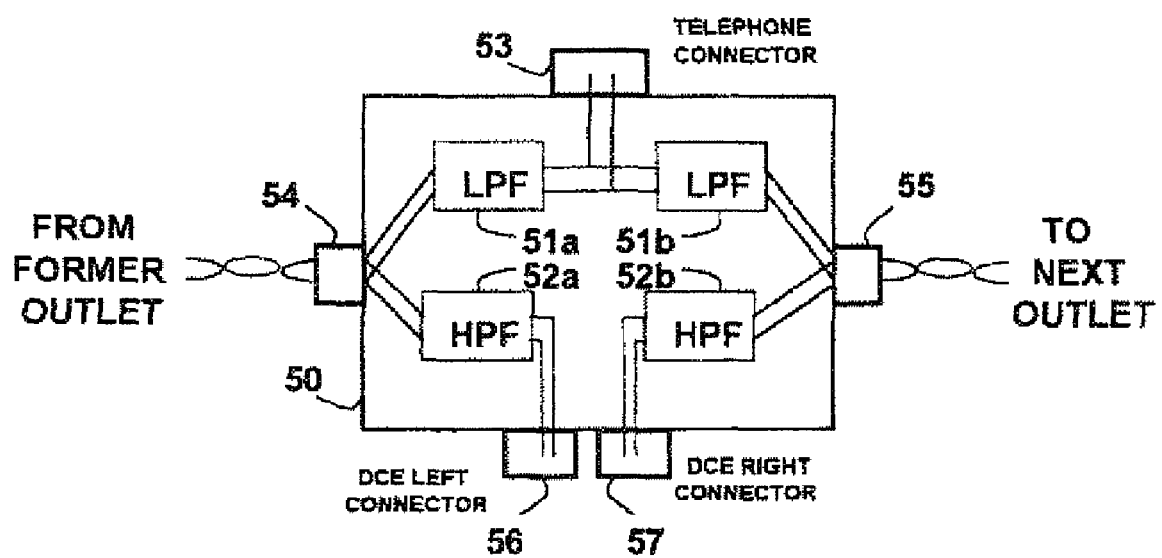
FIG. 5 shows a splitter according to the present invention.

Network 60 (FIG. 6) supports data communication by providing a communication path between port 57a of splitter 50a and port 56b of splitter 50b. Between those ports there exists a point-to-point connection for the high-frequency portion of the signal spectrum, as determined by HPF 52a and 52b within splitters 50 (FIG. 5). This path can be used to establish a communication link between DTE units 24a and 24b, by means of DCE units 23a and 23b, which are respectively connected to ports 57a and 56b. The communication between DTE units 24a and 24b can be unidirectional, half-duplex, or full-duplex. The only limitation imposed on the communication system is the capability to use the high-frequency portion of the spectrum of segment 15e. As an example, the implementation of data transmission over a telephone line point-to-point system described in Reichert can also be used in network 60. Reichert implements both LPF and HPF by means of a transformer with a capacitor connected in the center-tap, as is well-known in the art. Similarly, splitter 50 can be easily implemented by two such circuits, one for each side.

It should also be apparent that HPF 52a in splitter 50a and HPF 52b in splitter 50b can be omitted, because neither port 56a in splitter 50a nor port 57b in splitter 50b is connected.

Network 60 provides clear advantages over the networks described in the prior art. First, the communication media supports point-to-point connections, which are known to be superior to multi-tap (bus) connections for communication performance. In addition, terminators can be used within each splitter or DCE unit, providing a superior match to the transmission line characteristics. Furthermore, no taps (drops) exists in the media, thereby avoiding impedance matching problems and the reflections that result therefrom.

Moreover, the data communication system in network 60 is isolated from noises from both the network and the 'left' part of the telephone network (Segments 15a and 15b), as well as noises induced from the 'right' portion of the network (Segments 15d and 15e). Such isolation is not provided in any prior-art implementation. Dichter suggests installation of a low pass filter in the junction box, which is not a satisfactory solution since the junction box is usually owned by the telephone service provider and cannot always be accessed. Furthermore, safety issues such as isolation, lightning protection, power-cross and other issues are involved in such a modification.

Implementing splitter 50 by passive components only, such as two transformers and two center-tap capacitors, is also advantageous, since the reliability of the telephone service will not be degraded, even in the case of failure in any DCE unit, and furthermore requires no external power. This accommodates a 'life-line' function, which provides for continuous telephone service even in the event of other system malfunction (e.g. electrical failures).

The splitter 50 can be integrated into network outlet 31. In such a case, network outlets equipped with splitter 50 will have two types of connectors: One regular telephone connector based on port 53, and one or two connectors providing access to ports 56 and 57 (a single quadruple-circuit connector or two double-circuit connectors). Alternatively, splitter 50 can be an independent module attached as an add-on to network outlet 31. In another embodiment, the splitter is included as part of DCE 23. However, in order for network 60 to operate properly, either jumper 41 or splitter 50 must be employed in network outlet 31 as modified in order to split connector 32 according to the present invention, allowing the retaining of regular telephone service.

Figure 7:
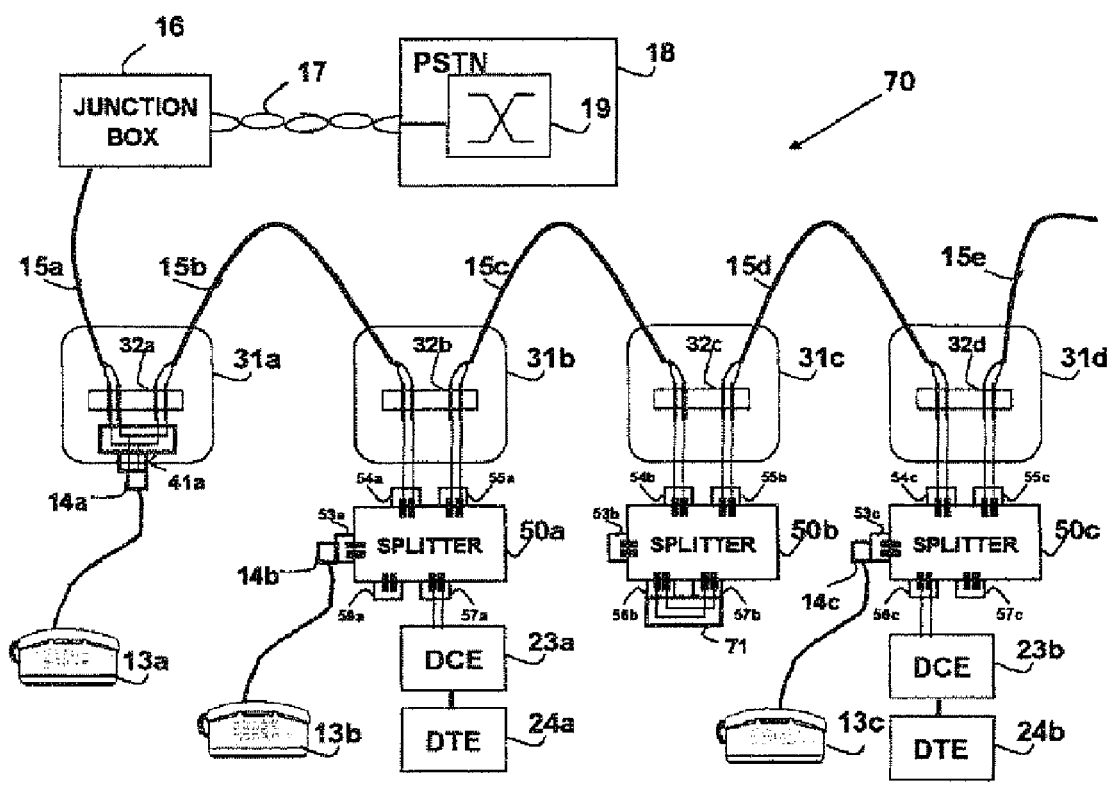
FIG. 7 shows a first embodiment of a local area network based on telephone lines according to the present invention, wherein the network supports two devices at non-adjacent network outlets.

FIG. 7 also shows data communication between two DTE units 24a and 24b in a network 70. However, in the case of network 70, DTE units 24a and 24b are located at network outlets 31b and 31d, which are not directly connected, but have an additional network outlet 31c interposed between. Network outlet 31c is connected to network outlet 31b via a segment 15c, and to network outlet 31d via a segment 15d.

In one embodiment of network 70, a jumper (not shown, but similar to jumper 41 in FIG. 4) is connected to a connector 32c in network outlet 31 c. The previous discussion regarding the splitting of the signal spectrum also applies here, and allows for data transport between DTE units 24a and 24b via the high-frequency portion of the spectrum across segments 15c and 15d. When only jumper 41 is connected at network outlet 31c, the same point-to-point performance as previously discussed can be expected; the only influence on communication performance is from the addition of segment 15d, which extends the length of the media and hence leads to increased signal attenuation. Some degradation, however, can also be expected when a telephone is connected to jumper 41 at network outlet 31e. Such degradation can be the result of noise produced by the telephone in the high-frequency data communication band, as well as the result the addition of a tap caused by the telephone connection, which usually has a non-matched termination. Those problems can be overcome by installing a low pass filter in the telephone.

In a preferred embodiment of network 70, a splitter 50b is installed in network outlet 31c. Splitter 50b provides the LPF functionality, and allows for connecting a telephone via connector 53b. However, in order to allow for continuity in data communication, there must be a connection between the circuits in connectors 56b and 57b. Such a connection is obtained by a jumper 71, as shown in FIG. 7. Installation of splitter 50b and jumper 71 provides good communication performance, similar to network 60 (FIG. 6). From this discussion of a system wherein there is only one unused network outlet between the network outlets to which the DIE units are connected, it should be clear that the any number of unused network outlets between the network outlets to which the DTE units are connected can be handled in the same manner.

Figure 8:
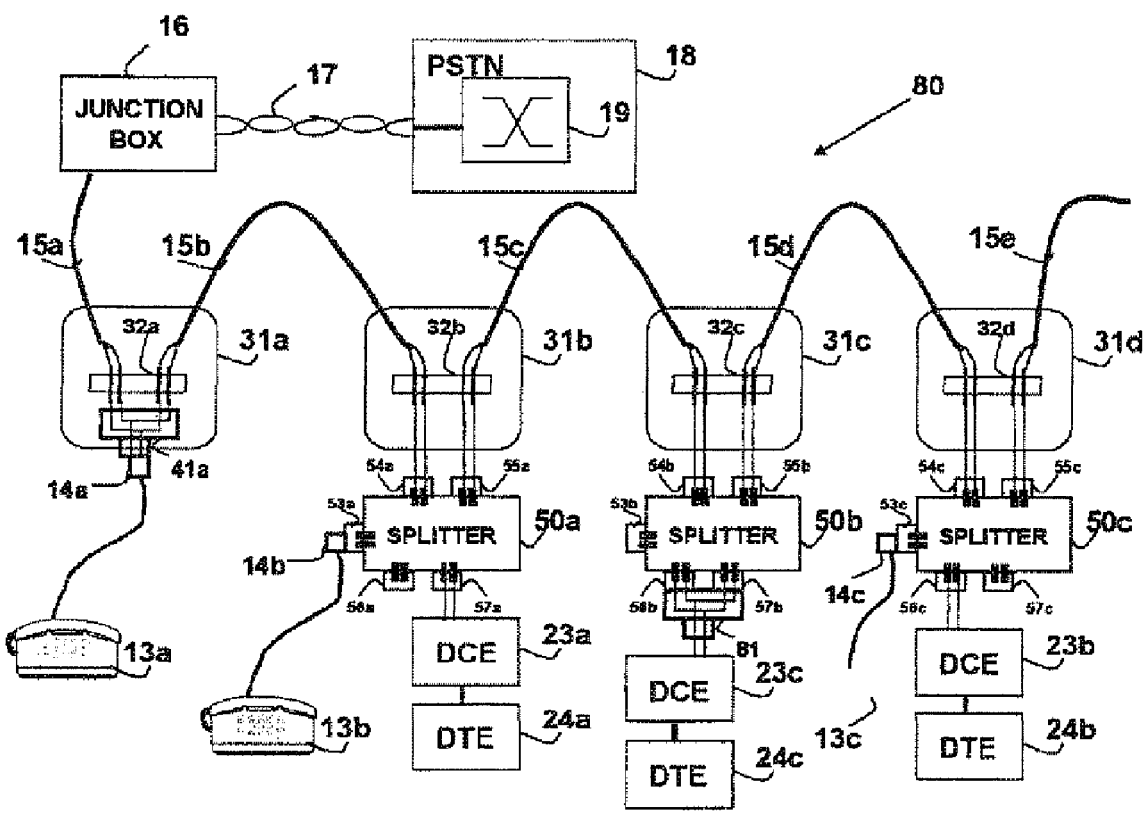
FIG. 8 shows a second embodiment of a local area network based on telephone lines according to the present invention, wherein the network supports three devices at adjacent network outlets.

For the purpose of the foregoing discussions, only two communicating DTE units have been described. However, the present invention can be easily applied to any number of DTE units. FIG. 8 illustrates a network 80 supporting three DTE units 24a, 24b, and 24c, connected thereto via DCE units 23a, 23b, and 23c, respectively. The structure of network 80 is the same as that of network 70 (FIG. 7), with the exception of the substitution of jumper 71 with a jumper 81,. Jumper 81 makes a connection between ports 56b and 57b in the same way as does jumper 71. However, in a manner similar to that of jumper 41 (FIG. 4), jumper 81 further allows for an external connection to the joined circuits, allowing the connection of external unit, such as a DCE unit 23c. In this way, segments 15c and 15d appear electrically-connected for high-frequency signals, and constitute media for a data communication network connecting DTE units 24a, 24b, and 24c. Obviously, this configuration can be adapted to any number of network outlets and DIE units. In fact, any data communication network which supports a 'bus' or multi-point connection over two-conductor media, and which also makes use of the higher-frequency part of the spectrum can be used. In addition, the discussion and techniques explained in the Dichter patent are equally applicable here. Some networks, such as Ethernet IEEE 802.3 interface 10BaseT and 100BaseTX, require a four-conductor connection, two conductors (usually single twisted-wire pair) for transmitting, and two conductors (usually another twisted-wire pair) for receiving. As is known in the art, a four-to-two wires converter (commonly known as hybrid) can be used to convert the four wires required into two, thereby allowing network data transport over telephone lines according to the present invention. A network according to the present invention can therefore be an Ethernet network.

As with jumper 41 (FIG. 4), jumper 81 can be an integral part of splitter 50, an integral part of DCE 23, or a separate component.

In order to simplify the installation and operation of a network, it is beneficial to use the same equipment in all parts of the network. One such embodiment supporting this approach is shown in for a set of three similar network outlets in FIG. 8, illustrating network 80. In network 80, network outlets 31b, 31c, and 31d are similar and are all used as part of the data communication network. Therefore for uniformity, these network outlets are all coupled to splitters 50a, 50b, and 50c respectively, to which jumpers are attached, such as a jumper 81 attached to splitter 50b (the corresponding jumpers attached to splitter 50a and splitter 50c have been omitted from FIG. 8 for clarity), and thus provide connections to local DCE units 23a, 23c, and 23h, respectively. in a preferred embodiment of the present invention, all telephone outlets in the building will be replaced by network outlets which include both splitter 50 and jumper 81 functionalities. Each such network outlet will provide two connectors: one connector coupled to port 53 for a telephone connection, and the other connector coupled to jumper 81 for a DCE connection.

The terms "standard connector", "standard telephone connector", and "standard data connector" are used herein to denote any connectors which are industry-standard or de facto standard connectors. Likewise, the term "standard telephone device" is used herein to denote any telephone device which is a commercial standard or de facto standard telephone device, and the term "standard telephony service" is used herein to denote any commercially-standard or de facto standard telephony.

In yet another embodiment, DCE 23 and splitter 50 are integrated into the housing of network outlet 31, thereby offering a direct DTE connection. In a preferred embodiment, a standard DTE interface is employed.

Figure 9:
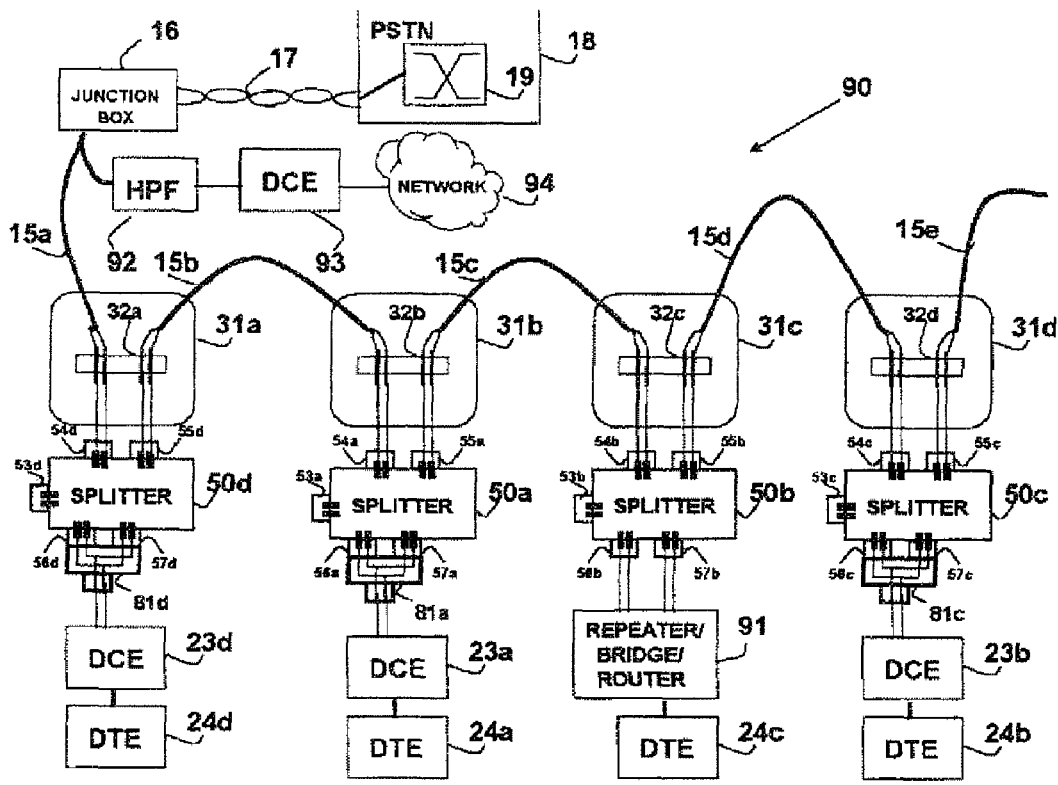
FIG. 9 shows third embodiment of a local area network based on telephone lines according to the present invention, wherein the network is a bus type network.

In most 'bus' type networks, it is occasionally required to split the network into sections, and connect the sections via repeaters (to compensate for long cabling), via bridges (to decouple each section from the others), or via routers. This may also be according to the present invention, as illustrated in FIG. 9 for a network 90, which employs a repeater/bridge/router unit 91. Unit 91 can perform repeating, bridging, routing, or any other function associated with a split between two or more networks: As illustrated, a splitter 50b is coupled to a network outlet 31c, in a manner similar to the other network outlets and splitters of network 90. However, at splitter 50b, no jumper is employed. Instead, a repeater/bridge/router unit 91 is connected between port 56b and port 57b, thereby providing a connection between separate parts of network 90. Optionally, unit 91 can also provide an interface to DTE 24c for access to network 90.

As illustrated above, a network outlet can also function as a repeater by the inclusion of the appropriate data interface circuitry. Circuitry implementing modems, and splitters, such as the high pass filters as well as the low pass filters, can function as data interface circuitry.

FIG. 9 also demonstrates the capability of connecting to external DTE units or networks, via a high pass filter 92 connected to a line 15a. Alternatively, HPF 92 can be installed in junction box 16. HPF 92 allows for additional external units to access network 90. As shown in FIG. 9, HPF 92 is coupled to a DCE unit 93, which in turn is connected to a network 94. In this configuration, the local data communication network in the building becomes part of network 94. In one embodiment, network 94 offers ADSL service, thereby allowing the DTE units 24d, 24a, 24c, and 24b within the building to communicate with the ADSL network. The capability of communicating with external DTE units or networks is equally applicable to all other embodiments of the present invention, but for clarity is omitted from the other drawings.

Figure 10:
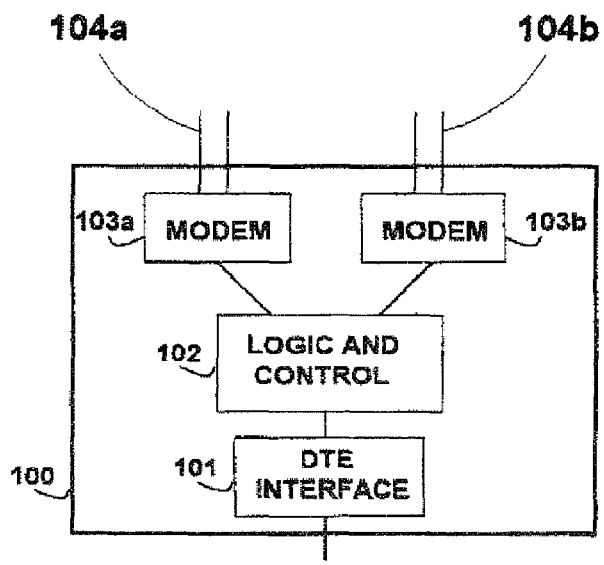
FIG. 10 shows a node of local area network based on telephone lines according to the present invention.

While the foregoing relates to data communication networks employing bus topology, the present invention can also support networks where the physical layer is distinct within each communication link. Such a network can be a Token-Passing or Token-Ring network according to IEEE 802, or preferably a PSIC network as described in U.S. Pat. No. 5,841,360 to the present inventor, which details the advantages of such a topology. FIG. 10 illustrates a node 100 for implementing such a network. Node 100 employs two modems 103a and 103b, which handle the communication physical layer. Modems 103a and 103b are independent, and couple to dedicated communication links 104a and 104b, respectively. Node 100 also features a DTE interface 101 for connecting to a DTE unit (not shown). A control and logic unit 102 manages the higher OSI layers of the data communication above the physical layer, processing the data to and from a connected DTE and handling the network control. Detailed discussion about such node 100 and the functioning thereof can be found in U.S. Pat. No. 5,841,360 and other sources known in the art.

Figure 11A:
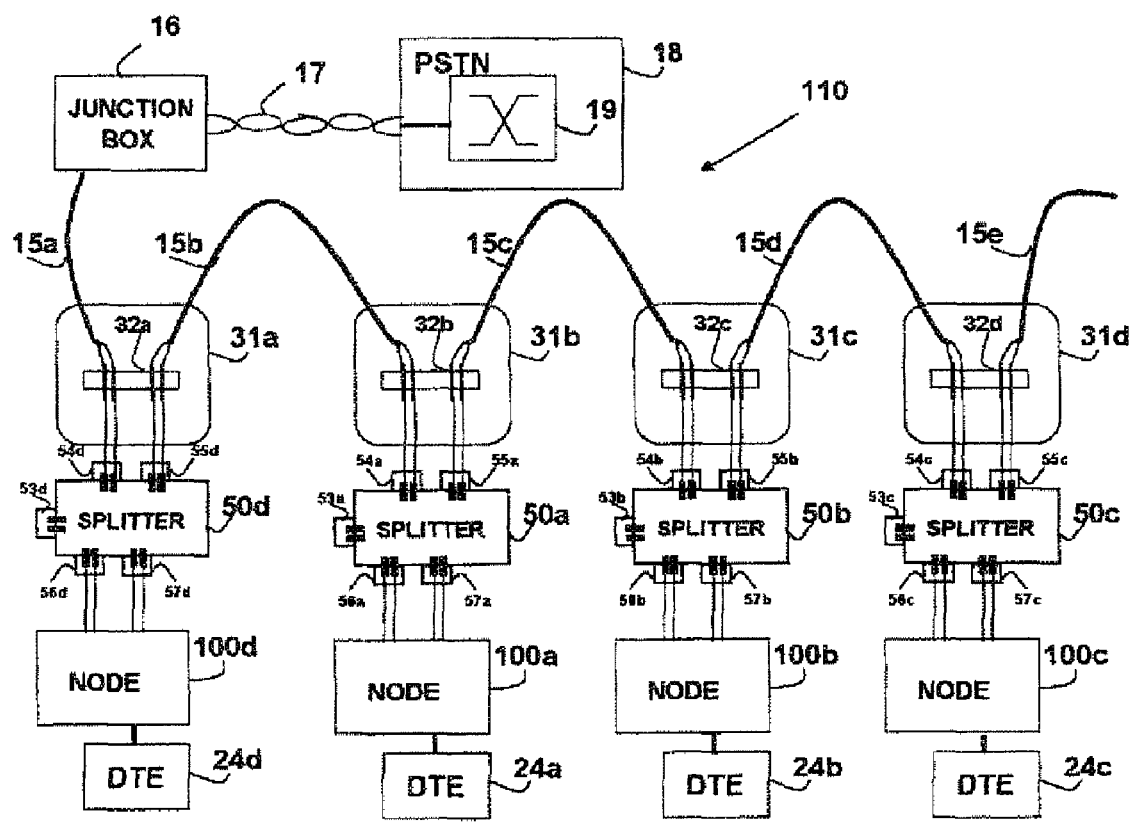
FIG. 11A shows a fourth embodiment of a local area network based on telephone lines according to the present invention.

FIG. 11 describes a network 110 containing nodes 100d, 100a, 100b, and 100c coupled directly to splitters 50d, 50a, 50b and 50c, which in turn are coupled to network outlets 31a, 31b, 31c, and 31d respectively. Each node 100 has access to the corresponding splitter 50 via two pairs of contacts, one of which is to connector 56 and the other of which is to connector 57. In his way, for example, node 100a has independent access to both segment 15b and segment 15c. This arrangement allows building a network connecting DTE units 24d, 24a, 24b, and 24c via nodes 100d, 100a, 100b, and 100c, respectively.

For clarity, telephones are omitted from FIGS. 9 and 11, but it should be clear that telephones can be connected or removed without affecting the data communication network. Telephones can be connected as required via connectors 53 of splitters 50. In general, according to the present invention, a telephone can be connected without any modifications either to a splitter 50 (as in FIG. 8) or to a jumper 41 (as in FIG. 4).

Figure 2:
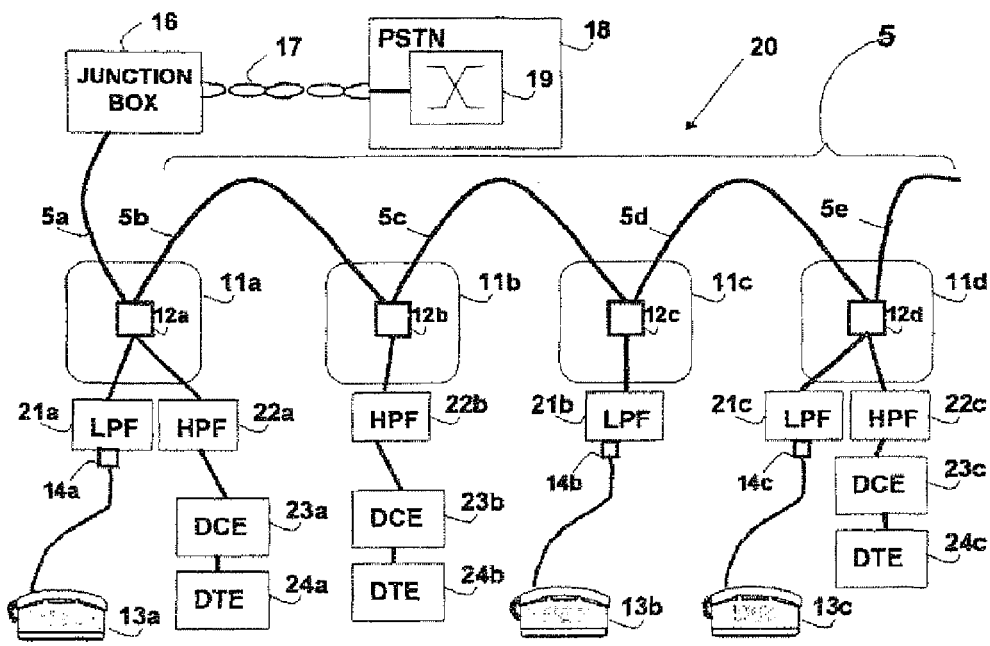
FIG. 2 shows a prior art local area network based on telephone line wiring for a residence or other building.

The present invention has been so far described in embodiments in which the telephone wiring segments are split, and which therefore modify the original galvanic continuity of the telephone wiring, as shown in FIG. 3. Such embodiments require the removal of outlets in order to access the internal wiring. However, the present invention can be applied equally-well to prior-art schemes such as the Dichter network (as illustrated in FIG. 2), wherein the continuity of the telephone wiring is not disturbed, and there the wiring is not split into electrically distinct segments.

Figure 11B:
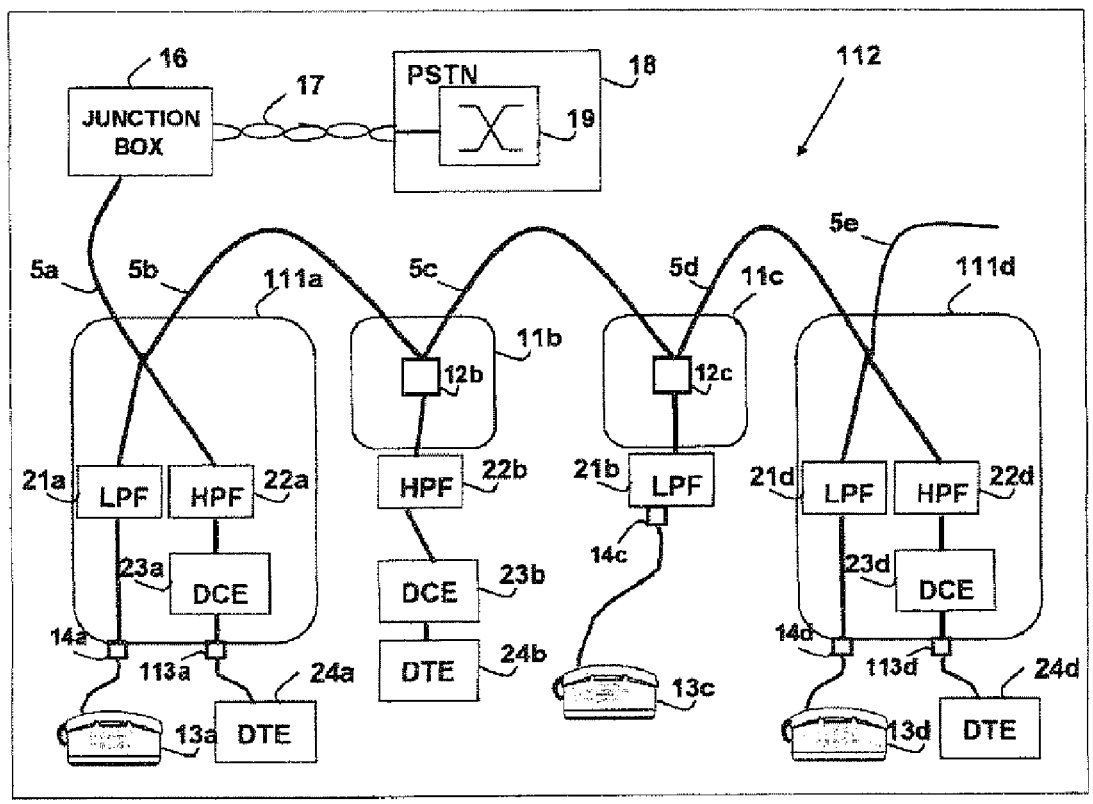
FIG. 11B shows an embodiment of the present invention for use with telephone wiring that is not separated into distinct segments.

Thus, an embodiment of a network utilizing the network outlets of the present invention is shown in FIG. 11B as a network 112. Generally, the Dichter network of FIG. 2 is employed. However, network outlets 111*a* and 111*d* (corresponding to network outlets 11*a* and 11*d* of FIG. 2) are modified so that all components are housed therein. In such a case, the splitter/combiner is a single low pass filter 21 and a single high pass filter 22. High pass filter 22 is coupled to single telephone-line modem/DCE 23. A single high pass filter, a single low pass filter, and a single DCE are used, since the connection to the telephone line involves a single point of connection. However, since point-to-point topology is not used in this case, modem 23 is expected to be more complex than in the other described embodiments. Each outlet 111 has standard telephone connector 14 for connecting the telephone set, and standard data connector 113 for the DTE connection. For example, a 10BaseT interface employing an RJ-45 connector can be used for the DTE connection.

Furthermore, although the present invention has so far been described with a single DTE connected to a single network outlet, multiple DTE units can be connected to a network outlet, as long as the corresponding node or DCE supports the requisite number of connections. Moreover, access to the communication media can be available for plurality of users using multiplexing techniques known in the art. In the case of time domain/division multiplexing (TDM) the whole bandwidth is dedicated to a specific user during a given time interval. In the case of frequency domain/division multiplexing (FDM), a number of users can share the media simultaneously, each using different non-overlapping portions of the frequency spectrum.

In addition to the described data communication purposes, a network according to the present invention can be used for control (e.g. home automation), sensing, audio, or video applications, and the communication can also utilize analog signals (herein denoted by the term "analog communication"). For example, a video signal can be transmitted in analog form via the network.

While the present invention has been described in terms of network outlets which have only two connections and therefore can connect only to two other network outlets (i.e., in a serial, or "daisy chain" configuration), the concept can also be extended to three or more connections. In such a case, each additional connecting telephone line must be broken at the network outlet, with connections made to the conductors thereof, in the same manner as has been described and illustrated for two segments. A splitter for such a multi-segment application should use one low pass filter and one high pass filter for each segment connection.

The present invention has also been described in terms of media having a single pair of wires, but can also be applied for more conductors. For example, ISDN employs two pairs for communication. Each pair can be used individually for a data communication network as described above.

Also as explained above, a network outlet 31 according to the invention (FIG. 3) has a connector 32 having at least four connection points. As an option, jumper 41 (FIG. 4), splitter 50 (FIG. 5), or splitter 50 with jumper 81 (FIG. 8), low pass filters, high pass filters, or other additional hardware may also be integrated or housed internally within network outlet 31. Moreover, the network outlet may contain standard connectors for devices, such as DTE units. In one embodiment, only passive components are included within the network outlet. For example, splitter 50 can have two transformers and two capacitors (or an alternative implementation consisting of passive components). In another embodiment, the network outlet may contain active, power-consuming components. Three options can be used for providing power to such circuits:

1. Local powering: In this option, supply power is fed locally to each power-consuming network outlet. Such network outlets must be able to support connection for input power.
2. Telephone power: In both POTS and ISDN telephone networks, power is carried in the lines with the telephone signals. This power can also be used for powering the network outlet circuits, as long as the total power consumption does not exceed the POTS/ISDN system specifications. Furthermore, in some POTS systems the power consumption is used for OFF-HOOK/ON-HOOK signaling. In such a case, the network power consumption must not interfere with the telephone logic.
3. Dedicated power carried in the media: In this option, power for the data communication related components is carried in the communication media. For example, power can be distributed using 5 kHz signal. This frequency is beyond the telephone signal bandwidth, and thus does not interfere with the telephone service. The data communication bandwidth, however, be above this 5 kHz frequency, again ensuring that there is no interference between power and signals.

Figure 12:
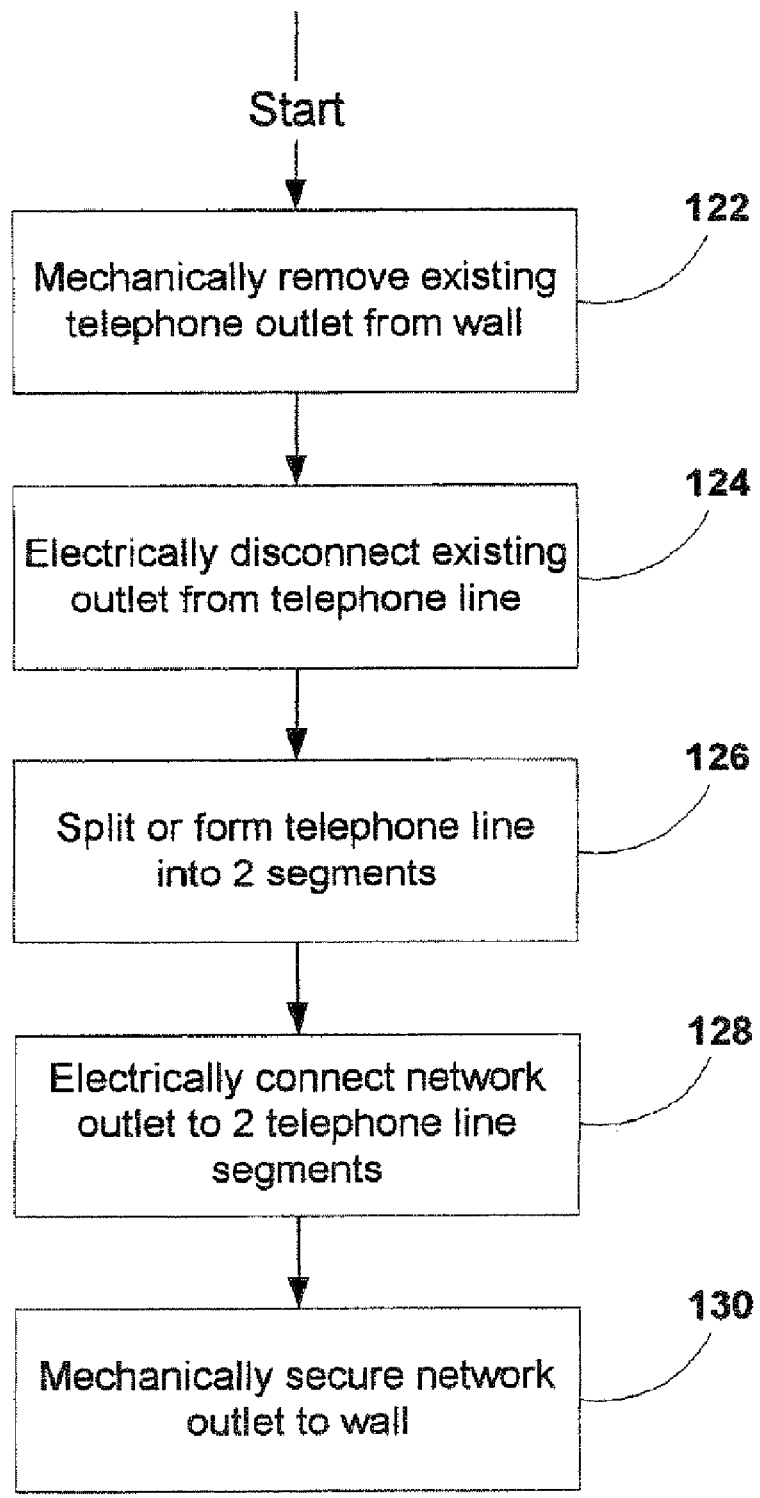
FIG. 12 is a flowchart illustrating the sequence of steps in an installation method according to the present invention for upgrading an existing telephone system.

Upgrading existing telephone lines within a building can be done by the method illustrated in the flowchart of FIG. 12. At least two telephone outlets must be replaced by network outlets in order to support data communications. For each outlet to be replaced, the steps of FIG. 12 are performed as shown. In a step 122, the existing telephone outlet is mechanically removed from the wall. Next, in a step 124, the existing telephone outlet is electrically disconnected from the telephone line. At this point in a step 126, the existing telephone line is split or formed into two isolated segments. Depending on the existing configuration of the telephone line, this could be done by cutting the telephone line into two segments, by separating two telephone lines which had previously been joined at the existing telephone outlet, or by utilizing an unused wire pair of the existing telephone line as a second segment. Then, in a step 128, the two segments are electrically connected to a new network outlet, in a manner previously illustrated in FIG. 5, where one of the segments is connected to connector 54 and the other segment is connected to connector 55. Nate that separating the telephone line into two segments is not necessary in all cases. If only two network outlets are desired, the telephone line does not have to be split, because a single segment suffices to connect the two network outlets. If more than two network outlets are desired, however, the telephone line must be split or formed into more than one segment. Finally, in a step 130 (FIG. 12), the network outlet is mechanically replaced and secured into the wall in place of the original telephone outlet.

While the above description describes the non-limiting case where two wire segments are connected to the outlet (such as outlets 11*a*, 11*b*, 11*c* and 11*d*), in general it is also possible to connect a single segment or more than two segments to the outlet.

Figure 13:
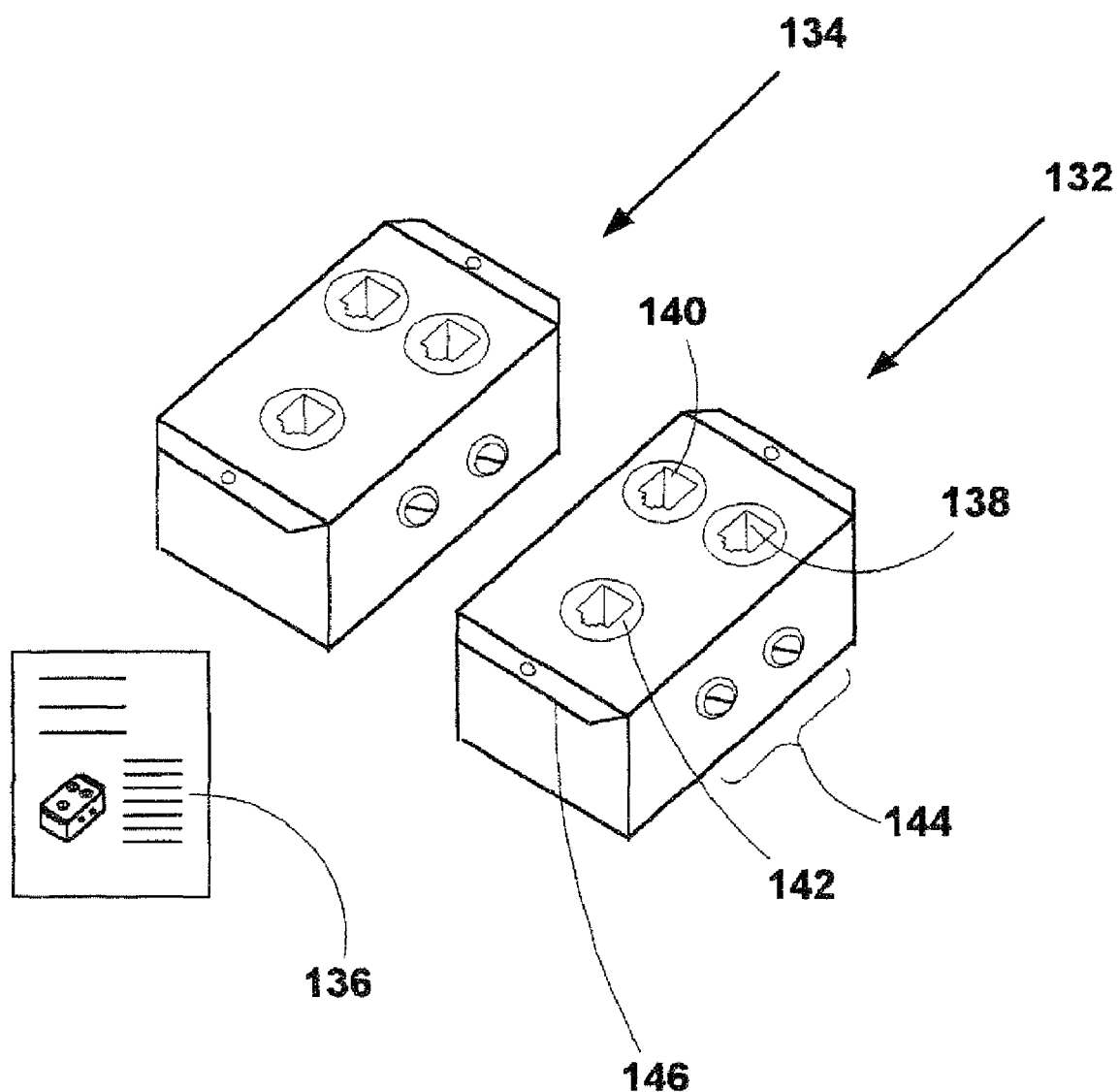
FIG. 13 illustrates the components of a basic kit according to the present invention for upgrading a telephone system to a local area data network.

In order to facilitate the upgrade of existing telephone systems for simultaneous telephony and data communications, the network outlets as described previously can be packaged in kit form with instructions for performing the method described above. As illustrated in FIG. 13, a basic kit contains two network outlets 132 and 134 with instructions 136, while supplementary kits need contain only a single network outlet 132. A network outlet 132 houses two standard data connectors 138 and 140, and a standard telephone connector 142, corresponding to connectors 57, 56, and 53, respectively, of FIG. 5. In addition, network outlet 132 has connectors 144 for electrically connecting to the segment of the telephone line. Connectors 144 correspond to connector 55 of FIG. 5 (connector 54 of FIG. 5 is omitted from FIG. 13 for clarity). Furthermore, network outlet 132 has flanges, such as a flange 146, for mechanically securing to a standard in-wall junction box. A homeowner could purchase a basic kit according to the present invention to upgrade an existing telephone system to a local area network, and then purchase whatever supplementary kits would be needed to expand the local area network to any degree desired.

While the invention has been described with respect to a limited number of embodiments, it will be appreciated that many variations, modifications and other applications of the invention may be made.

What is claimed is:

1. An outlet for coupling at least one data unit to digital data carried over in-wall wiring having one or more twisted wire pairs that simultaneously carry a bi-directional packet-based serial digital data signal and a power signal over same conductors, and the outlet comprising:
    a wiring connector for connecting to the in-wall wiring;
    a first transceiver coupled to said wiring connector and operative for transmitting and receiving bi-directional packet-based serial digital data over said in-wall wiring;
    a first data port coupled to said first transceiver for bi-directional packet-based serial digital data communication with one or more data units;
    a multiport device consisting of one of a repeater, a bridge, a router and a gateway coupled between said first transceiver and said first data port for passing data bi-directionally between said one or more data units and said in-wall wiring; and
    a single enclosure housing said first transceiver, said wiring connector, said multiport device and said first data port, wherein said enclosure is dimensioned to be mountable into a standard wall outlet receptacle or wall outlet opening, and wherein said first transceiver and said multiport device are coupled to said wiring connector to be powered from said power signal.

2. The outlet according to claim 1 further operative for wired connection to the at least one data unit, and wherein said first data port is a LAN connector for wired connection to a data unit, and the outlet further comprising in the single enclosure a LAN transceiver connected between said multiport device and said LAN connector, said LAN transceiver operative for full-duplex packet-based point-to-point serial digital data communication with said connectable data unit, and wherein said LAN transceiver is further connected to the power fed from said power signal.

3. The outlet according to claim 1, wherein said first transceiver is capable of bi-directional communication with one or more substantially similar transceivers over the in-wall wiring.

4. The outlet according to claim 1, wherein said first transceiver is capable of full-duplex point-to-point communication with a single mating transceiver over the in-wall wiring.

5. The outlet according to claim 2, wherein said LAN connector and LAN transceiver form an interface that conforms to an Ethernet IEEE802.3 standard.

6. The outlet according to claim 2, wherein said LAN transceiver is operative to full-duplex point-to-point communication with a single mating LAN transceiver.

7. The outlet according to claim 1, wherein said single enclosure is constructed to have at least one of the following:
    a form substantially similar to that of a standard outlet;
    wall mounting elements substantially similar to those of a standard wall outlet;
    a shape allowing direct mounting in an outlet opening or cavity; and
    a form to substitute for a standard outlet.

8. The outlet according to claim 1, wherein said outlet is pluggable into an existing outlet or attachable to an existing outlet.

9. The outlet according to claim 1, wherein the bi-directional packet-based serial digital data signal is carried over the in-wall wiring over a digital data frequency band which is distinct and above said power signal frequency, and wherein the outlet further comprising separation means for separating said digital data and power signals.

10. The outlet according to claim 9, wherein said separation means is based on one or more center-tapped transformers, wherein the transformers substantially transparently pass the digital data signals.

11. The outlet according to claim 1, wherein the in-wall wiring carries time multiplexed first and second digital data signals, and the outlet is further operative to respectively couple first and second data units to said first and second digital data signals, wherein said LAN connector and said LAN transceiver are connected for communication with a first data unit, the outlet further comprising:
    a second LAN connector for connecting to a second data unit;
    a second LAN transceiver connected between said second LAN connector and said multiport device for full-duplex point-to-point serial digital data communication with a connected second data unit; and
    wherein said multiport device being operative to pass the first digital data signal between said wiring connector and said first data unit and to pass the second digital data signal between said wiring connector and said second data unit.

* * * * *